(12) United States Patent
Burnett et al.

(10) Patent No.: US 8,838,184 B2
(45) Date of Patent: *Sep. 16, 2014

(54) WIRELESS CONFERENCE CALL TELEPHONE

(75) Inventors: Gregory C. Burnett, Northfield, MN (US); Michael Goertz, Redwood City, CA (US); Nicolas Jean Petit, Mountain View, CA (US); Zhinian Jing, Belmont, CA (US); Steven Foster Forestieri, Santa Clara, CA (US); Thomas Alan Donaldson, London (GB)

(73) Assignee: AliphCom, San Francisco, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/184,422

(22) Filed: Jul. 15, 2011

(65) Prior Publication Data

US 2012/0288079 A1   Nov. 15, 2012

Related U.S. Application Data

(63) Continuation-in-part of application No. 12/139,333, filed on Jun. 13, 2008, now Pat. No. 8,503,691, and a continuation-in-part of application No. 10/667,207, filed on Sep. 18, 2003, now Pat. No. 8,019,091.

(60) Provisional application No. 61/364,675, filed on Jul. 15, 2010.

(51) Int. Cl.
| | |
|---|---|
| H04B 1/38 | (2006.01) |
| H04M 1/00 | (2006.01) |
| H04M 3/56 | (2006.01) |
| H04R 3/04 | (2006.01) |
| G10L 21/0208 | (2013.01) |
| H04R 3/00 | (2006.01) |
| H04R 1/40 | (2006.01) |
| H04R 1/10 | (2006.01) |
| G10L 21/0216 | (2013.01) |

(52) U.S. Cl.
CPC ............ *H04M 3/568* (2013.01); *H04R 1/1083* (2013.01); *H04M 2203/509* (2013.01); *G10L 2021/02165* (2013.01); *H04R 2420/07* (2013.01); *H04M 3/56* (2013.01); *H04R 3/04* (2013.01); *G10L 21/0208* (2013.01); *H04R 3/005* (2013.01); *H04M 2250/62* (2013.01); *H04R 1/406* (2013.01)
USPC ........................................ 455/569.1; 455/570

(58) Field of Classification Search
USPC ............................................... 455/569.1, 570
See application file for complete search history.

(56) References Cited

U.S. PATENT DOCUMENTS

| | | | | |
|---|---|---|---|---|
| 6,707,910 | B1 * | 3/2004 | Valve et al. .............. | 379/388.06 |
| 2002/0039425 | A1 * | 4/2002 | Burnett et al. ............... | 381/94.7 |

(Continued)

*Primary Examiner* — Howard Weiss
(74) *Attorney, Agent, or Firm* — Kokka & Backus, PC

(57) ABSTRACT

A wireless conference call telephone system uses body-worn wired or wireless audio endpoints comprising microphone arrays and, optionally, speakers. These audio-endpoints, which include headsets, pendants, and clip-on microphones to name a few, are used to capture the user's voice and the resulting data may be used to remove echo and environmental acoustic noise. Each audio-endpoint transmits its audio to the telephony gateway, where noise and echo suppression can take place if not already performed on the audio-endpoint, and where each audio-endpoint's output can be labeled, integrated with the output of other audio-endpoints, and transmitted over one or more telephony channels of a telephone network. The noise and echo suppression can also be done on the audio-endpoint. The labeling of each user's output can be used by the outside caller's phone to spatially locate each user in space, increasing intelligibility.

16 Claims, 33 Drawing Sheets

(56) References Cited

U.S. PATENT DOCUMENTS

2009/0081999 A1* 3/2009 Khasawneh et al. .......... 455/416
2009/0264114 A1* 10/2009 Virolainen et al. ........... 455/416
2012/0184337 A1* 7/2012 Burnett et al. ............. 455/569.1

* cited by examiner

Linear response of V2 to a speech source at 0.10 meters

Linear response of V2 to a noise source at 1 meters

Linear response of V1 to a speech source at 0.10 meters

Linear response of V1 to a noise source at 1 meters

WIRELESS CONFERENCE CALL TELEPHONE

RELATED APPLICATIONS

This application claims the benefit of U.S. Patent Application No. 61/364,675, filed Jul. 15, 2010.

This application is a continuation in part of U.S. patent application Ser. No. 12/139,333, filed Jun. 13, 2008.

This application is a continuation in part of U.S. patent application Ser. No. 10/667,207, filed Sep. 18, 2003.

TECHNICAL FIELD

The disclosure herein relates generally to telephones configured for conference calling, including such implementations as personal computers or servers acting as telephony devices.

BACKGROUND

Conventional conference call telephones use one or more microphones to sample acoustic sound in the environment of interest and one or more loudspeakers to broadcast the incoming communication. There are several difficulties involved in such communications systems, including strong echo paths between the loudspeaker(s) and the microphone(s), difficulty in clearly transmitting the speech of users in the room, and little or no environmental acoustic noise suppression. These problems result in the outside caller(s) having difficulty hearing and/or understanding all of the users, poor or impossible duplex communication, and noise (such as mobile phone ringers and typing on keyboards on the same table as the conference phone) being clearly transmitted through the conference call to the outside caller(s)—sometimes at a higher level than the users' speech.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Figure 1:
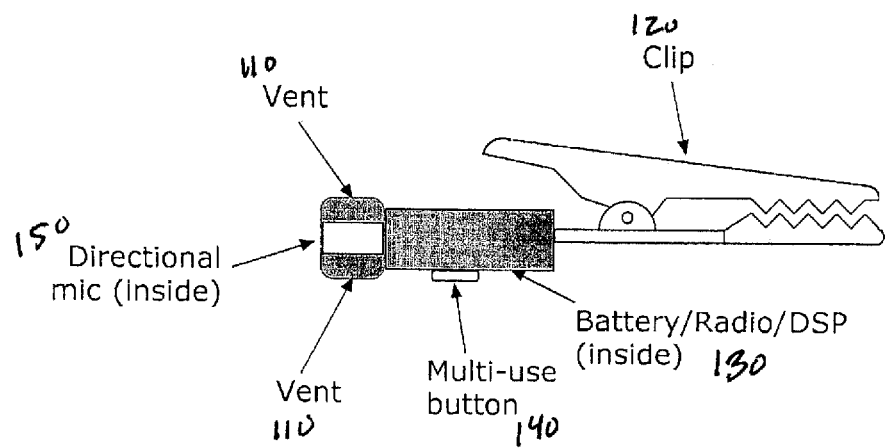
FIG. 1 shows a body-worn Child device as a clip-on microphone array, under an embodiment.

The conference-call telephone, also referred to as a speakerphone, is a vital tool in business today. A conventional speakerphone typically uses a single loudspeaker to transmit far-end speech and one or more microphones to capture near-end speech. The proximity of the loudspeaker to the microphone(s) requires effective echo cancellation and/or half-duplex operation. Also, the intelligibility of the users on both ends is often poor, and there may be very large differences in sound levels between users, depending on their distance to the speakerphone's microphone(s). In addition, no effective noise suppression of the near-end is possible, and various noises (like mobile phones ringing) create a large nuisance during the call.

A wireless conference call telephone system is described herein that addresses many of the problems of conventional conference call telephones. Instead of using microphones on or near the conference call telephone, the embodiments described herein use body-worn wired or wireless audio endpoints (e.g., comprising microphones and optionally, loudspeakers). These body-worn audio-endpoints (for example, headsets, pendants, clip-on microphones, etc.) are used to capture the user's voice and the resulting data may be used to remove echo and environmental acoustic noise. Each headset or pendant transmits its audio to the conference call phone, where noise and echo suppression can take place if not already performed on the body-worn unit, and where each headset or pendant's output can be labeled, integrated with the other headsets and/or pendants, and transmitted over a telephone network, over one or more telephony channels. The noise and echo suppression can also be done on the headset or pendant. The labeling of each user's output can be used by the outside caller's phone to spatially locate each user in space, increasing intelligibility.

In the following description, numerous specific details are introduced to provide a thorough understanding of, and enabling description for, embodiments of the wireless conference call telephone system and methods. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Unless otherwise specified, the following terms have the corresponding meanings in addition to any meaning or understanding they may convey to one skilled in the art.

The term "conference calling" is defined as the use of a telephony device that is designed to allow one or more near-end users to connect to a phone that will then connect through an analog or digital telephony network to another telephone(s).

The term "omnidirectional microphone" means a physical microphone that is equally responsive to acoustic waves originating from any direction.

The term "near-end" refers to the side of the telephone call that is in acoustic proximity to the conference calling system.

The term "far-end" refers to the side of the telephone call that is not in acoustic proximity to the conference calling system.

The term "noise" means unwanted environmental acoustic noise in the environment of the conference call phone.

The term "virtual microphones (VM)" or "virtual directional microphones" means a microphone constructed using two or more omnidirectional microphones and associated signal processing.

The term "Children" refers to one or more body-worn audio endpoints (for example, headsets or pendants or other body-worn devices that contain microphone arrays of at least one microphone and an optional loudspeaker). They may be wired or wireless. Children are hard-coded to the Parent so that they cannot easily be used with other devices. If needed, they may be recharged on the Parent for efficiency and convenience.

The term "Friends" refers to headsets or other similar devices that can be used with the Parent but are not restricted to the Parent. They may be wired or wireless. Examples are Bluetooth devices such as Aliph's Jawbone Icon headset (http://www.jawbone.com) and USB devices such as Logitech's ClearChat Comfort USB headset.

The term "Parent" refers to the main body of the conference call phone, where the different wired and/or wireless streams from each Child are received, integrated, and processed. The Parent broadcasts the incoming acoustic information to the Children and the Friends, or optionally, using a conventional loudspeaker.

The term HCI is an acronym for Host Controller Interface.

The term HFP is an acronym for the Hands-Free Profile, a wireless interface specification for Bluetooth-based communication devices.

The term PSTN is an acronym for Public Switched Telephone Network.

The term SDF is an acronym for Service Discovery Protocol.

The term SIP is an acronym for Session Initiate Protocol.

The term SPI bus is an acronym for Serial Peripheral Interface bus.

The term UART is an acronym for Universal asynchronous receiver/transmitter.

The term USART is an acronym for Universal synchronous/asynchronous receiver/transmitter.

The term USB is an acronym for Universal Serial Bus.

The term UUID is an acronym for Universally Unique Identifier.

The term VoIP is an acronym for Voice over Internet Protocol.

The wireless conference call telephone system described herein comprises wearable wired and/or wireless devices to transmit both incoming and outgoing speech with or without a loudspeaker to ensure that all users' speech is properly captured. Noise and/or echo suppression can take place on the wireless devices or on the Parent device. Some of the devices may be restricted to use only on the Parent to simplify operation. Other wireless devices such as microphones and loudspeakers are also supported, and any wireless transmission protocols alone or in combination can be used.

The wireless conference call telephone system of an embodiment comprises a fixed or mobile conferencing unit and a multiplicity of body-worn wireless telephony units or endpoints. The fixed or mobile conferencing unit comprises a telephony terminal that acts as an endpoint for a multiplicity of telephony calls (via PSTN, VoIP and similar). The fixed or mobile conferencing unit comprises a wireless terminal that acts as the gateway for a multiplicity of wireless audio sessions (for example Bluetooth HFP audio session). The fixed or mobile conferencing unit comprises an audio signal processing unit that inter-alia merges and optimizes a multiplicity of telephony calls into a multiplicity of wireless audio sessions and vice-versa. Optionally, the fixed or mobile conferencing unit comprises a loudspeaker.

The body-worn wireless telephony unit of an embodiment comprises a wireless communication system that maintains an audio session with the conferencing unit (such as a Bluetooth wireless system capable of enacting the HFP protocol). The body-worn wireless telephony unit comprises a speech detection and transmission system (e.g., microphone system). The body-worn wireless telephony unit optionally comprises a means of presenting audio to the user. The body-worn wireless telephony unit optionally comprises a signal processor that optimizes the user speech for transmission to the conferencing unit (for example by removing echo and/or environmental noise). The body-worn wireless telephony unit optionally comprises a signal processor that optimizes received audio for presentation to the user.

Moving the microphones from the proximity of the loudspeaker to the body of the user is a critical improvement. With the microphones on the body of the user, the speech to noise ratio (SNR) is significantly higher and similar for all near-end users. Using technology like the Dual Omnidirectional Microphone Array (DOMA) (described in detail herein and in U.S. patent application Ser. No. 12/139,333, filed Jun. 13, 2008) available from Aliph, Inc., San Francisco, Calif., two or more microphones can be used to capture audio that can be used to remove acoustic noise (including other users speaking) and echo (if a loudspeaker is still used to broadcast far-end speech). Under the embodiments herein, the signal processing is not required to be done on the device carried on the user, as the recorded audio from the microphones can be transmitted for processing on the Parent device. If a wireless headset device is used to house the microphones, the incoming far-end speech could also be broadcast to the headset(s) instead of using the loudspeaker. This improves echo suppression and allows true duplex, highly intelligible, private, conference conversations to take place.

The components of the wireless conference call telephone system are described in detail below. Each component, while described separately for clarity, can be combined with one or more other components to form a complete conference call system.

Wearable Devices (Children)

The term "Children" refers to one or more body-worn audio endpoints (for example, headsets or pendants or other body-worn devices that contain microphone arrays of at least one microphone and an optional loudspeaker). They may be wired or wireless. Children are hard-coded to a Parent so that they cannot easily be used with other devices. If desired, they may be recharged on the Parent for efficiency and convenience.

The wearable devices of an embodiment comprise a single microphone (e.g., omnidirectional microphone, directional microphone, etc.), analog to digital convertor (ADC), and a digital signal processor. The wearable devices also include a wireless communication component (e.g., Bluetooth, etc.) for transferring data or information to/from the wearable device. The wireless communication component enables fixed pairing between Parent and Child so that the Children don't get removed from the Parent. To assist this, the Children can be made to beep and/or flash and/or turn off when removed from the proximity of the Parent. For best effect, the Children may recharge on the Parent. Any number of Children may be used; four to eight should be sufficient for most conference calls. Optionally, wired devices such as headsets, microphones, and loudspeakers can be supported as well.

The wearable devices of an alternative embodiment comprise two or more microphones that form a microphone array (e.g., the DOMA (described in detail herein and in U.S. patent application Ser. No. 12/139,333, filed Jun. 13, 2008) available from Aliph, Inc., San Francisco, Calif.). Using physical microphone arrays, virtual directional microphones are constructed that increase the SNR of the user's speech. The speech can be processed using an adaptive noise suppression algorithm, for example, the Pathfinder available from Aliph, Inc., San Francisco, Calif., and described in detail herein and in US patent application Ser. No. 10/667,207, filed Sep. 18, 2003. The processing used in support of DOMA, Pathfinder, and echo suppression can be performed on the Child or, alternatively, on the Parent. If a Parent loudspeaker is used and echo suppression is done on the Child, the Parent can route the speaker output to the Child via wireless communications to assist in the echo suppression process.

The Child may be head-worn (like a headset), in which case a Child loudspeaker can be used to broadcast the far-end speech into the ear of the user, or body-worn, in which case the Parent will be required to use a loudspeaker to broadcast the far-end speech. The body-worn device can clip on to the clothing of the user, or be hung from the head like a pendant. The pendant can use a hypoallergenic substance to construct the structure that goes around the neck since it may be in contact with the user's skin. If a headset is used as a Child, an on-the-ear mount is recommended over an in-the-ear mount, due to hygienic considerations.

As an example, FIG. 1 shows a body-worn Child device as a clip-on microphone array, under an embodiment. The device attaches to a user with a gator clip (120) as shown but the embodiment is not so limited. A single directional microphone (150) including vents (110) is used and the radio device (130), battery (130), and signal processing (130) are all housed in a small enclosure by the microphone. The Child is not, however, limited to these components or this configuration. Under an embodiment, the device includes a multi-use button (140) which may be used to place the device in a pairing/discoverable mode, break a connection with a Parent, mute the device microphone, etc.

Figure 2:
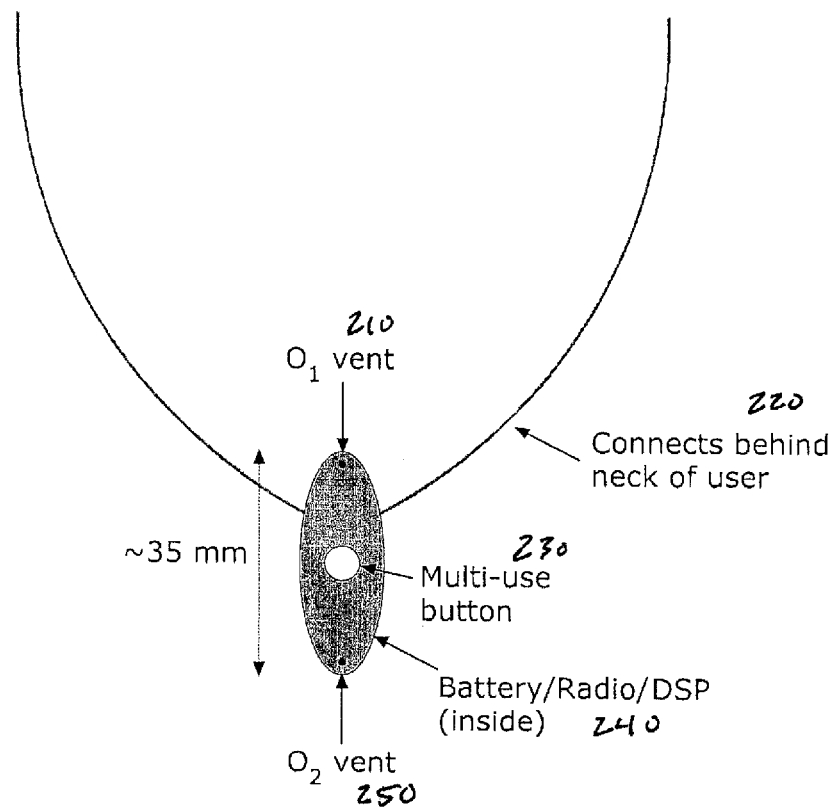
FIG. 2 shows a body-worn Child device as a pendant microphone array, under an alternative embodiment.

As another example, FIG. 2 shows a body-worn Child device as a pendant microphone array, under an alternative embodiment. Two omnidirectional microphones ($O_1$ and $O_2$) are used with a system such as the DOMA array. The device/microphone includes a vent for the $O_1$ microphone (210) and the $O_2$ microphone (250). The radio device (240), battery (240), and signal processing (240) are all housed in the pendant body which is worn around the neck like a necklace (220).

Regardless of physical embodiment, to extend battery life, simplify construction and updates, and decrease cost of the Children, most of the processing for echo and noise suppression of an embodiment can be done in the Parent. In this case, the Children record the incoming audio, multiplex the audio signals in the case of more than one microphone, and transmit them to the Parent for processing, as appropriate.

Battery life may be extended in an embodiment by performing processing on the Child that calculates an accurate Voice Activity Detection (VAD) signal. Then, the Child only transmits when detecting speech from its user. Similarly, the Child could use lower bandwidth and/or transmission power when the VAD signal indicates that the user is not speaking. Generally, only one or two people using the speakerphone will be talking at once, and wireless transmission (TX) is a significant power user, so considerable power savings may be realized using these methods. The VAD can also be shared with the Parent through many conventional methods (e.g., tone multiplexing) for use on the Parent for various algorithms (such as spatialization location of different speakers, integration of the different speaker speech data, and so on).

An optional extension useful for Children is the ability for Children to detect each other, and share information directly with one another, such as whether they are in use. This might be done, for example, using Bluetooth inquiry and appropriate SDP records. For example, one Child might detect that another Child is in range and in use (in which case it is likely that the physical user of the one Child is in audible range of the physical user of the other Child) and makes changes to its audio processing (if any), for example to enhance echo suppression.

The Parent

The term "Parent" refers to the main body of the conference call phone, where the different wired and/or wireless streams from each Child are received, integrated, and processed. The Parent broadcasts the incoming acoustic information to the Children and the Friends, or optionally, using a conventional loudspeaker. The Parent device couples or connects to the telephone network, has a dialing interface, and uses wired and/or wireless protocols to communicate to its "Children" (devices that can only be used with the Parent) and "Friends" (other devices that can be used with the Parent). Embodiments of the Parent device are described in detail below.

The Parent device of a first embodiment includes a conventional loudspeaker and microphone(s), and enables the making of Bluetooth and/or other wireless connections. The Parent device can have Children, but Children are not required. This configuration offers an incremental improvement to the speakerphone, as anyone without a Bluetooth or similar device will not see any benefit. This configuration eliminates the need for a parent loudspeaker only when all near-end users connect to the Parent through Friend devices. Therefore the loudspeaker will have to be used for many calls, and its echo can be difficult to remove from the Friend device microphone(s) data.

The Parent device of a second embodiment is significantly different than conventional speakerphones and offers markedly better performance. The Parent of the second embodiment does not contain a loudspeaker or microphones so it has a size form factor that is smaller than conventional speakerphones. The Parent has between 4 and 8 Children, and is able to couple or connect to 4 to 8 Friends. While couplings between a Parent and a number of Children/Friends are possible, 16 connections would likely handle the needs of most speakerphone users. The Parent broadcasts the far-end speech to all Children and Friends, and uses a single wireless outbound channel in order to save bandwidth since the same information is being broadcast to all Children and Friends. The Parent receives the incoming wireless transmissions and integrates them into a single outgoing transmission. For the Children without onboard processing, the Parent demultiplexes the incoming signal (if more than one microphone is used) and performs signal processing tasks such as echo cancellation, noise suppression, voice activity detection, and any other processing needed prior to integration with other wireless signals.

Integration of the incoming Children and Friends audio channels together into a single outgoing stream involves calculating a dynamic gain for each channel so that all outgoing streams from both Children and Friends are at roughly the same level. This is accomplished through the use of a root-mean-square (RMS) calculation that is only calculated when the user is speaking in an embodiment.

Figure 3:
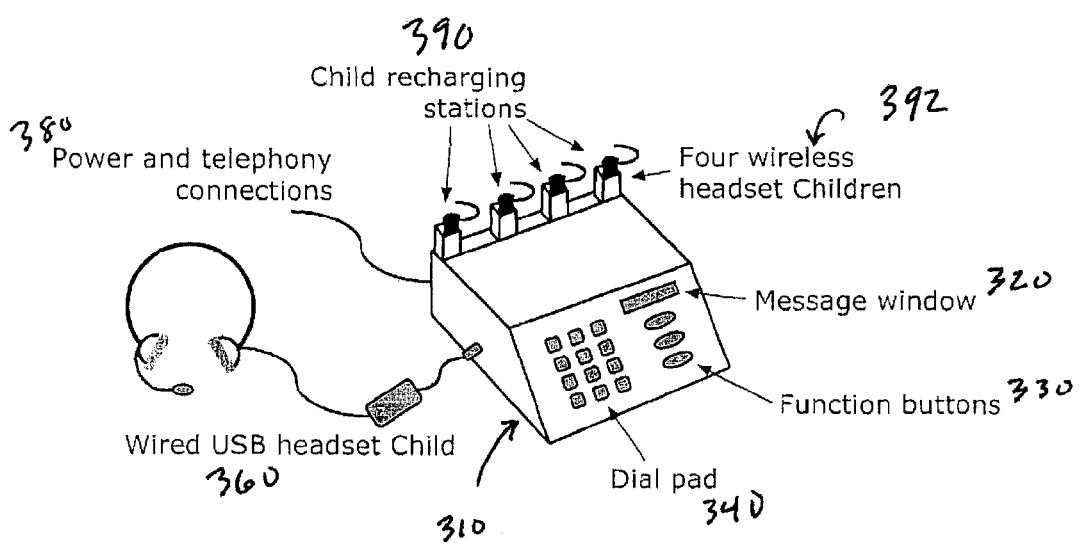
FIG. 3 shows a wireless conference call telephone system comprising a Parent with four wireless Children and one wired Child, under an embodiment.

An embodiment of the second configuration is shown in, for example, FIG. 3, which shows a wireless conference call telephone system comprising a Parent (310) with four wireless Children (392) and one wired Child (360), under an embodiment. This embodiment includes Child recharging docking stations (390) for the Children. In this embodiment four Children are wireless on-the-ear headsets (392), and one Child is a wired headset (360). The Parent provides an interface configured for the desired features of an embodiment including a dial pad (340), function buttons (330) and message window (320). The Parent further provides couplings to a power source and telephony network (380).

A further increase in utility is realized when Friends are paired to the Parent. To simplify pairing, the Parent's inquiry power (the power of the inquiry signal, which searches for devices with which to pair) may be reduced to the point where it is detectable by Friends only within a meter or less. Any friend device wishing to be paired with the Parent should be placed in pairing mode and then brought into this new reduced pairing range, where it can be paired with the Parent. This reduces the number of undesired pairings. In addition, the pairing can be classified as transient, so that the record of the pairing will be erased at the next power on/off or charging cycle. This prevents the friend's pairing record from becoming needlessly cluttered.

Placing of the unit of an embodiment in pairing mode is performed using at least one button and/or switch of one or more of the Parent and Child/Friend. Under an alternative embodiment, the device to be paired is shaken and an accelerometer is used to trigger pairing mode after a certain number and strengths of shakes.

Although any wireless protocol may be used in an embodiment, the use of Bluetooth allows the addition of ancillary devices such as Bluetooth loudspeakers and microphones, which may be used with an embodiment in which the Parent has neither loudspeakers nor microphones. The flexibility allowed through the use of Bluetooth devices is unprecedented because it enables the system to comprise anything from a Parent and a single Child to a Parent, Bluetooth loudspeaker, and Bluetooth microphone up to to 16 or more Bluetooth headsets.

Example Embodiment

Figure 4:
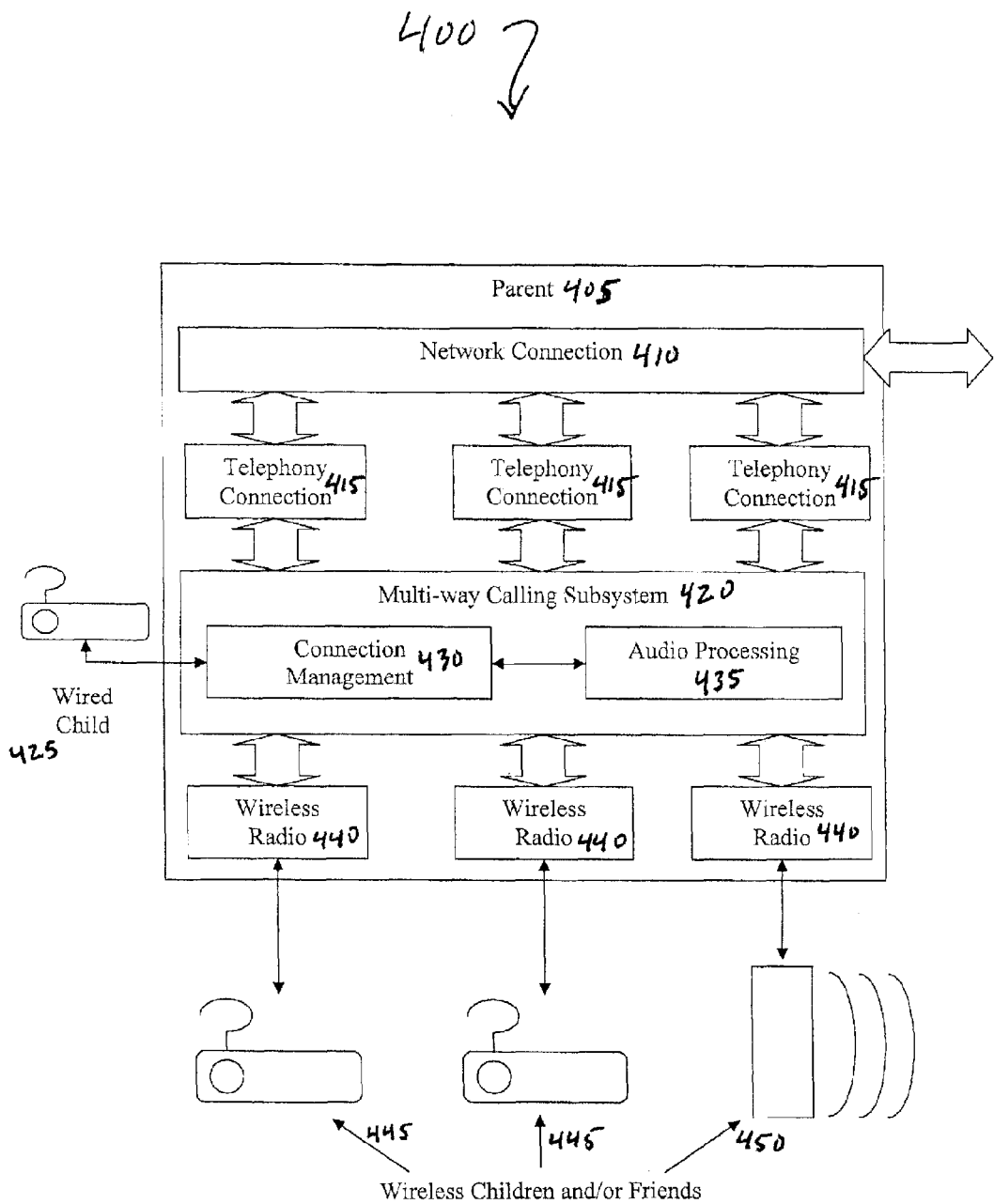
FIG. 4 shows a block diagram of a wireless conference call telephone system comprising a Parent and its modules and the Children/Friends (three headsets and a loudspeaker), under an embodiment.

FIG. 4 shows a block diagram of a wireless conference call telephone system comprising a Parent (405) and its modules and the Children/Friends (three headsets (425, 445) and a loudspeaker (450)), under an embodiment. A conference calling Parent (405), incorporating network connectivity (410), a multiplicity of telephony connections (415), a multiplicity of wireless radios (440), and a multi-way calling subsystem (420), is shown coupled or connected to two wireless headsets (445), a wired headset (425), and a loudspeaker (450). In addition, both Children and Friends are supported. A minimum of 4 Children/Friends are recommended, and a maximum of 16 should be sufficient for most uses. The maximum number possible will be determined by the wireless protocol and corresponding stack chosen. Wired devices such as headsets, microphones, and loudspeakers are also supported. The number of Children and/or Friends may vary within the duration of a single call if near-end users enter and leave the conference call.

The Parent includes a suitable microprocessor with embedded peripherals together with suitable external peripherals on a printed circuit board. In an embodiment these could be an ARM11 microprocessor with embedded Ethernet connections and sufficient number of UART, USART, SPI, USB, or similar busses and appropriate memory for the number of connections desired.

The network connectivity can be provided by one or more Ethernet connections and/or one or more Wifi connections, but the embodiment is not so limited. Each of the wireless radios can be implemented using a Bluetooth radio device using the HCl protocol over UART or USART or USB with the provided microprocessor.

The telephony connections can be provided by suitable software code running on the Parent microprocessor to implement a telephony protocol. For example, a number of SIP telephony connections might be provided by using a SIP software stack, such as the commercially available PJSIP software stack. In such an instance, it will be understood that the SIP software stack may need to register over the network with a SIP server, and perform such other tasks as is well known by those skilled in the art to provide a SIP connection that can make and/or receive telephony calls using the SIP protocol.

The Parent's multi-way calling subsystem (420) provides connection management (430) and audio stream management (435). These functions may be provided by suitable software code running on the microprocessor. The audio processing subsystem (435) processes and routes audio from the Bluetooth radios and telephony connections, and may also be used to perform additional audio processing tasks such as spatialization, equalization, noise suppression, echo suppression, and other tasks. The connection management subsystem (430) manages the connection and disconnection of audio streams into the conference call (including telephony connections and wireless and/or wired connections from Friends and Children).

The Children and/or Friends of an embodiment can be any number of available Bluetooth headsets such as the Jawbone Bluetooth headset, manufactured by Aliph. Other wireless protocols (e.g., ZigBee, etc.) can also be used if desired, and wired connections are also supported.

In an embodiment where the wireless radio is a Bluetooth radio and the conference calling Children and/or Friends are Bluetooth headsets, an effective implementation provides one Bluetooth radio for each Child/Friend. Communication between the Parent radio and the Child/Friend can use proprietary profiles or commercially available ones such as the Bluetooth Headset Profile as defined in the Bluetooth specifications. In an embodiment, the Bluetooth radio in the Parent acts in the Bluetooth slave role, but the embodiment is not so limited. This will allow each Child/Friend to form its own piconet with the Parent, resulting in good flexibility. Other configurations known to those skilled in the art are possible, however.

Figure 5:
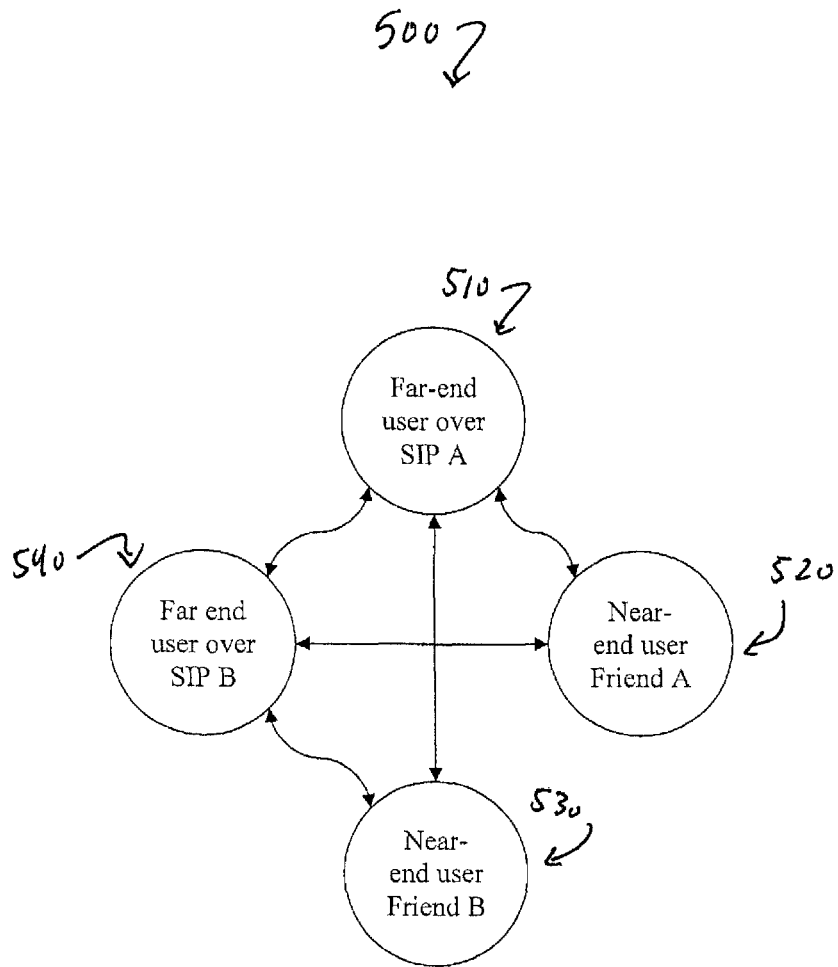
FIG. 5 is a flow diagram showing audio streaming between two far-end users and two near-end users, under an embodiment.

FIG. 5 is a flow diagram showing audio streaming between two far-end users (510, 540) and two near-end users (520, 530), under an embodiment. This flow diagram illustrates the connectivity of audio streams in an embodiment in which two far-end users are connecting to the conference call remotely via telephony (in this case using SIP), and two near-end users are in the same room as the Parent using Friends and/or Children. It is assumed that the near-end users in the same room as the Parent are able to hear each other directly, so the audio from each of them will not be routed to the other's headset. If the room is large enough that mutual hearing is difficult, then it is possible to route the output of each headset to the input of the others, but that is not expected to be needed in most situations.

Figure 6:
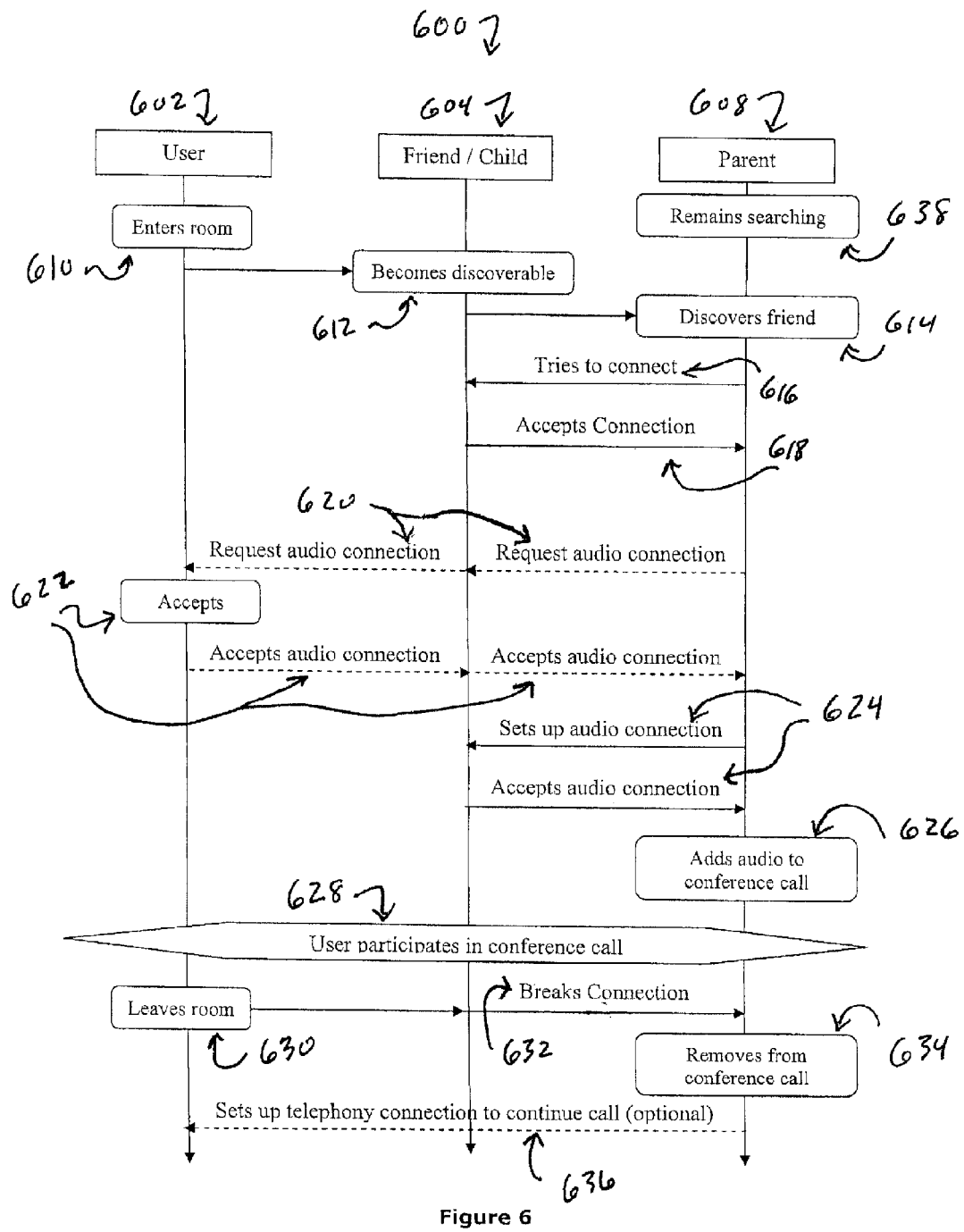
FIG. 6 is a flow chart for connecting wireless Friends/Children and a Parent of the wireless conference call telephone system, under an embodiment.

FIG. 6 is a flow diagram for connecting wireless Friends/Children (604) and a Parent (608) of the wireless conference call telephone system, under an embodiment. This flow diagram illustrates a process by which a wireless Friend or Child may be added to the conference call. The user (602) enters the room in which the conference is being held, which includes the Parent (608). The Friend or Child they are using becomes discoverable (612) to the conference calling unit either through user action (for example a button press), or through the mere action of entering the room (610) (for example, the headset is always in discoverable mode but only over a short wireless range, so only becomes discoverable when in proximity of the Parent). Such discoverability might be achieved, for example, by the Friend entering Bluetooth discoverable mode (that is, starting to scan for Bluetooth inquiries and pages, as defined in the Bluetooth specification).

Similarly, the Parent regularly searches (638) for newly available Children or Friends. Such searching may be continuous, initiated by a user button press, and/or initiated by simply picking up a Child equipped with a sensing accelerometer that can be used to sense being picked up by a user. Once in search mode, the Parent will regularly search for available Children by sending out Bluetooth inquiries and listening for responses. When the Parent discovers (614) the Friend/Child by receiving an appropriate response to its inquiry (for example, giving a suitable Bluetooth class of device, or a suitable Bluetooth hardware address or suitable pre-agreed UUIDs or other data in the extended inquiry response), the Parent may attempt to connect (616) using the process defined in the Bluetooth specification. The Child automatically accepts (618) this invitation and is connected to the Parent, but the Friend should confirm that it wants to be connected to the Parent to reduce unwanted Parent/Friend pairings (such as when a near-end user has a Bluetooth device on his or her person but wishes to use a Child to connect to the Parent). Accordingly, parent issues an audio connection request (620) to the Friend and associated user (602). If the pairing is accepted (622), the Parent will attempt to connect (624) the Friend/Child to the conference call. Since this embodiment uses Bluetooth, if it is a wireless device attempting to connect then the RING command, as defined in the Bluetooth headset or hands-free profile, will be used. A wired device can be connected with no further input from the user required. The Friend/Child may indicate to the user that the Parent is attempting to connect the audio (for example, playing an audible tone) and the user may accept this connection (for example by pressing a button) and as a result the Parent-to-Friend/Child audio connection will be made (626). The user may then participate in the conference call (628).

Once the Friend/Child accepts the audio connection into the conference call, the multi-way calling subsystem may connect the audio to/from the Friend/Child with other audio streams as described in FIG. 5.

This configuration allows the near-end user to converse in person with other near-end users of Friends and/or Children that happen to be in the room as well as clearly hear far-end users connected to the Parent. Conversely, the far-end users will be able to clearly hear all near-end users using a Friend and/or Child. This contrasts with conventional speakerphones, where it can be very difficult for far-end users to hear all near-end users clearly. In addition, if the Friends and Children are equipped with noise suppression, environmental noises such as phones ringing, typing, and other acoustic noises will be suppressed before transmission. Also, the signal-to-noise ratio (SNR) will be significantly higher even without noise suppression because the distance between each near-end user and the microphones of the Friends and/or Children will be much higher than the desk-mounted microphones in use today in conventional systems.

The near-end users will also be able to clearly hear all remote users, and remote users will also be able to converse with each other. A clear, full conference with excellent intelligibility and audio quality is the result. Private conversations are also possible between participants in the room merely by muting their Friends/Children, or using a button on the Parent to mute all Children and Friends. If the Friends and Children contain noise suppression of sufficient strength (e.g., the Jawbone Bluetooth headset available from Aliph, Inc., San Francisco, Calif.), it is also possible for one person to say something private to all others in the room by muting their Friend/Child and speaking normally. The Friends and Children of the other near-end users will remove the speech of the other person so that it is not transmitted to the far-end. Similarly, Children or Friends with no microphones (only a loudspeaker) may be used to monitor the far-end speech. Conversely, Children or Friends with no loudspeaker (only microphone(s)) may be used to broadcast a near-end user's speech to the far end.

A wireless near-end user may break the connection (632) to Parent or exit the conference call (632) at any time by hanging up the call using a button on the Child/Friend, placing the Child back into its recharging cradle, or simply by leaving the room or walking out of range of the Parent (630). A Child equipped with an accelerometer or similar device may be programmed to leave the call when placed on the table or tapped by the user. Optionally, after disconnection (632, 634), the Parent may make a telephony connection (e.g. a SIP call) to the disconnected user via a pre-determined phone number in order to allow them to continue remotely if desired (636). Therefore, a user that was taking part in a conference call in person can have the conference call routed to his mobile phone in order to continue the conference call in his car.

These embodiments use Bluetooth as their wireless protocol but are not so limited.

Dual Omnidirectional Microphone Array (DOMA)

A dual omnidirectional microphone array (DOMA) that provides improved noise suppression is described herein. Compared to conventional arrays and algorithms, which seek to reduce noise by nulling out noise sources, the array of an embodiment is used to form two distinct virtual directional microphones which are configured to have very similar noise responses and very dissimilar speech responses. The only null formed by the DOMA is one used to remove the speech of the user from $V_2$. The two virtual microphones of an embodiment can be paired with an adaptive filter algorithm and/or VAD algorithm to significantly reduce the noise without distorting the speech, significantly improving the SNR of the desired speech over conventional noise suppression systems. The embodiments described herein are stable in operation, flexible with respect to virtual microphone pattern choice, and have proven to be robust with respect to speech source-to-array distance and orientation as well as temperature and calibration techniques.

In the following description, numerous specific details are introduced to provide a thorough understanding of, and enabling description for, embodiments of the DOMA. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Unless otherwise specified, the following terms have the corresponding meanings in addition to any meaning or understanding they may convey to one skilled in the art.

The term "bleedthrough" means the undesired presence of noise during speech.

The term "denoising" means removing unwanted noise from Mic1, and also refers to the amount of reduction of noise energy in a signal in decibels (dB).

The term "devoicing" means removing/distorting the desired speech from Mic1.

The term "directional microphone (DM)" means a physical directional microphone that is vented on both sides of the sensing diaphragm.

The term "Mic1 (M1)" means a general designation for an adaptive noise suppression system microphone that usually contains more speech than noise.

The term "Mic2 (M2)" means a general designation for an adaptive noise suppression system microphone that usually contains more noise than speech.

The term "noise" means unwanted environmental acoustic noise.

The term "null" means a zero or minima in the spatial response of a physical or virtual directional microphone.

The term "$O_1$" means a first physical omnidirectional microphone used to form a microphone array.

The term "$O_2$" means a second physical omnidirectional microphone used to form a microphone array.

The term "speech" means desired speech of the user.

The term "Skin Surface Microphone (SSM)" is a microphone used in an earpiece (e.g., the Jawbone earpiece available from Aliph of San Francisco, Calif.) to detect speech vibrations on the user's skin.

The term "$V_1$" means the virtual directional "speech" microphone, which has no nulls.

The term "$V_2$" means the virtual directional "noise" microphone, which has a null for the user's speech.

The term "Voice Activity Detection (VAD) signal" means a signal indicating when user speech is detected.

The term "virtual microphones (VM)" or "virtual directional microphones" means a microphone constructed using two or more omnidirectional microphones and associated signal processing.

Figure 7:
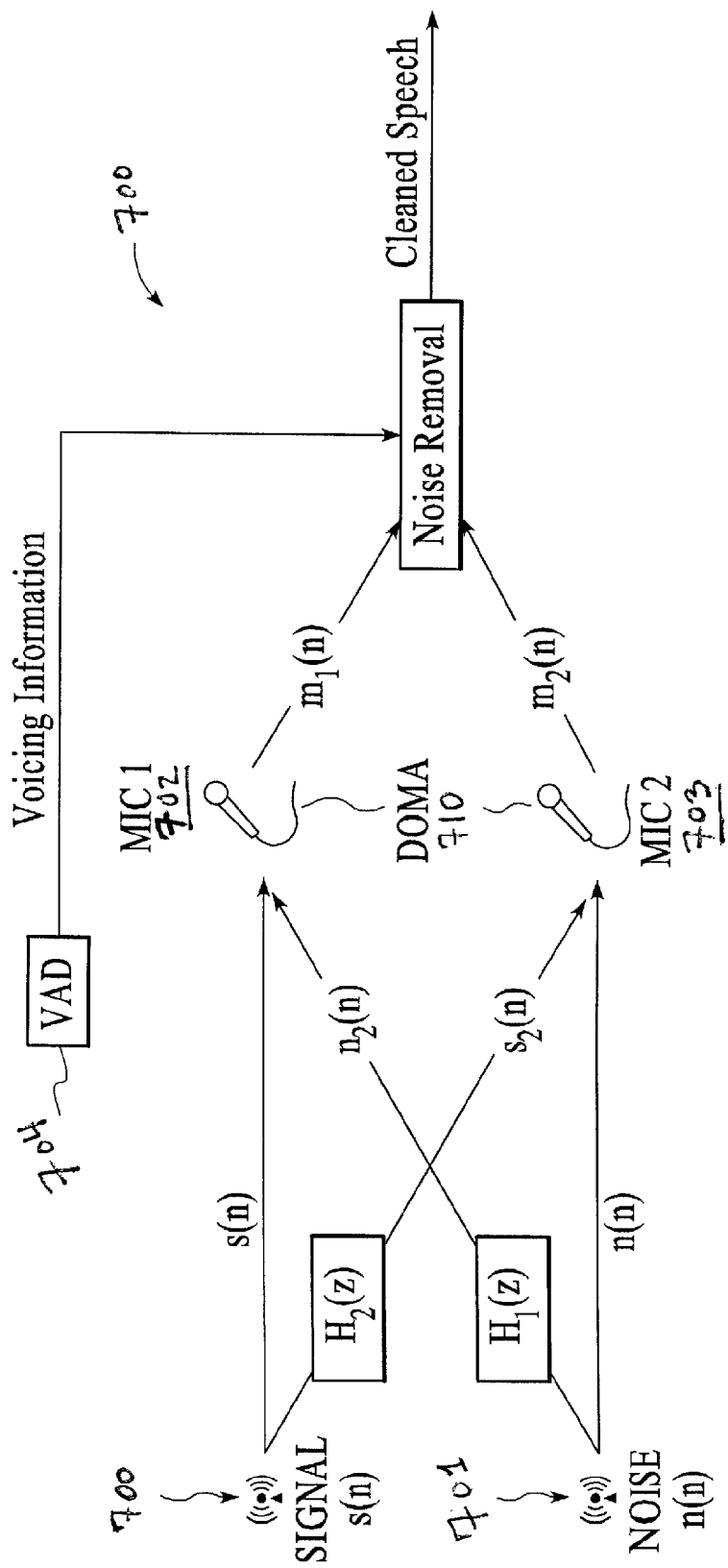
FIG. 7 is a two-microphone adaptive noise suppression system, under an embodiment.

FIG. 7 is a two-microphone adaptive noise suppression system 700, under an embodiment. The two-microphone system 700 including the combination of physical microphones MIC 1 and MIC 2 along with the processing or circuitry components to which the microphones couple (described in detail below, but not shown in this figure) is referred to herein as the dual omnidirectional microphone array (DOMA) 710, but the embodiment is not so limited. Referring to FIG. 7, in analyzing the single noise source 701 and the direct path to the microphones, the total acoustic information coming into MIC 1 (702, which can be an physical or virtual microphone) is denoted by $m_1(n)$. The total acoustic information coming into MIC 2 (703, which can also be an physical or virtual microphone) is similarly labeled $m_2(n)$. In the z (digital frequency) domain, these are represented as $M_1(z)$ and $M_2(z)$. Then, $$M_1(z) = S(z) + N_2(z)$$

$$M_2(z) = N(z) + S_2(z)$$

with $$N_2(z) = N(z)H_1(z)$$

$$S_2(z) = S(z)H_2(z),$$

so that $$M_1(z) = S(z) + N(z)H_1(z)$$

$$M_2(z) = N(z) + S(z)H_2(z). \quad \text{Eq. 1}$$

This is the general case for all two microphone systems. Equation 1 has four unknowns and only two known relationships and therefore cannot be solved explicitly.

However, there is another way to solve for some of the unknowns in Equation 1. The analysis starts with an examination of the case where the speech is not being generated, that is, where a signal from the VAD subsystem 704 (optional) equals zero. In this case, $s(n) = S(z) = 0$, and Equation 1 reduces to $$M_{1N}(z) = N(z)H_1(z)$$

$$M_{2N}(z) = N(z),$$

where the N subscript on the M variables indicate that only noise is being received. This leads to $$M_{1N}(z) = M_{2N}(z)H_1(z) \quad \text{Eq. 2}$$

$$H_1(z) = \frac{M_{1N}(z)}{M_{2N}(z)}.$$

The function $H_1(z)$ can be calculated using any of the available system identification algorithms and the microphone outputs when the system is certain that only noise is being received. The calculation can be done adaptively, so that the system can react to changes in the noise.

A solution is now available for $H_1(z)$, one of the unknowns in Equation 1. The final unknown, $H_2(z)$, can be determined by using the instances where speech is being produced and the VAD equals one. When this is occurring, but the recent (perhaps less than 1 second) history of the microphones indicate low levels of noise, it can be assumed that $n(s) = N(z) \sim 0$. Then Equation 1 reduces to $$M_{1S}(z) = S(z)$$

$$M_{2S}(z) = S(z)H_2(z),$$

which in turn leads to $$M_{2S}(z) = M_{1S}(z)H_2(z)$$

$$H_2(z) = \frac{M_{2S}(z)}{M_{1S}(z)},$$

which is the inverse of the $H_1(z)$ calculation. However, it is noted that different inputs are being used (now only the speech is occurring whereas before only the noise was occurring). While calculating $H_2(z)$, the values calculated for $H_1(z)$ are held constant (and vice versa) and it is assumed that the noise level is not high enough to cause errors in the $H_2(z)$ calculation.

After calculating $H_1(z)$ and $H_2(z)$, they are used to remove the noise from the signal. If Equation 1 is rewritten as $$S(z) = M_1(z) - N(z)H_1(z)$$

$$N(z) = M_2(z) - S(z)H_2(z)$$

$$S(z) = M_1(z) - [M_2(z) - S(z)H_2(z)]H_1(z)$$

$$S(z)[1 - H_2(z)H_1(z)] = M_1(z) - M_2(z)H_1(z),$$

then N(z) may be substituted as shown to solve for S(z) as $$S(z) = \frac{M_1(z) - M_2(z)H_1(z)}{1 - H_1(z)H_2(z)}. \quad \text{Eq. 3}$$

If the transfer functions $H_1(z)$ and $H_2(z)$ can be described with sufficient accuracy, then the noise can be completely removed and the original signal recovered. This remains true without respect to the amplitude or spectral characteristics of the noise. If there is very little or no leakage from the speech source into $M_2$, then $H_2(z) \approx 0$ and Equation 3 reduces to $$S(z) \approx M_1(z) - M_2(z)H_1(z).\qquad\text{Eq. 4}$$

Equation 4 is much simpler to implement and is very stable, assuming $H_1(z)$ is stable. However, if significant speech energy is in $M_2(z)$, devoicing can occur. In order to construct a well-performing system and use Equation 4, consideration is given to the following conditions:

R1. Availability of a perfect (or at least very good) VAD in noisy conditions

R2. Sufficiently accurate $H_1(z)$

R3. Very small (ideally zero) $H_2(z)$.

R4. During speech production, $H_1(z)$ cannot change substantially.

R5. During noise, $H_2(z)$ cannot change substantially.

Condition R1 is easy to satisfy if the SNR of the desired speech to the unwanted noise is high enough. "Enough" means different things depending on the method of VAD generation. If a VAD vibration sensor is used, as in Burnett U.S. Pat. No. 7,256,048, accurate VAD in very low SNRs (−10 dB or less) is possible. Acoustic-only methods using information from $O_1$ and $O_2$ can also return accurate VADs, but are limited to SNRs of ~3 dB or greater for adequate performance.

Condition R5 is normally simple to satisfy because for most applications the microphones will not change position with respect to the user's mouth very often or rapidly. In those applications where it may happen (such as hands-free conferencing systems) it can be satisfied by configuring Mic2 so that $H_2(z) \approx 0$.

Satisfying conditions R2, R3, and R4 are more difficult but are possible give; and, the right combination of $V_1$ and $V_2$. Methods are examined below that have proven to be effective in satisfying the above, resulting in excellent noise suppression performance and minimal speech removal and distortion in an embodiment.

The DOMA, in various embodiments, can be used with the Pathfinder system as the adaptive filter system or noise removal. The Pathfinder system, available from AliphCom, San Francisco, Calif., is described in detail in other patents and patent applications referenced herein. Alternatively, any adaptive filter or noise removal algorithm can be used with the DOMA in one or more various alternative embodiments or configurations.

When the DOMA is used with the Pathfinder system, the Pathfinder system generally provides adaptive noise cancellation by combining the two microphone signals (e.g., Mic1, Mic2) by filtering and summing in the time domain. The adaptive filter generally uses the signal received from a first microphone of the DOMA to remove noise from the speech received from at least one other microphone of the DOMA, which relies on a slowly varying linear transfer function between the two microphones for sources of noise. Following processing of the two channels of the DOMA, an output signal is generated in which the noise content is attenuated with respect to the speech content, as described in detail below.

Figure 8:
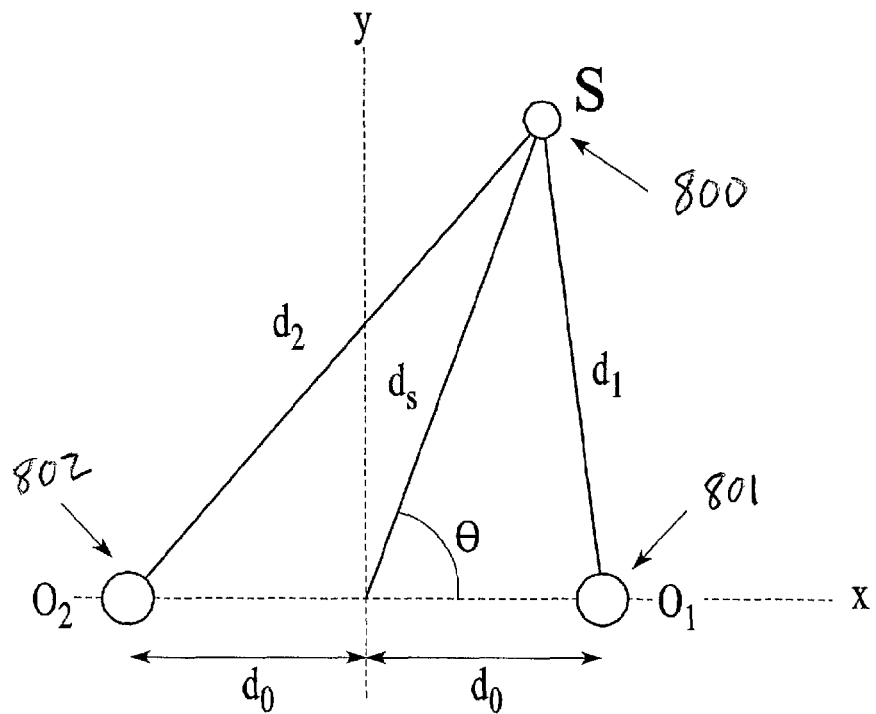
FIG. 8 is an array and speech source (S) configuration, under an embodiment. The microphones are separated by a distance approximately equal to $2d_0$, and the speech source is located a distance $d_s$ away from the midpoint of the array at an angle θ. The system is axially symmetric so only $d_s$ and θ need be specified.
Figure 9:
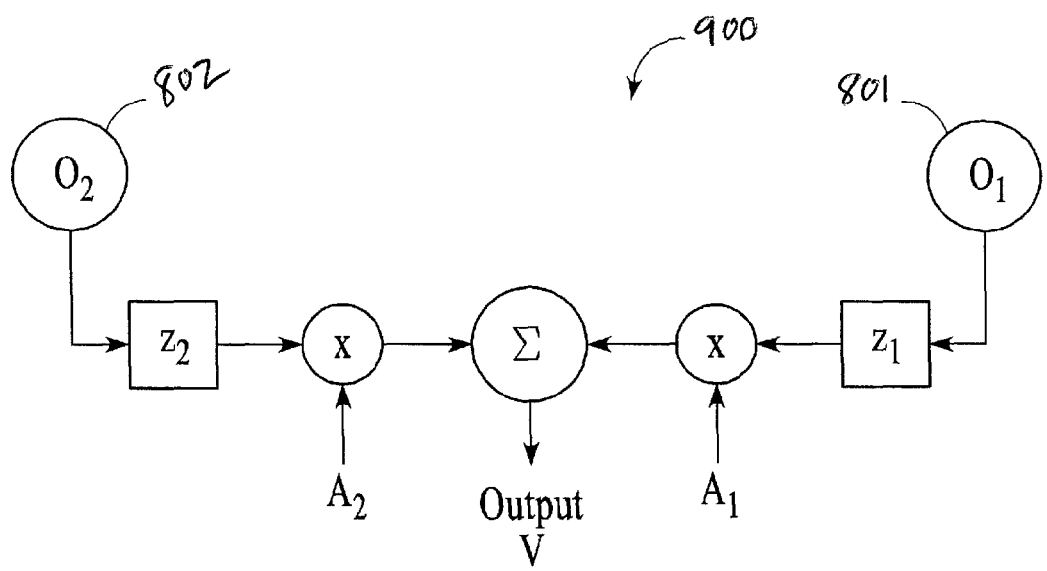
FIG. 9 is a block diagram for a first order gradient microphone using two omnidirectional elements $O_1$ and $O_2$, under an embodiment.

FIG. 8 is a generalized two-microphone array (DOMA) including an array 801/802 and speech source S configuration, under an embodiment. FIG. 9 is a system 900 for generating or producing a first order gradient microphone V using two omnidirectional elements $O_1$ and $O_2$, under an embodiment. The array of an embodiment includes two physical microphones 801 and 802 (e.g., omnidirectional microphones) placed a distance $2d_0$ apart and a speech source 800 is located a distance $d_s$ away at an angle of $\theta$. This array is axially symmetric (at least in free space), so no other angle is needed. The output from each microphone 801 and 802 can be delayed ($z_1$ and $z_2$), multiplied by a gain ($A_1$ and $A_2$), and then summed with the other as demonstrated in FIG. 9. The output of the array is or forms at least one virtual microphone, as described in detail below. This operation can be over any frequency range desired. By varying the magnitude and sign of the delays and gains, a wide variety of virtual microphones (VMs), also referred to herein as virtual directional microphones, can be realized. There are other methods known to those skilled in the art for constructing VMs but this is a common one and will be used in the enablement below.

Figure 10:
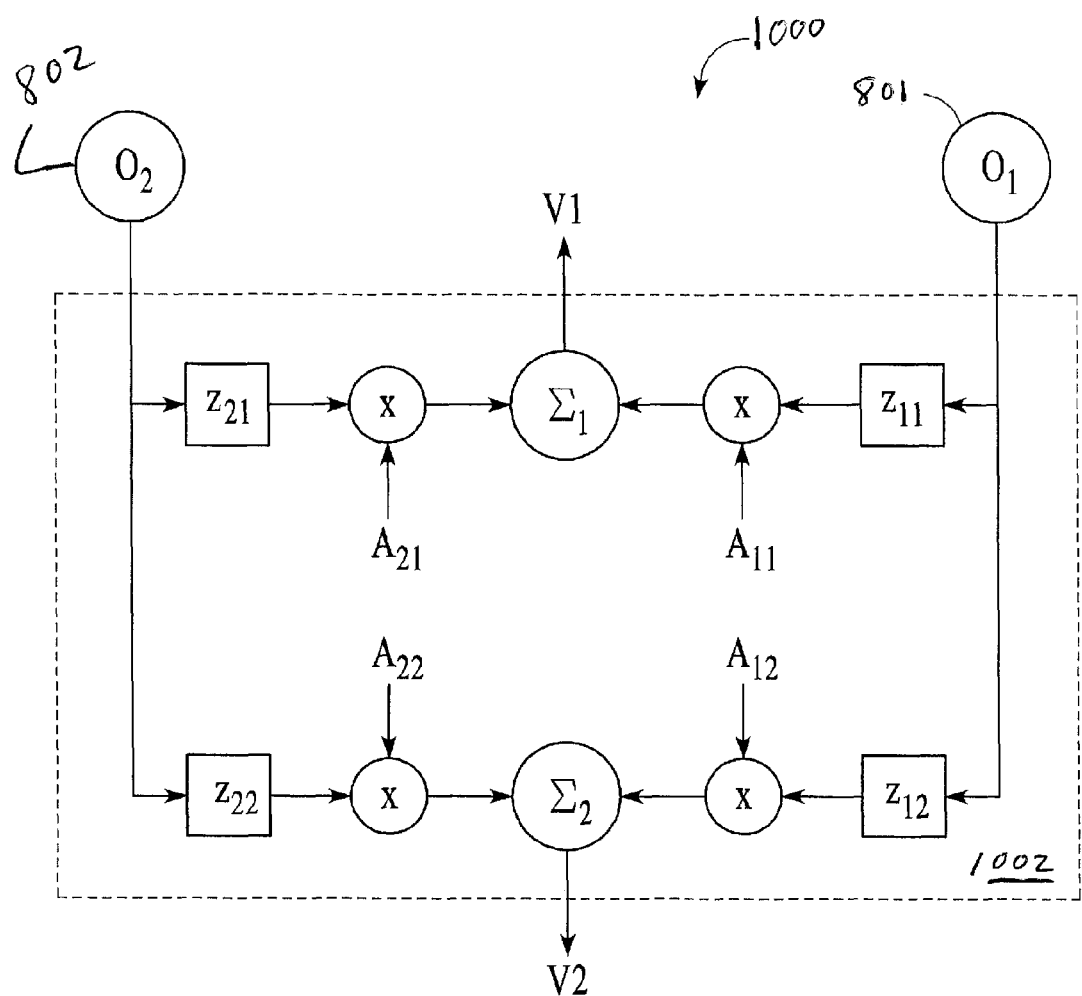
FIG. 10 is a block diagram for a DOMA including two physical microphones configured to form two virtual microphones $V_1$ and $V_2$, under an embodiment.

As an example, FIG. 10 is a block diagram for a DOMA 1000 including two physical microphones configured to form two virtual microphones $V_1$ and $V_2$, under an embodiment. The DOMA includes two first order gradient microphones $V_1$ and $V_2$ formed using the outputs of two microphones or elements $O_1$ and $O_2$ (801 and 802), under an embodiment. The DOMA of an embodiment includes two physical microphones 801 and 802 that are omnidirectional microphones, as described above with reference to FIGS. 8 and 9. The output from each microphone is coupled to a processing component 1002, or circuitry, and the processing component outputs signals representing or corresponding to the virtual microphones $V_1$ and $V_2$.

In this example system 1000, the output of physical microphone 801 is coupled to processing component 1002 that includes a first processing path that includes application of a first delay $z_{11}$ and a first gain $A_{11}$ and a second processing path that includes application of a second delay $z_{12}$ and a second gain $A_{12}$. The output of physical microphone 802 is coupled to a third processing path of the processing component 1002 that includes application of a third delay $z_{21}$ and a third gain $A_{21}$ and a fourth processing path that includes application of a fourth delay $z_{22}$ and a fourth gain $A_{22}$. The output of the first and third processing paths is summed to form virtual microphone $V_1$, and the output of the second and fourth processing paths is summed to form virtual microphone $V_2$.

Figure 11:
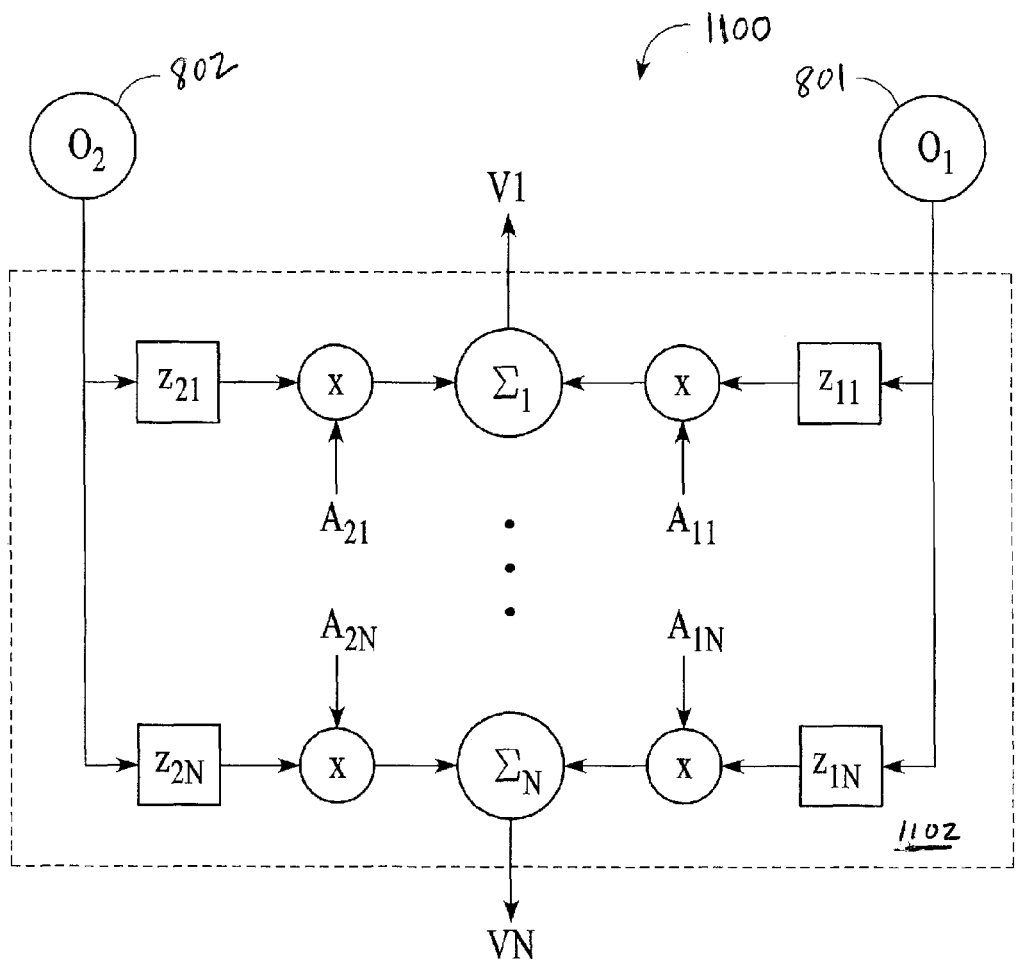
FIG. 11 is a block diagram for a DOMA including two physical microphones configured to form N virtual microphones $V_1$ through $V_N$, where N is any number greater than one, under an embodiment.

As described in detail below, varying the magnitude and sign of the delays and gains of the processing paths leads to a wide variety of virtual microphones (VMs), also referred to herein as virtual directional microphones, can be realized. While the processing component 1002 described in this example includes four processing paths generating two virtual microphones or microphone signals, the embodiment is not so limited. For example, FIG. 11 is a block diagram for a DOMA 1100 including two physical microphones configured to form N virtual microphones $V_1$ through $V_N$, where N is any number greater than one, under an embodiment. Thus, the DOMA can include a processing component 1102 having any number of processing paths as appropriate to form a number N of virtual microphones.

The DOMA of an embodiment can be coupled or connected to one or more remote devices. In a system configuration, the DOMA outputs signals to the remote devices. The remote devices include, but are not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces.

Furthermore, the DOMA of an embodiment can be a component or subsystem integrated with a host device. In this system configuration, the DOMA outputs signals to components or subsystems of the host device. The host device includes, but is not limited to, at least one of cellular telephones, satellite telephones, portable telephones, wireline telephones, Internet telephones, wireless transceivers, wireless communication radios, personal digital assistants (PDAs), personal computers (PCs), headset devices, head-worn devices, and earpieces.

Figure 12:
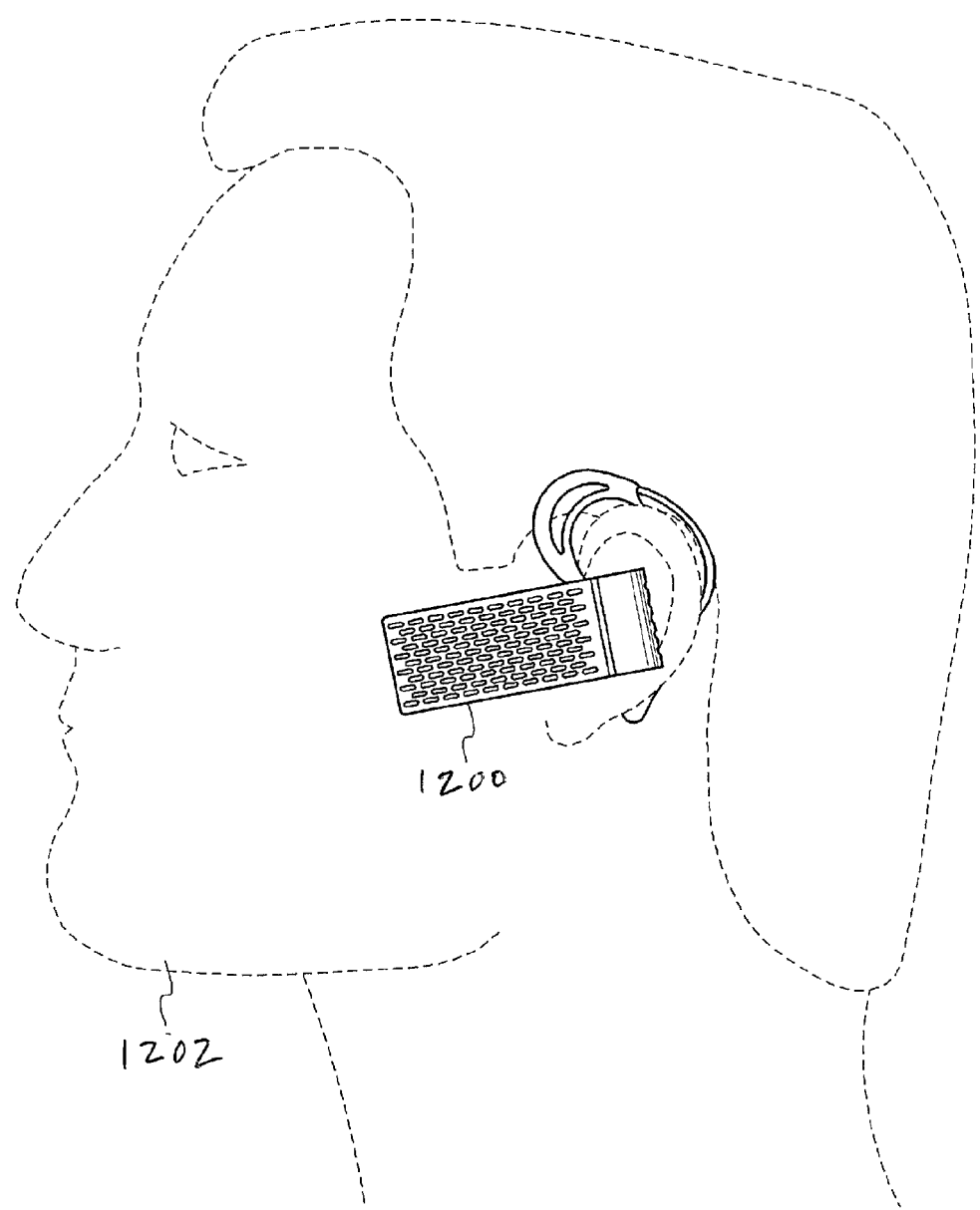
FIG. 12 is an example of a headset or head-worn device that includes the DOMA, as described herein, under an embodiment.

As an example, FIG. 12 is an example of a headset or head-worn device 1200 that includes the DOMA, as described herein, under an embodiment. The headset 1200 of an embodiment includes a housing having two areas or receptacles (not shown) that receive and hold two microphones (e.g., $O_1$ and $O_2$). The headset 1200 is generally a device that can be worn by a speaker 1202, for example, a headset or earpiece that positions or holds the microphones in the vicinity of the speaker's mouth. The headset 1200 of an embodiment places a first physical microphone (e.g., physical microphone $O_1$) in a vicinity of a speaker's lips. A second physical microphone (e.g., physical microphone $O_2$) is placed a distance behind the first physical microphone. The distance of an embodiment is in a range of a few centimeters behind the first physical microphone or as described herein (e.g., described with reference to FIGS. 7-11). The DOMA is symmetric and is used in the same configuration or manner as a single close-talk microphone, but is not so limited.

Figure 13:
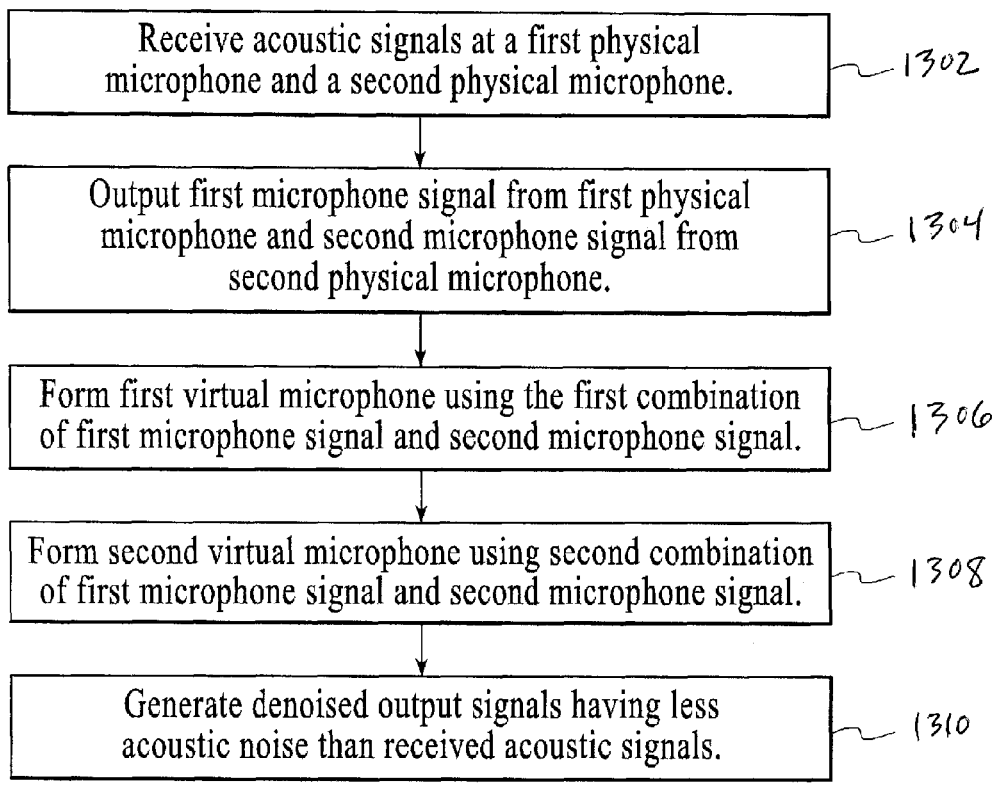
FIG. 13 is a flow diagram for denoising acoustic signals using the DOMA, under an embodiment.

FIG. 13 is a flow diagram for denoising 1300 acoustic signals using the DOMA, under an embodiment. The denoising 1300 begins by receiving 1302 acoustic signals at a first physical microphone and a second physical microphone. In response to the acoustic signals, a first microphone signal is output from the first physical microphone and a second microphone signal is output from the second physical microphone 1304. A first virtual microphone is formed 1306 by generating a first combination of the first microphone signal and the second microphone signal. A second virtual microphone is formed 1308 by generating a second combination of the first microphone signal and the second microphone signal, and the second combination is different from the first combination. The first virtual microphone and the second virtual microphone are distinct virtual directional microphones with substantially similar responses to noise and substantially dissimilar responses to speech. The denoising 1300 generates 1310 output signals by combining signals from the first virtual microphone and the second virtual microphone, and the output signals include less acoustic noise than the acoustic signals.

Figure 14:
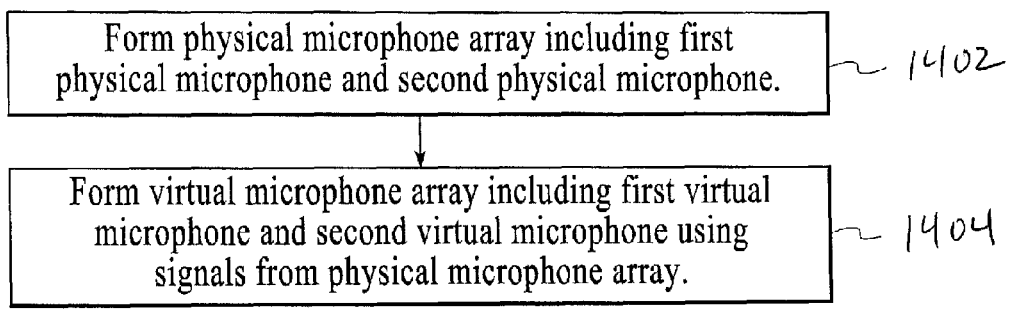
FIG. 14 is a flow diagram for forming the DOMA, under an embodiment.

FIG. 14 is a flow diagram for forming 1400 the DOMA, under an embodiment. Formation 1400 of the DOMA includes forming 1402 a physical microphone array including a first physical microphone and a second physical microphone. The first physical microphone outputs a first microphone signal and the second physical microphone outputs a second microphone signal. A virtual microphone array is formed 1404 comprising a first virtual microphone and a second virtual microphone. The first virtual microphone comprises a first combination of the first microphone signal and the second microphone signal. The second virtual microphone comprises a second combination of the first microphone signal and the second microphone signal, and the second combination is different from the first combination. The virtual microphone array including a single null oriented in a direction toward a source of speech of a human speaker.

The construction of VMs for the adaptive noise suppression system of an embodiment includes substantially similar noise response in $V_1$ and $V_2$. Substantially similar noise response as used herein means that $H_1(z)$ is simple to model and will not change much during speech, satisfying conditions R2 and R4 described above and allowing strong denoising and minimized bleedthrough.

The construction of VMs for the adaptive noise suppression system of an embodiment includes relatively small speech response for $V_2$. The relatively small speech response for $V_2$ means that $H_2(z) \approx 0$, which will satisfy conditions R3 and R5 described above.

The construction of VMs for the adaptive noise suppression system of an embodiment further includes sufficient speech response for $V_1$ so that the cleaned speech will have significantly higher SNR than the original speech captured by $O_1$.

The description that follows assumes that the responses of the omnidirectional microphones $O_1$ and $O_2$ to an identical acoustic source have been normalized so that they have exactly the same response (amplitude and phase) to that source. This can be accomplished using standard microphone array methods (such as frequency-based calibration) well known to those versed in the art.

Referring to the condition that construction of VMs for the adaptive noise suppression system of an embodiment includes relatively small speech response for $V_2$, it is seen that for discrete systems $V_2(z)$ can be represented as:

$$V_2(z) = O_2(z) - z^{-\gamma}\beta O_1(z)$$

where $$\beta = \frac{d_1}{d_2}$$

$$\gamma = \frac{d_2 - d_1}{c} \cdot f_s \text{ (samples)}$$

$$d_1 = \sqrt{d_s^2 - 2d_s d_0 \cos(\theta) + d_0^2}$$

$$d_2 = \sqrt{d_s^2 + 2d_s d_0 \cos(\theta) + d_0^2}$$

The distances $d_1$ and $d_2$ are the distance from $O_1$ and $O_2$ to the speech source (see FIG. 8), respectively, and $\gamma$ is their difference divided by c, the speed of sound, and multiplied by the sampling frequency $f_s$. Thus $\gamma$ is in samples, but need not be an integer. For non-integer $\gamma$, fractional-delay filters (well known to those versed in the art) may be used.

It is important to note that the β above is not the conventional β used to denote the mixing of VMs in adaptive beamforming; it is a physical variable of the system that depends on the intra-microphone distance $d_0$ (which is fixed) and the distance $d_s$ and angle θ, which can vary. As shown below, for properly calibrated microphones, it is not necessary for the system to be programmed with the exact β3 of the array. Errors of approximately 10-15% in the actual β (i.e. the β used by the algorithm is not the β of the physical array) have been used with very little degradation in quality. The algorithmic value of β may be calculated and set for a particular user or may be calculated adaptively during speech production when little or no noise is present. However, adaptation during use is not required for nominal performance.

Figure 15:
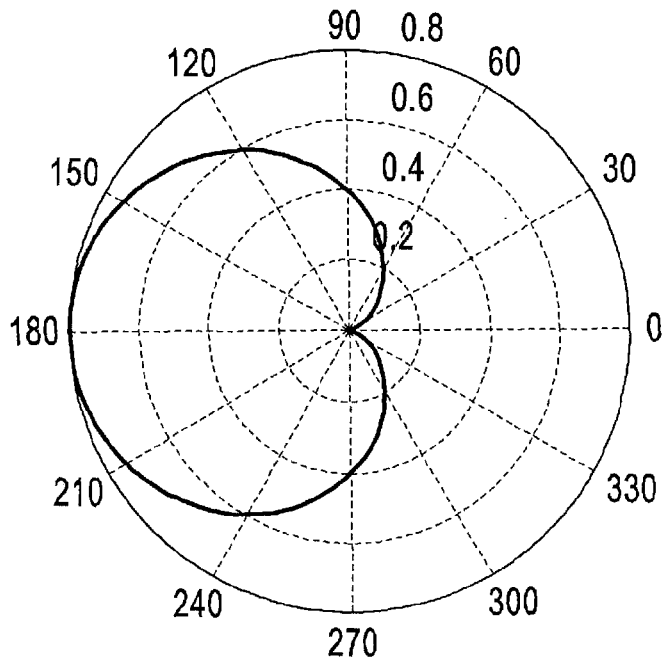
FIG. 15 is a plot of linear response of virtual microphone $V_2$ to a 1 kHz speech source at a distance of 0.1 m, under an embodiment. The null is at 0 degrees, where the speech is normally located.
Figure 16:
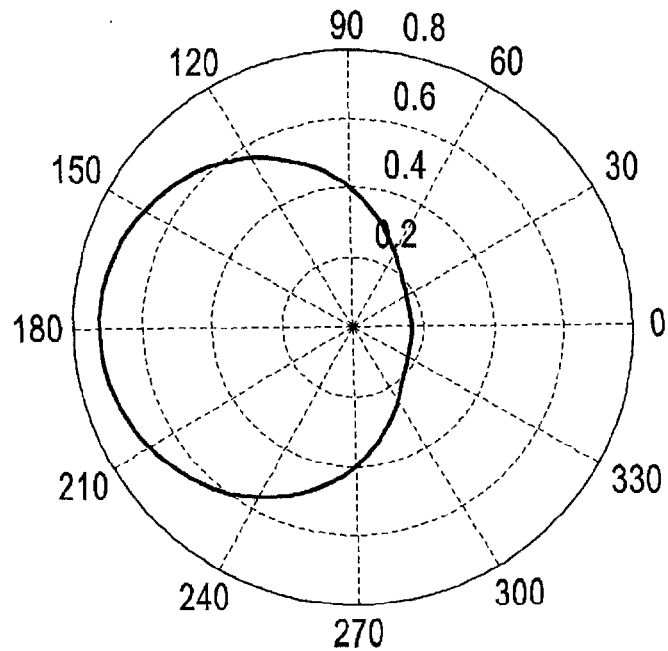
FIG. 16 is a plot of linear response of virtual microphone $V_2$ to a 1 kHz noise source at a distance of 1.0 m, under an embodiment. There is no null and all noise sources are detected.

FIG. 15 is a plot of linear response of virtual microphone $V_2$ with β=0.8 to a 1 kHz speech source at a distance of 0.1 m, under an embodiment. The null in the linear response of virtual microphone $V_2$ to speech is located at 0 degrees, where the speech is typically expected to be located. FIG. 16 is a plot of linear response of virtual microphone $V_2$ with β=0.8 to a 1 kHz noise source at a distance of 1.0 m, under an embodiment. The linear response of $V_2$ to noise is devoid of or includes no null, meaning all noise sources are detected.

The above formulation for $V_2(z)$ has a null at the speech location and will therefore exhibit minimal response to the speech. This is shown in FIG. 15 for an array with $d_0$=10.7 mm and a speech source on the axis of the array (θ=0) at cm (β=0.8). Note that the speech null at zero degrees is not present for noise in the far field for the same microphone, as shown in FIG. 16 with a noise source distance of approximately 1 meter. This insures that noise in front of the user will be detected so that it can be removed. This differs from conventional systems that can have difficulty removing noise in the direction of the mouth of the user.

The $V_1(z)$ can be formulated using the general form for $V_1(z)$:

$$V_1(z) = \alpha_A = O_1(z) \cdot z^{-d_A} - \alpha_B O_2(z) \cdot z^{-d_B}$$

Since $$V_2(z) = O_2(z) - z^{-\gamma} \beta O_1(z)$$

and, since for noise in the forward direction $$O_{2N}(z) = O_{1N}(z) \cdot z^{-\gamma},$$

then $$V_{2N}(z) = O_{1N}(z) \cdot z^{-\gamma} - z^{-\gamma} \beta O_{1N}(z)$$

$$V_{2N}(z) = (1-\beta)(O_{1N}(z) \cdot z^{-\gamma})$$

If this is then set equal to $V_1(z)$ above, the result is $$V_{1N}(z) = \alpha_A O_{1N}(z) \cdot z^{-d_A} - \alpha_B O_{1N}(z) \cdot z^{-\gamma} \cdot z^{-d_B} = (1-\beta)(O_{1N}(z) \cdot z^{-\gamma})$$

thus we may set $$d_A = \gamma$$

$$d_B = 0$$

$$\alpha_A = 1$$

$$\alpha_B = \beta$$

to get $$V_1(z) = O_1(z) \cdot z^{-\gamma} - \beta O_2(z)$$

The definitions for $V_1$ and $V_2$ above mean that for noise $H_1(z)$ is:

$$H_1(z) = \frac{V_1(z)}{V_2(z)} = \frac{-\beta O_2(z) + O_1(z) \cdot z^{-\gamma}}{O_2(z) - z^{-\gamma} \beta O_1(z)}$$

which, if the amplitude noise responses are about the same, has the form of an allpass filter. This has the advantage of being easily and accurately modeled, especially in magnitude response, satisfying R2.

This formulation assures that the noise response will be as similar as possible and that the speech response will be proportional to $(1-\beta^2)$. Since β is the ratio of the distances from $O_1$ and $O_2$ to the speech source, it is affected by the size of the array and the distance from the array to the speech source.

Figure 17:
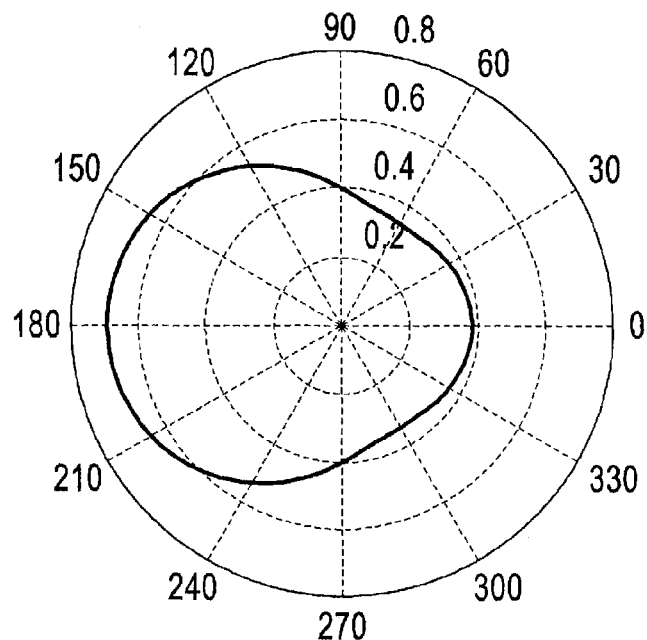
FIG. 17 is a plot of linear response of virtual microphone $V_1$ to a 1 kHz speech source at a distance of 0.1 m, under an embodiment. There is no null and the response for speech is greater than that shown in FIG. 9.

FIG. 17 is a plot of linear response of virtual microphone $V_1$ with β=0.8 to a 1 kHz speech source at a distance of 0.1 m, under an embodiment. The linear response of virtual microphone $V_1$ to speech is devoid of or includes no null and the response for speech is greater than that shown in FIG. 10.

Figure 18:
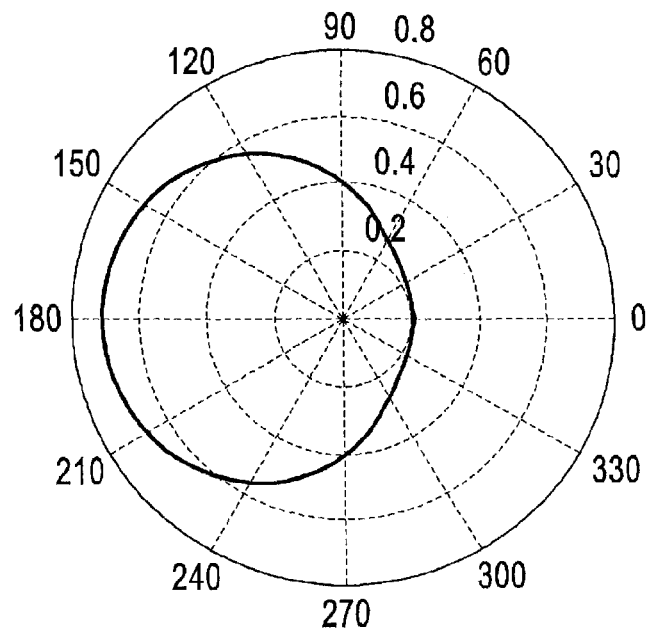
FIG. 18 is a plot of linear response of virtual microphone $V_1$ to a 1 kHz noise source at a distance of 1.0 m, under an embodiment. There is no null and the response is very similar to $V_2$ shown in FIG. 10.

FIG. 18 is a plot of linear response of virtual microphone $V_1$ with β=0.8 to a 1 kHz noise source at a distance of 1.0 m, under an embodiment. The linear response of virtual microphone $V_1$ to noise is devoid of or includes no null and the response is very similar to $V_2$ shown in FIG. 11.

Figure 19:
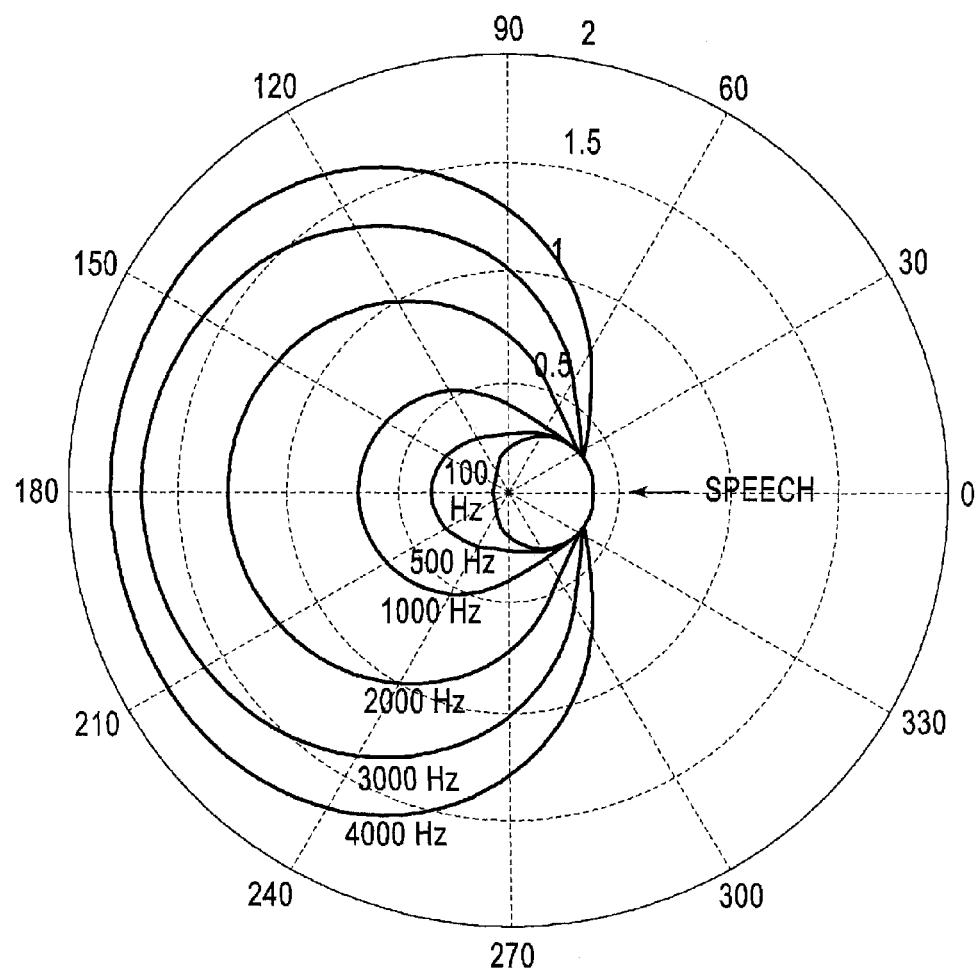
FIG. 19 is a plot of linear response of virtual microphone $V_1$ to a speech source at a distance of 0.1 m for frequencies of 100, 500, 1000, 2000, 3000, and 4000 Hz, under an embodiment.
Figure 20:
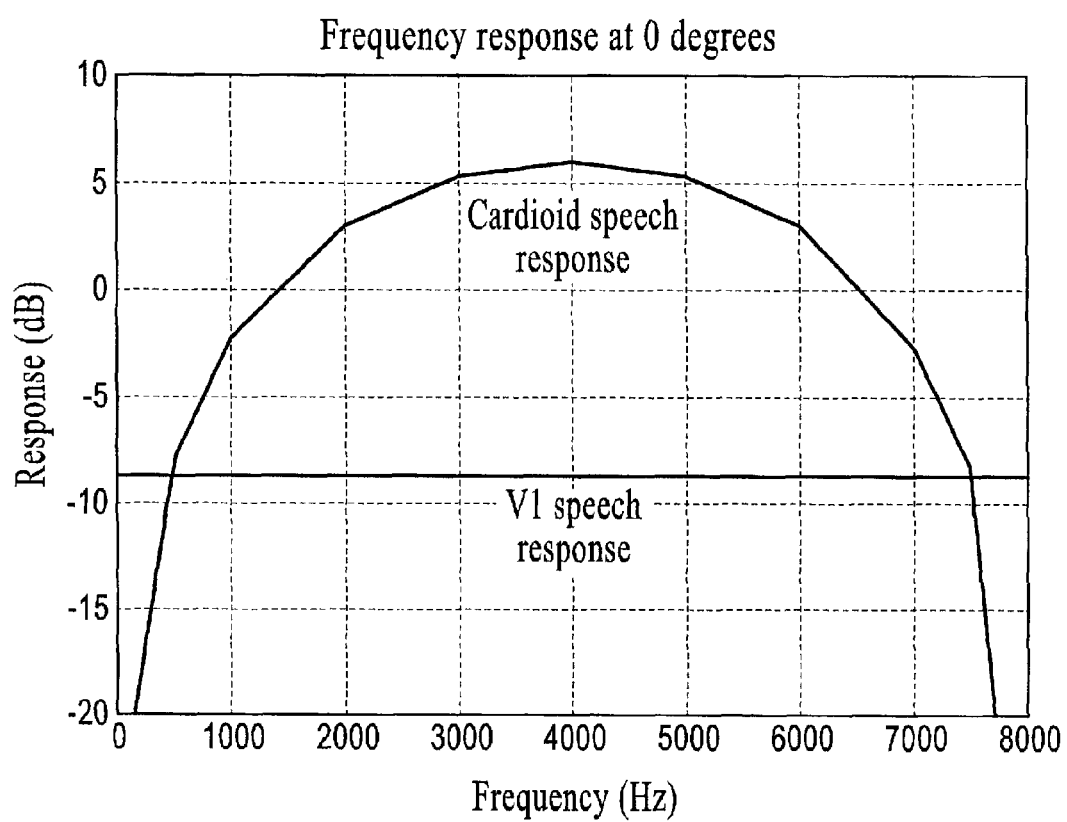
FIG. 20 is a plot showing comparison of frequency responses for speech for the array of an embodiment and for a conventional cardioid microphone.

FIG. 19 is a plot of linear response of virtual microphone $V_1$ with β=0.8 to a speech source at a distance of 0.1 m for frequencies of 100, 500, 1000, 2000, 3000, and 4000 Hz, under an embodiment. FIG. 20 is a plot showing comparison of frequency responses for speech for the array of an embodiment and for a conventional cardioid microphone.

The response of $V_1$ to speech is shown in FIG. 17, and the response to noise in FIG. 18. Note the difference in speech response compared to $V_2$ shown in FIG. 15 and the similarity of noise response shown in FIG. 16. Also note that the orientation of the speech response for $V_1$ shown in FIG. 17 is completely opposite the orientation of conventional systems, where the main lobe of response is normally oriented toward the speech source. The orientation of an embodiment, in which the main lobe of the speech response of $V_1$ is oriented away from the speech source, means that the speech sensitivity of $V_1$ is lower than a normal directional microphone but is flat for all frequencies within approximately +−30 degrees of the axis of the array, as shown in FIG. 19. This flatness of response for speech means that no shaping postfilter is needed to restore omnidirectional frequency response. This does come at a price—as shown in FIG. 20, which shows the speech response of $V_1$ with β=0.8 and the speech response of a cardioid microphone. The speech response of $V_1$ is approximately 0 to −13 dB less than a normal directional microphone between approximately 500 and 7500 Hz and approximately 0 to 10+dB greater than a directional microphone below approximately 500 Hz and above 7500 Hz for a sampling frequency of approximately 16000 Hz. However, the superior noise suppression made possible using this system more than compensates for the initially poorer SNR.

It should be noted that FIGS. 15-18 assume the speech is located at approximately 0 degrees and approximately 10 cm, β=0.8, and the noise at all angles is located approximately 1.0 meter away from the midpoint of the array. Generally, the noise distance is not required to be 1 m or more, but the denoising is the best for those distances. For distances less than approximately 1 m, denoising will not be as effective due to the greater dissimilarity in the noise responses of $V_1$ and $V_2$. This has not proven to be an impediment in practical use—in fact, it can be seen as a feature. Any "noise" source that is ~10 cm away from the earpiece is likely to be desired to be captured and transmitted.

The speech null of $V_2$ means that the VAD signal is no longer a critical component. The VAD's purpose was to ensure that the system would not train on speech and then subsequently remove it, resulting in speech distortion. If, however, $V_2$ contains no speech, the adaptive system cannot train on the speech and cannot remove it. As a result, the system can denoise all the time without fear of devoicing, and the resulting clean audio can then be used to generate a VAD signal for use in subsequent single-channel noise suppression algorithms such as spectral subtraction. In addition, constraints on the absolute value of $H_1(z)$ (i.e. restricting it to absolute values less than two) can keep the system from fully training on speech even if it is detected. In reality, though, speech can be present due to a mis-located $V_2$ null and/or echoes or other phenomena, and a VAD sensor or other acoustic-only VAD is recommended to minimize speech distortion.

Depending on the application, β and γ may be fixed in the noise suppression algorithm or they can be estimated when the algorithm indicates that speech production is taking place in the presence of little or no noise. In either case, there may be an error in the estimate of the actual β and γ of the system. The following description examines these errors and their effect on the performance of the system. As above, "good performance" of the system indicates that there is sufficient denoising and minimal devoicing.

The effect of an incorrect $\beta$ and $\gamma$ on the response of $V_1$ and $V_2$ can be seen by examining the definitions above:

$$V_1(z) = O_1(z) \cdot z^{-\gamma_T} - \beta_T O_2(z)$$

$$V_2(z) = O_2(z) - z^{-\gamma_T} \beta_T O_1(z)$$

where $\beta_T$ and $\gamma_T$ denote the theoretical estimates of $\beta$ and $\gamma$ used in the noise suppression algorithm. In reality, the speech response of $O_2$ is $$O_{2S}(z) = \beta_R O_{1S}(z) \cdot z^{-\gamma_R}$$

where $\beta_R$ and $\gamma_R$ denote the real $\beta$ and $\gamma$ of the physical system. The differences between the theoretical and actual values of $\beta$ and $\gamma$ can be due to mis-location of the speech source (it is not where it is assumed to be) and/or a change in air temperature (which changes the speed of sound). Inserting the actual response of $O_2$ for speech into the above equations for $V_1$ and $V_2$ yields $$V_{1S}(z) = O_{1S}(z)[z^{-\gamma_T} - \beta_T \beta_R z^{-\gamma_R}]$$

$$V_{2S}(z) = O_{1S}(z)[\beta_R z^{-\gamma_R} - \beta_T z^{-\gamma_T}]$$

If the difference in phase is represented by $$\gamma_R = \gamma_T + \gamma_D$$

And the difference in amplitude as $$\beta_R = B\beta_T$$

then $$V_{1S}(z) = O_{1S}(z) z^{-\gamma_T}[1 - B\beta_T^2 z^{-\gamma_D}]$$

$$V_{2S}(z) = \beta_T O_{1S}(z) z^{-\gamma_T}[B z^{-\gamma_D} - 1] \quad \text{Eq. 5}$$

Figure 21:
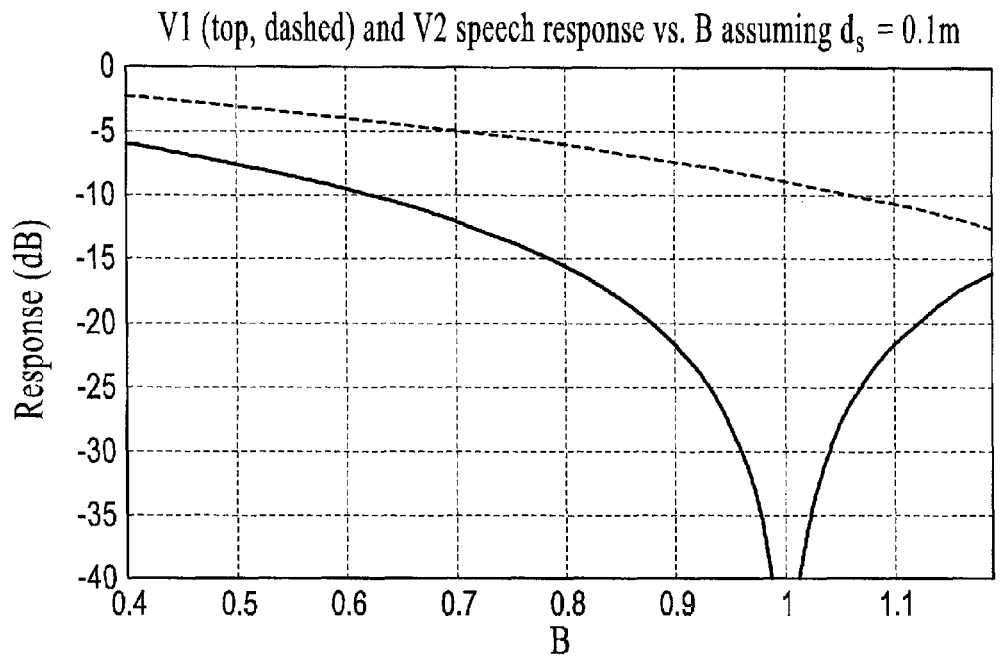
FIG. 21 is a plot showing speech response for $V_1$ (top, dashed) and $V_2$ (bottom, solid) versus B with $d_s$ assumed to be 0.1 m, under an embodiment. The spatial null in $V_2$ is relatively broad.
Figure 22:
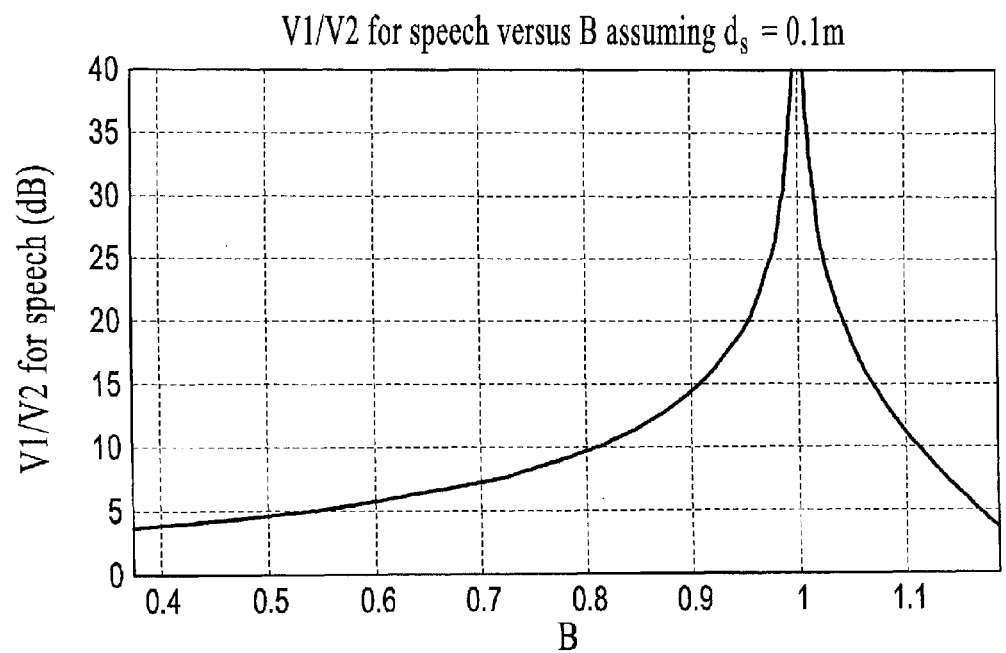
FIG. 22 is a plot showing a ratio of $V_1/V_2$ speech responses shown in FIG. 10 versus B, under an embodiment. The ratio is above 10 dB for all 0.8<B <1.1. This means that the physical β of the system need not be exactly modeled for good performance.
Figure 23:
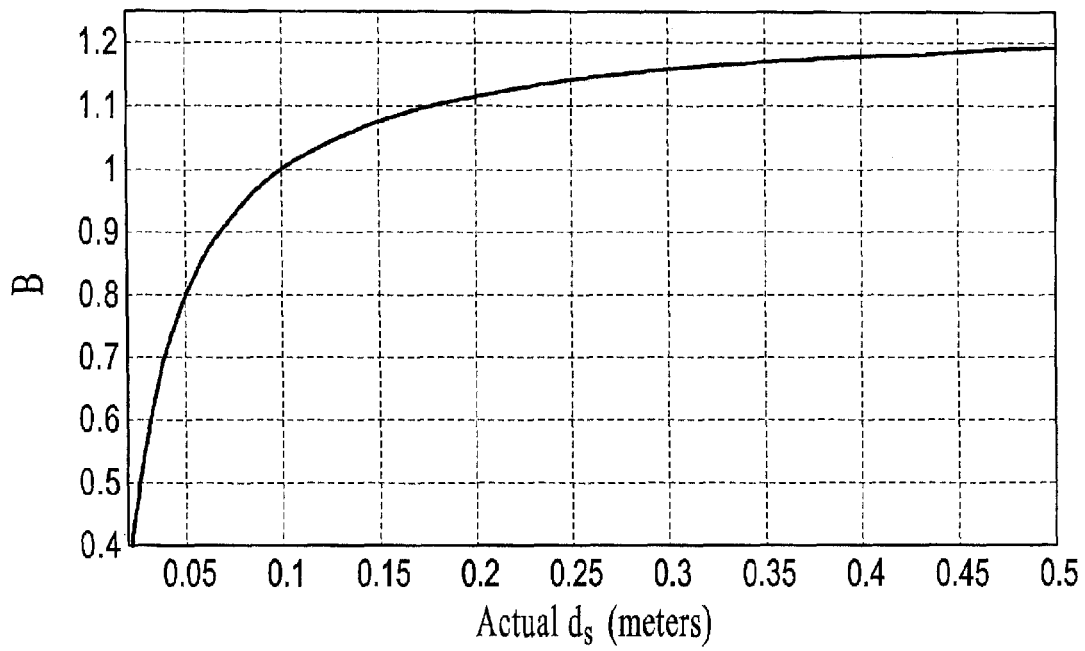
FIG. 23 is a plot of B versus actual $d_s$ assuming that $d_s$=10 cm and theta=0, under an embodiment.
Figure 24:
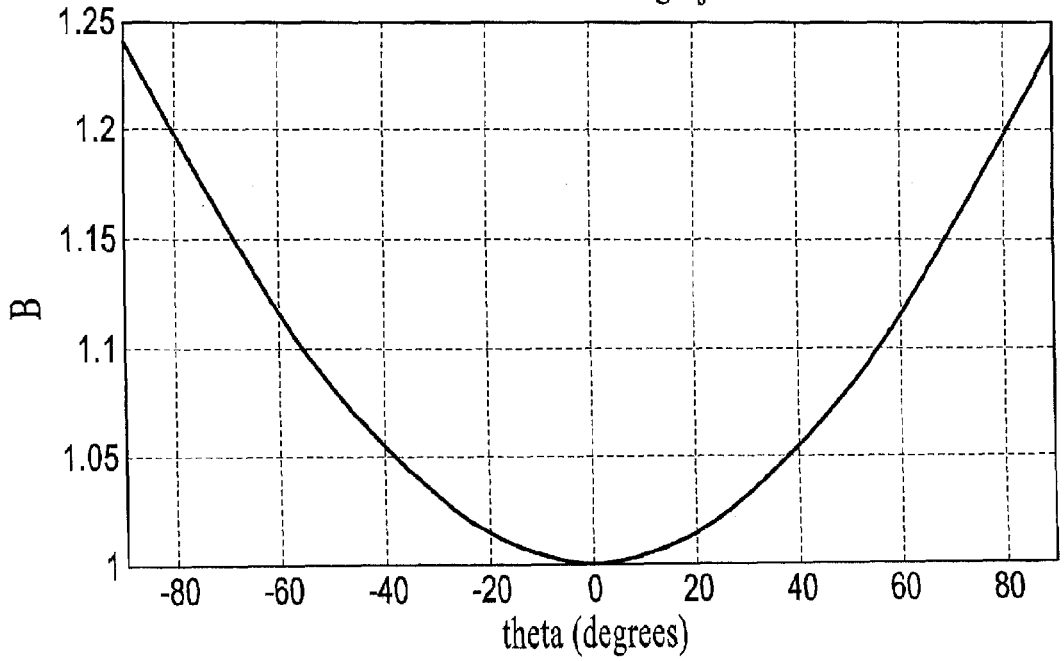
FIG. 24 is a plot of B versus theta with $d_s$=10 cm and assuming $d_s$=10 cm, under an embodiment.

The speech cancellation in $V_2$ (which directly affects the degree of devoicing) and the speech response of $V_1$ will be dependent on both B and D. An examination of the case where D=0 follows. FIG. 21 is a plot showing speech response for $V_1$ (top, dashed) and $V_2$ (bottom, solid) versus B with $d_s$ assumed to be 0.1 m, under an embodiment. This plot shows the spatial null in $V_2$ to be relatively broad. FIG. 22 is a plot showing a ratio of $V_1/V_2$ speech responses shown in FIG. 16 versus B, under an embodiment. The ratio of $V_1/V_2$ is above 10 dB for all 0.8<B<1.1, and this means that the physical $\beta$ of the system need not be exactly modeled for good performance. FIG. 23 is a plot of B versus actual $d_s$ assuming that $d_s$=10 cm and theta=0, under an embodiment. FIG. 24 is a plot of B versus theta with $d_s$=10 cm and assuming $d_s$=10 cm, under an embodiment.

In FIG. 21, the speech response for $V_1$ (upper, dashed) and $V_2$ (lower, solid) compared to $O_1$ is shown versus B when $d_s$ is thought to be approximately 10 cm and $\theta$=0. When B=1, the speech is absent from $V_2$. In FIG. 22, the ratio of the speech responses in FIG. 16 is shown. When 0.8<B<1.1, the $V_1/V_2$ ratio is above approximately 10 dB—enough for good performance. Clearly, if D=0, B can vary significantly without adversely affecting the performance of the system. Again, this assumes that calibration of the microphones so that both their amplitude and phase response is the same for an identical source has been performed.

The B factor can be non-unity for a variety of reasons. Either the distance to the speech source or the relative orientation of the array axis and the speech source or both can be different than expected. If both distance and angle mismatches are included for B, then $$B = \frac{\beta_R}{\beta_T} \frac{\sqrt{d_{SR}^2 - 2d_{SR}d_0\cos(\theta_R) + d_0^2}}{\sqrt{d_{SR}^2 + 2d_{SR}d_0\cos(\theta_R) + d_0^2}} \cdot \frac{\sqrt{d_{ST}^2 + 2d_{ST}d_0\cos(\theta_T) + d_0^2}}{\sqrt{d_{ST}^2 - 2d_{ST}d_0\cos(\theta_T) + d_0^2}}$$

where again the T subscripts indicate the theorized values and R the actual values. In FIG. 23, the factor B is plotted with respect to the actual $d_s$ with the assumption that $d_s$=10 cm and $\theta$=0. So, if the speech source in on-axis of the array, the actual distance can vary from approximately 5 cm to 18 cm without significantly affecting performance—a significant amount. Similarly, FIG. 24 shows what happens if the speech source is located at a distance of approximately cm but not on the axis of the array. In this case, the angle can vary up to approximately +−55 degrees and still result in a B less than 1.1, assuring good performance. This is a significant amount of allowable angular deviation. If there is both angular and distance errors, the equation above may be used to determine if the deviations will result in adequate performance. Of course, if the value for $\beta_T$ is allowed to update during speech, essentially tracking the speech source, then B can be kept near unity for almost all configurations.

An examination follows of the case where B is unity but D is nonzero. This can happen if the speech source is not where it is thought to be or if the speed of sound is different from what it is believed to be. From Equation 5 above, it can be sees that the factor that weakens the speech null in $V_2$ for speech is $$N(z) = Bz^{-\gamma_D} - 1$$

or in the continuous s domain $$N(s) = Be^{-Ds} - 1.$$

Figure 25:
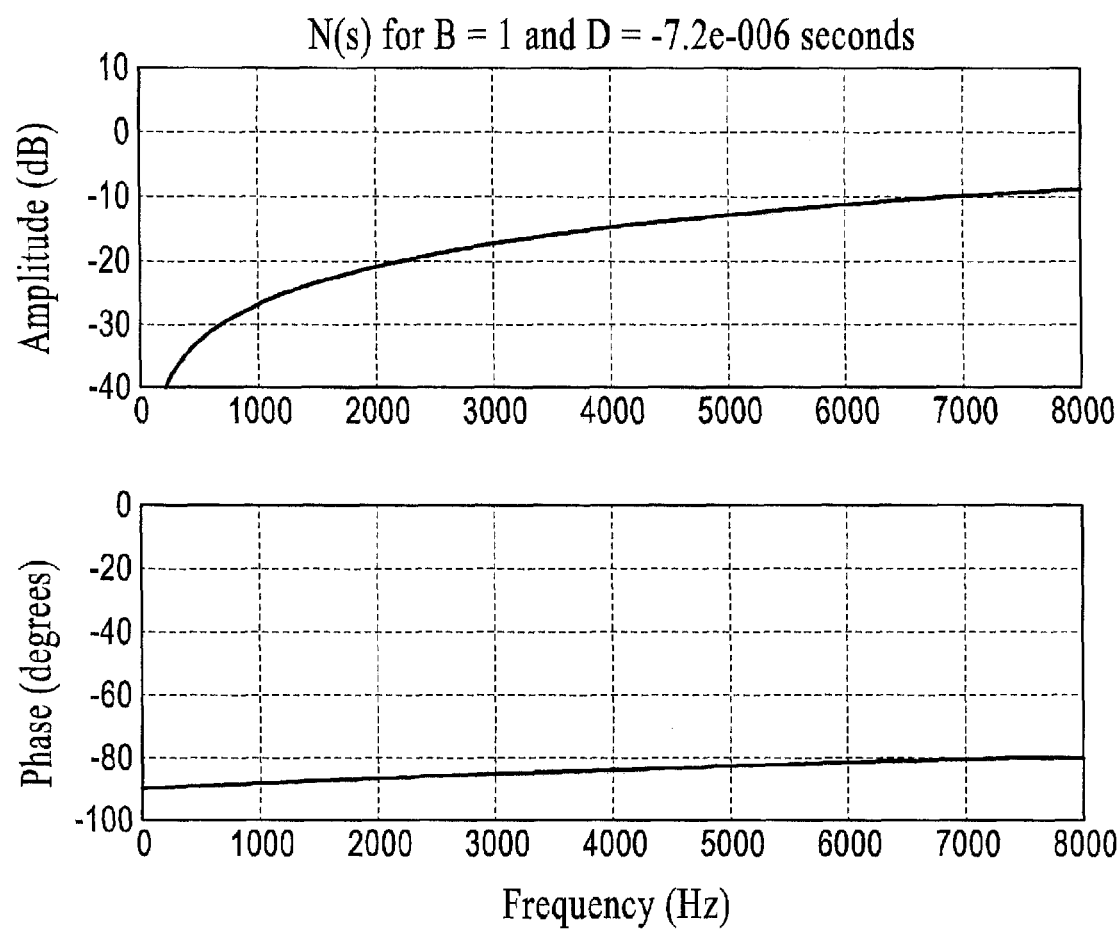
FIG. 25 is a plot of amplitude (top) and phase (bottom) response of N(s) with B=1 and D=−7.2 μsec, under an embodiment. The resulting phase difference clearly affects high frequencies more than low.

Since $\gamma$ is the time difference between arrival of speech at $V_1$ compared to $V_2$, it can be errors in estimation of the angular location of the speech source with respect to the axis of the array and/or by temperature changes. Examining the temperature sensitivity, the speed of sound varies with temperature as $$c = 331.3 + (0.606T) \text{ m/s}$$

where T is degrees Celsius. As the temperature decreases, the speed of sound also decreases. Setting 20 C as a design temperature and a maximum expected temperature range to −40 C to +60 C (−40 F to 140 F). The design speed of sound at 20 C is 343 m/s and the slowest speed of sound will be 307 m/s at −40 C with the fastest speed of sound 362 m/s at 60 C. Set the array length ($2d_0$) to be 21 mm. For speech sources on the axis of the array, the difference in travel time for the largest change in the speed of sound is $$\nabla t_{MAX} = \frac{d}{c_1} - \frac{d}{c_2} = 0.021 \text{ m}\left(\frac{1}{343 \text{ m/s}} - \frac{1}{307 \text{ m/s}}\right) = -7.2 \times 10^{-6} \text{ sec}$$

or approximately 7 microseconds. The response for N(s) given B=1 and D=7.2 sec is shown in FIG. 25. FIG. 25 is a plot of amplitude (top) and phase (bottom) response of N(s) with B=1 and D=−7.2 sec, under an embodiment. The resulting phase difference clearly affects high frequencies more than low. The amplitude response is less than approximately −10 dB for all frequencies less than 7 kHz and is only about −9 dB at 8 kHz. Therefore, assuming B=1, this system would likely perform well at frequencies up to approximately 8 kHz. This means that a properly compensated system would work well even up to 8 kHz in an exceptionally wide (e.g., −40 C to 80 C) temperature range. Note that the phase mismatch due to the delay estimation error causes N(s) to be much larger at high frequencies compared to low.

Figure 26:
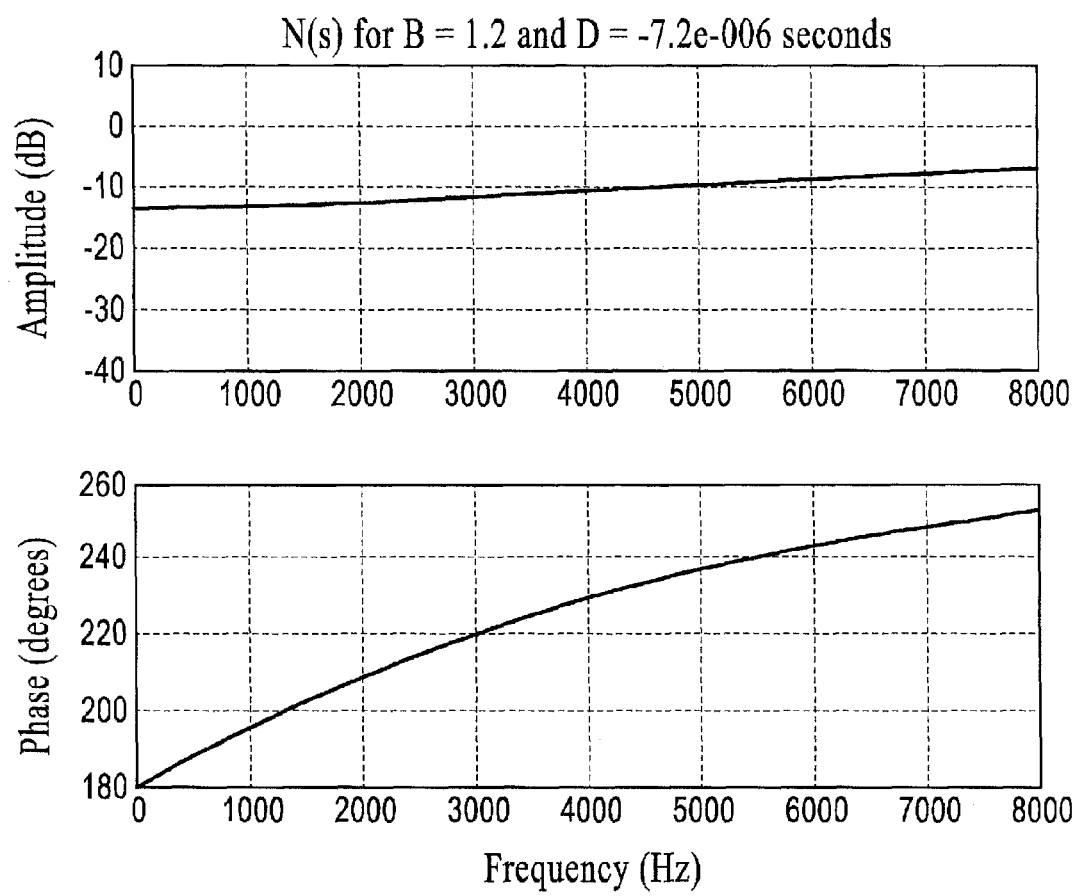
FIG. 26 is a plot of amplitude (top) and phase (bottom) response of N(s) with B=1.2 and D=−7.2 sec, under an embodiment. Non-unity B affects the entire frequency range.

If B is not unity, the robustness of the system is reduced since the effect from non-unity B is cumulative with that of non-zero D. FIG. 26 shows the amplitude and phase response for B=1.2 and D=7.2 sec. FIG. 26 is a plot of amplitude (top) and phase (bottom) response of N(s) with B=1.2 and D=−7.2 µsec, under an embodiment. Non-unity B affects the entire frequency range. Now N(s) is below approximately −10 dB only for frequencies less than approximately 5 kHz and the response at low frequencies is much larger. Such a system would still perform well below 5 kHz and would only suffer from slightly elevated devoicing for frequencies above 5 kHz. For ultimate performance, a temperature sensor may be integrated into the system to allow the algorithm to adjust $\gamma_T$ as the temperature varies.

Another way in which D can be non-zero is when the speech source is not where it is believed to be—specifically, the angle from the axis of the array to the speech source is incorrect. The distance to the source may be incorrect as well, but that introduces an error in B, not D.

Referring to FIG. 8, it can be seen that for two speech sources (each with their own $d_s$ and $\theta$) that the time difference between the arrival of the speech at $O_1$ and the arrival at $O_2$ is $$\Delta t = \frac{1}{c}(d_{12} - d_{11} - d_{22} + d_{21})$$

where $$d_{11} = \sqrt{d_{S1}^2 - 2d_{S1}d_0\cos(\theta_1) + d_0^2}$$

$$d_{12} = \sqrt{d_{S1}^2 - 2d_{S1}d_0\cos(\theta_1) + d_0^2}$$

$$d_{21} = \sqrt{d_{S2}^2 - 2d_{S1}d_0\cos(\theta_1) + d_0^2}$$

$$d_{22} = \sqrt{d_{S2}^2 - 2d_{S1}d_0\cos(\theta_1) + d_0^2}$$

Figure 27:
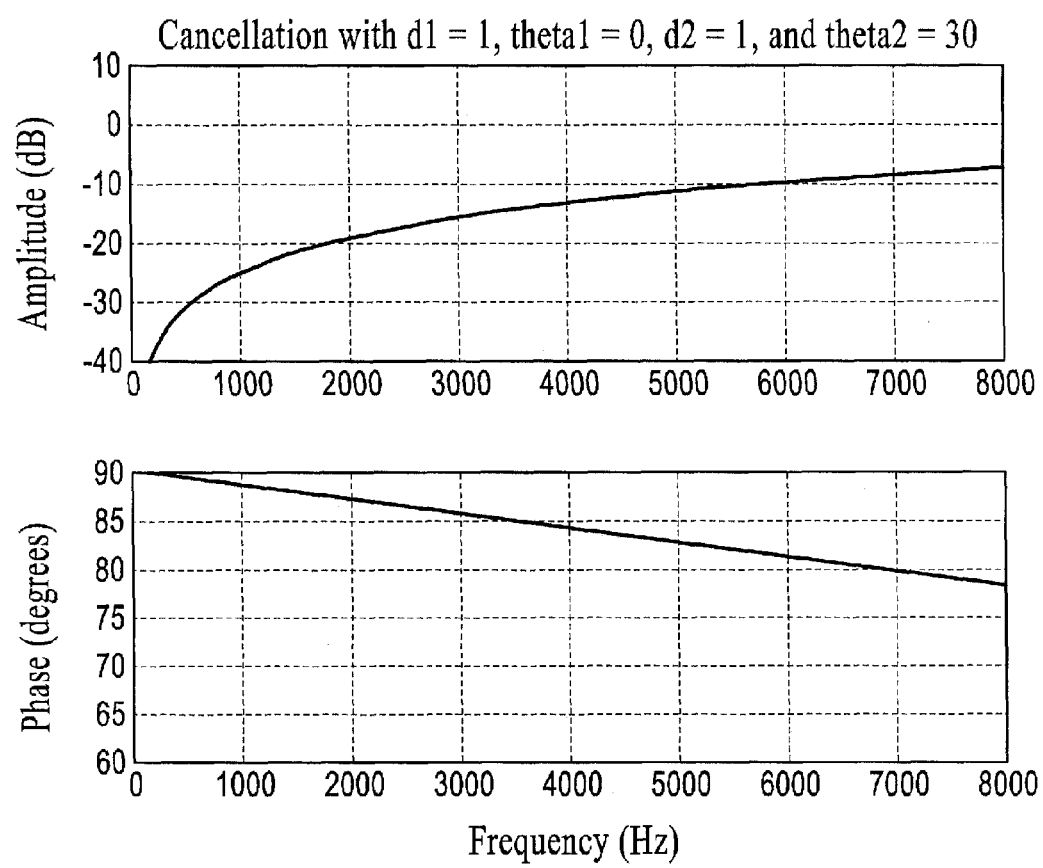
FIG. 27 is a plot of amplitude (top) and phase (bottom) response of the effect on the speech cancellation in $V_2$ due to a mistake in the location of the speech source with q1=0 degrees and q2=30 degrees, under an embodiment. The cancellation remains below −10 dB for frequencies below 6 kHz.
Figure 28:
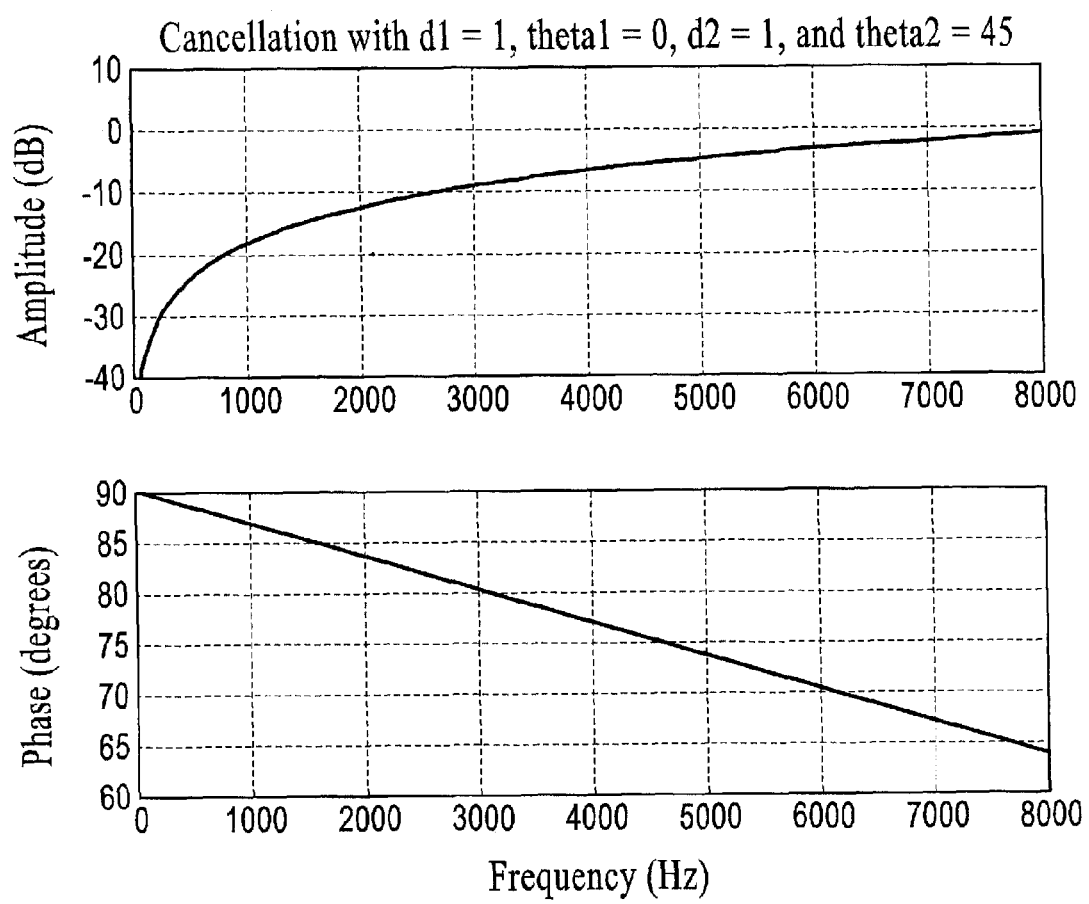
FIG. 28 is a plot of amplitude (top) and phase (bottom) response of the effect on the speech cancellation in $V_2$ due to a mistake in the location of the speech source with q1=0 degrees and q2=45 degrees, under an embodiment. The cancellation is below −10 dB only for frequencies below about 2.8 kHz and a reduction in performance is expected.

The $V_2$ speech cancellation response for $\theta_1$=0 degrees and $\theta_2$=30 degrees and assuming that B=1 is shown in FIG. 27. FIG. 27 is a plot of amplitude (top) and phase (bottom) response of the effect on the speech cancellation in $V_2$ due to a mistake in the location of the speech source with q1=0 degrees and q2=30 degrees, under an embodiment. Note that the cancellation is still below −10 dB for frequencies below 6 kHz. The cancellation is still below approximately −10 dB for frequencies below approximately 6 kHz, so an error of this type will not significantly affect the performance of the system. However, if $\theta_2$ is increased to approximately 45 degrees, as shown in FIG. 28, the cancellation is below approximately −10 dB only for frequencies below approximately 2.8 kHz. FIG. 28 is a plot of amplitude (top) and phase (bottom) response of the effect on the speech cancellation in $V_2$ due to a mistake in the location of the speech source with q1=0 degrees and q2=45 degrees, under an embodiment. Now the cancellation is below −10 dB only for frequencies below about 2.8 kHz and a reduction in performance is expected. The poor $V_2$ speech cancellation above approximately 4 kHz may result in significant devoicing for those frequencies.

The description above has assumed that the microphones $O_1$ and $O_2$ were calibrated so that their response to a source located the same distance away was identical for both amplitude and phase. This is not always feasible, so a more practical calibration procedure is presented below. It is not as accurate, but is much simpler to implement. Begin by defining a filter $\alpha(z)$ such that:

$$O_{1C}(z) = \alpha(z)O_{2C}(z)$$

where the "C" subscript indicates the use of a known calibration source. The simplest one to use is the speech of the user. Then $$O_{1S}(z) = \alpha(z)O_{2C}(z)$$

The microphone definitions are now:

$$V_1(z) = O_1(z) \cdot z^{-\gamma} - \beta(z)\alpha(z)O_2(z)$$

$$V_2(z) = \alpha(z)O_2(z) - z^{-\gamma\beta(z)}O_1(z)$$

The $\beta$ of the system should be fixed and as close to the real value as possible. In practice, the system is not sensitive to changes in $\beta$ and errors of approximately +−5% are easily tolerated. During times when the user is producing speech but there is little or no noise, the system can train $\alpha(z)$ to remove as much speech as possible. This is accomplished by:

1. Construct an adaptive system as shown in FIG. 7 with $\beta O_{1S}(z)z^{-\gamma}$ in the "MIC1" position, $O_{2S}(z)$ in the "MIC2" position, and $\alpha(z)$ in the $H_1(z)$ position.
2. During speech, adapt $\alpha(z)$ to minimize the residual of the system.
3. Construct $V_1(z)$ and $V_2(z)$ as above.

A simple adaptive filter can be used for $a(z)$ so that only the relationship between the microphones is well modeled. The system of an embodiment trains only when speech is being produced by the user. A sensor like the SSM is invaluable in determining when speech is being produced in the absence of noise. If the speech source is fixed in position and will not vary significantly during use (such as when the array is on an earpiece), the adaptation should be infrequent and slow to update in order to minimize any errors introduced by noise present during training.

The above formulation works very well because the noise (far-field) responses of $V_1$ and $V_2$ are very similar while the speech (near-field) responses are very different. However, the formulations for $V_1$ and $V_2$ can be varied and still result in good performance of the system as a whole. If the definitions for $V_1$ and $V_2$ are taken from above and new variables B1 and B2 are inserted, the result is:

$$V_1(z) = O_1(z) \cdot z^{-\gamma T} - B_1\beta_T O_2(z)$$

$$V_2(z) = O_2 z) - z^{-\gamma T} B_2 \beta_T O_1(z)$$

where B1 and B2 are both positive numbers or zero. If B1 and B2 are set equal to unity, the optimal system results as described above. If B1 is allowed to vary from unity, the response of $V_1$ is affected. An examination of the case where B2 is left at 1 and B1 is decreased follows. As B1 drops to approximately zero, $V_1$ becomes less and less directional, until it becomes a simple omnidirectional microphone when B1=0, Since B2=1, a speech null remains in $V_2$, so very different speech responses remain for $V_1$ and $V_2$. However, the noise responses are much less similar, so denoising will not be as effective. Practically, though, the system still performs well. B1 can also be increased from unity and once again the system will still denoise well, just not as well as with B1=1.

If B2 is allowed to vary, the speech null in $V_2$ is affected. As long as the speech null is still sufficiently deep, the system will still perform well. Practically values down to approximately B2=0.6 have shown sufficient performance, but it is recommended to set B2 close to unity for optimal performance.

Similarly, variables E and A may be introduced so that:

$$V_1(z)=(\epsilon-\beta)O_{2N}(z)+(1+\Delta)O_{1N}(z)z^{-\gamma}$$

$$V_2(z)=(1+\Delta)O_{2N}(z)+(\epsilon-\beta)O_{1N}(z)z^{-\gamma}$$

This formulation also allows the virtual microphone responses to be varied but retains the all-pass characteristic of $H_1(z)$.

In conclusion, the system is flexible enough to operate well at a variety of B1 values, but B2 values should be close to unity to limit devoicing for best performance.

Figure 29:
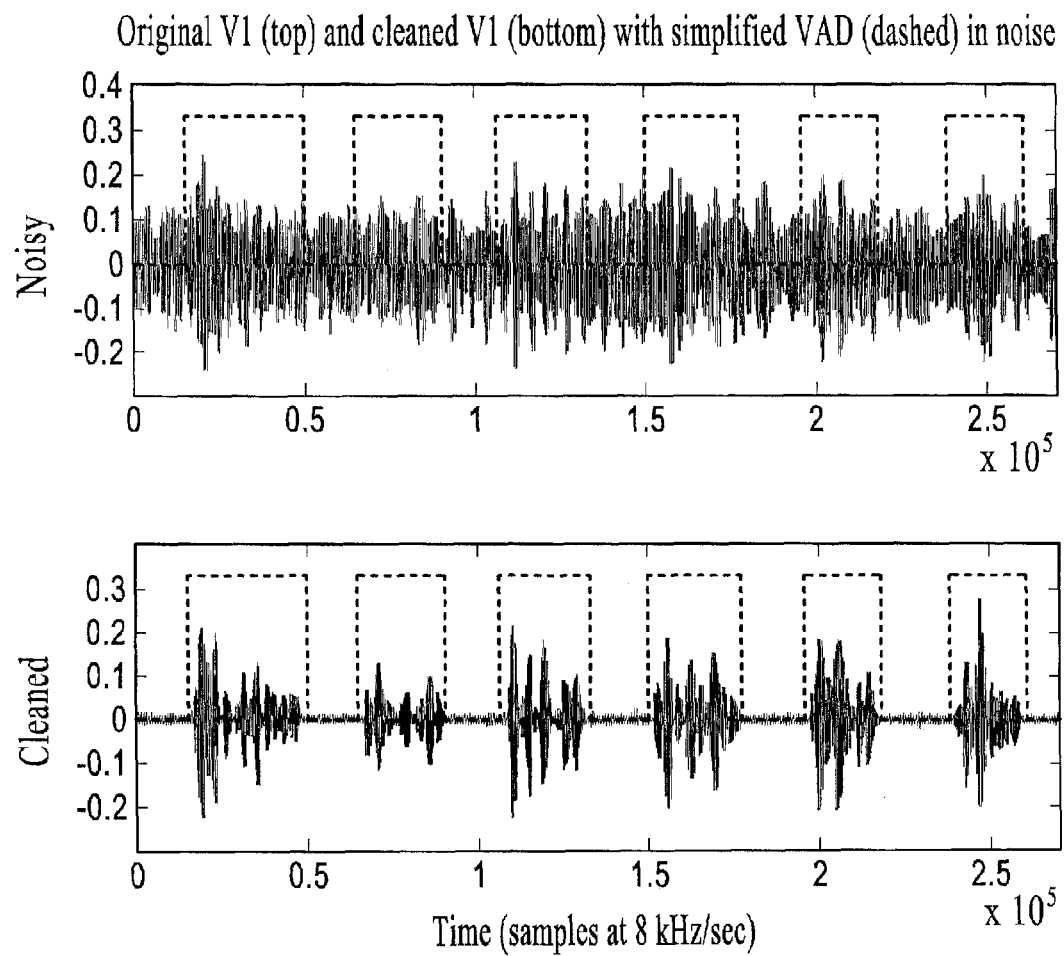
FIG. 29 shows experimental results for a $2d_0$=19 mm array using a linear β of 0.83 on a Bruel and Kjaer Head and Torso Simulator (HATS) in very loud (~85 dBA) music/speech noise environment, under an embodiment. The noise has been reduced by about 25 dB and the speech hardly affected, with no noticeable distortion.

Experimental results for a $2d_0=19$ mm array using a linear $\beta$ of 0.83 and B1=B2=1 on a Bruel and Kjaer Head and Torso Simulator (HATS) in very loud (~85 dBA) music/speech noise environment are shown in FIG. 29. The alternate microphone calibration technique discussed above was used to calibrate the microphones. The noise has been reduced by about 25 dB and the speech hardly affected, with no noticeable distortion. Clearly the technique significantly increases the SNR of the original speech, far outperforming conventional noise suppression techniques.

The DOMA can be a component of a single system, multiple systems, and/or geographically separate systems. The DOMA can also be a subcomponent or subsystem of a single system, multiple systems, and/or geographically separate systems. The DOMA can be coupled to one or more other components (not shown) of a host system or a system coupled to the host system.

One or more components of the DOMA and/or a corresponding system or application to which the DOMA is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the DOMA can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Embodiments of the DOMA described herein include a microphone array comprising: a first virtual microphone comprising a first combination of a first microphone signal and a second microphone signal, wherein the first microphone signal is generated by a first physical microphone and the second microphone signal is generated by a second physical microphone; and a second virtual microphone comprising a second combination of the first microphone signal and the second microphone signal, wherein the second combination is different from the first combination, wherein the first virtual microphone and the second virtual microphone are distinct virtual directional microphones with substantially similar responses to noise and substantially dissimilar responses to speech.

The first and second physical microphones of an embodiment are omnidirectional.

The first virtual microphone of an embodiment has a first linear response to speech that is devoid of a null, wherein the speech is human speech.

The second virtual microphone of an embodiment has a second linear response to speech that includes a single null oriented in a direction toward a source of the speech.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

The first physical microphone and the second physical microphone of an embodiment are positioned along an axis and separated by a first distance.

A midpoint of the axis of an embodiment is a second distance from a speech source that generates the speech, wherein the speech source is located in a direction defined by an angle relative to the midpoint.

The first virtual microphone of an embodiment comprises the second microphone signal subtracted from the first microphone signal.

The first microphone signal of an embodiment is delayed.

The delay of an embodiment is raised to a power that is proportional to a time difference between arrival of the speech at the first virtual microphone and arrival of the speech at the second virtual microphone.

The delay of an embodiment is raised to a power that is proportional to a sampling frequency multiplied by a quantity equal to a third distance subtracted from a fourth distance, the third distance being between the first physical microphone and the speech source and the fourth distance being between the second physical microphone and the speech source.

The second microphone signal of an embodiment is multiplied by a ratio, wherein the ratio is a ratio of a third distance to a fourth distance, the third distance being between the first physical microphone and the speech source and the fourth distance being between the second physical microphone and the speech source.

The second virtual microphone of an embodiment comprises the first microphone signal subtracted from the second microphone signal.

The first microphone signal of an embodiment is delayed.

The delay of an embodiment is raised to a power that is proportional to a time difference between arrival of the speech at the first virtual microphone and arrival of the speech at the second virtual microphone.

The power of an embodiment is proportional to a sampling frequency multiplied by a quantity equal to a third distance subtracted from a fourth distance, the third distance being between the first physical microphone and the speech source and the fourth distance being between the second physical microphone and the speech source.

The first microphone signal of an embodiment is multiplied by a ratio, wherein the ratio is a ratio of the third distance to the fourth distance.

The single null of an embodiment is located at a distance from at least one of the first physical microphone and the second physical microphone where the source of the speech is expected to be.

The first virtual microphone of an embodiment comprises the second microphone signal subtracted from a delayed version of the first microphone signal.

The second virtual microphone of an embodiment comprises a delayed version of the first microphone signal subtracted from the second microphone signal.

Embodiments of the DOMA described herein include a microphone array comprising: a first virtual microphone formed from a first combination of a first microphone signal and a second microphone signal, wherein the first microphone signal is generated by a first omnidirectional microphone and the second microphone signal is generated by a second omnidirectional microphone; and a second virtual microphone formed from a second combination of the first microphone signal and the second microphone signal, wherein the second combination is different from the first combination; wherein the first virtual microphone has a first linear response to speech that is devoid of a null, wherein the second virtual microphone has a second linear response to speech that has a single null oriented in a direction toward a source of the speech, wherein the speech is human speech.

The first virtual microphone and the second virtual microphone of an embodiment have a linear response to noise that is substantially similar.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

Embodiments of the DOMA described herein include a device comprising: a first microphone outputting a first microphone signal and a second microphone outputting a second microphone signal; and a processing component coupled to the first microphone signal and the second microphone signal, the processing component generating a virtual microphone array comprising a first virtual microphone and a second virtual microphone, wherein the first virtual microphone comprises a first combination of the first microphone signal and the second microphone signal, wherein the second virtual microphone comprises a second combination of the first microphone signal and the second microphone signal, wherein the second combination is different from the first combination, wherein the first virtual microphone and the second virtual microphone have substantially similar responses to noise and substantially dissimilar responses to speech.

Embodiments of the DOMA described herein include a device comprising: a first microphone outputting a first microphone signal and a second microphone outputting a second microphone signal, wherein the first microphone and the second microphone are omnidirectional microphones; and a virtual microphone array comprising a first virtual microphone and a second virtual microphone, wherein the first virtual microphone comprises a first combination of the first microphone signal and the second microphone signal, wherein the second virtual microphone comprises a second combination of the first microphone signal and the second microphone signal, wherein the second combination is different from the first combination, wherein the first virtual microphone and the second virtual microphone are distinct virtual directional microphones.

Embodiments of the DOMA described herein include a device comprising: a first physical microphone generating a first microphone signal; a second physical microphone generating a second microphone signal; and a processing component coupled to the first microphone signal and the second microphone signal, the processing component generating a virtual microphone array comprising a first virtual microphone and a second virtual microphone; wherein the first virtual microphone comprises the second microphone signal subtracted from a delayed version of the first microphone signal; wherein the second virtual microphone comprises a delayed version of the first microphone signal subtracted from the second microphone signal.

The first virtual microphone of an embodiment has a first linear response to speech that is devoid of a null, wherein the speech is human speech.

The second virtual microphone of an embodiment has a second linear response to speech that includes a single null oriented in a direction toward a source of the speech.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

The first physical microphone and the second physical microphone of an embodiment are positioned along an axis and separated by a first distance.

A midpoint of the axis of an embodiment is a second distance from a speech source that generates the speech, wherein the speech source is located in a direction defined by an angle relative to the midpoint.

One or more of the first microphone signal and the second microphone signal of an embodiment is delayed.

The delay of an embodiment is raised to a power that is proportional to a time difference between arrival of the speech at the first virtual microphone and arrival of the speech at the second virtual microphone.

The power of an embodiment is proportional to a sampling frequency multiplied by a quantity equal to a third distance subtracted from a fourth distance, the third distance being between the first physical microphone and the speech source and the fourth distance being between the second physical microphone and the speech source.

One or more of the first microphone signal and the second microphone signal of an embodiment is multiplied by a gain factor.

Embodiments of the DOMA described herein include a sensor comprising: a physical microphone array including a first physical microphone and a second physical microphone, the first physical microphone outputting a first microphone signal and the second physical microphone outputting a second microphone signal; a virtual microphone array comprising a first virtual microphone and a second virtual microphone, the first virtual microphone comprising a first combination of the first microphone signal and the second microphone signal, the second virtual microphone comprising a second combination of the first microphone signal and the second microphone signal, wherein the second combination is different from the first combination; the virtual microphone array including a single null oriented in a direction toward a source of speech of a human speaker.

The first virtual microphone of an embodiment has a first linear response to speech that is devoid of a null, wherein the second virtual microphone has a second linear response to speech that includes the single null.

The first virtual microphone and the second virtual microphone of an embodiment have a linear response to noise that is substantially similar.

The single null of an embodiment is a region of the second linear response to speech having a measured response level that is lower than the measured response level of any other region of the second linear response.

The second linear response to speech of an embodiment includes a primary lobe oriented in a direction away from the source of the speech.

The primary lobe of an embodiment is a region of the second linear response having a measured response level that is greater than the measured response level of any other region of the second linear response.

The single null of an embodiment is located at a distance from the physical microphone array where the source of the speech is expected to be.

Embodiments of the DOMA described herein include a device comprising: a headset including at least one loudspeaker, wherein the headset attaches to a region of a human head; a microphone array connected to the headset, the microphone array including a first physical microphone outputting a first microphone signal and a second physical microphone outputting a second microphone signal; and a processing component coupled to the microphone array and generating a virtual microphone array comprising a first virtual microphone and a second virtual microphone, the first virtual microphone comprising a first combination of the first microphone signal and the second microphone signal, the second virtual microphone comprising a second combination of the first microphone signal and the second microphone signal, wherein the second combination is different from the first combination, wherein the first virtual microphone and the second virtual microphone have substantially similar responses to noise and substantially dissimilar responses to speech.

The first and second physical microphones of an embodiment are omnidirectional.

The first virtual microphone of an embodiment has a first linear response to speech that is devoid of a null, wherein the speech is human speech.

The second virtual microphone of an embodiment has a second linear response to speech that includes a single null oriented in a direction toward a source of the speech.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

The first physical microphone and the second physical microphone of an embodiment are positioned along an axis and separated by a first distance.

A midpoint of the axis of an embodiment is a second distance from a speech source that generates the speech, wherein the speech source is located in a direction defined by an angle relative to the midpoint.

The first virtual microphone of an embodiment comprises the second microphone signal subtracted from the first microphone signal.

The first microphone signal of an embodiment is delayed.

The delay of an embodiment is raised to a power that is proportional to a time difference between arrival of the speech at the first virtual microphone and arrival of the speech at the second virtual microphone.

The delay of an embodiment is raised to a power that is proportional to a sampling frequency multiplied by a quantity equal to a third distance subtracted from a fourth distance, the third distance being between the first physical microphone and the speech source and the fourth distance being between the second physical microphone and the speech source.

The second microphone signal of an embodiment is multiplied by a ratio, wherein the ratio is a ratio of a third distance to a fourth distance, the third distance being between the first physical microphone and the speech source and the fourth distance being between the second physical microphone and the speech source.

The second virtual microphone of an embodiment comprises the first microphone signal subtracted from the second microphone signal.

The first microphone signal of an embodiment is delayed.

The delay of an embodiment is raised to a power that is proportional to a time difference between arrival of the speech at the first virtual microphone and arrival of the speech at the second virtual microphone.

The power of an embodiment is proportional to a sampling frequency multiplied by a quantity equal to a third distance subtracted from a fourth distance, the third distance being between the first physical microphone and the speech source and the fourth distance being between the second physical microphone and the speech source.

The first microphone signal of an embodiment is multiplied by a ratio, wherein the ratio is a ratio of the third distance to the fourth distance.

The first virtual microphone of an embodiment comprises the second microphone signal subtracted from a delayed version of the first microphone signal.

The second virtual microphone of an embodiment comprises a delayed version of the first microphone signal subtracted from the second microphone signal.

A speech source that generates the speech of an embodiment is a mouth of a human wearing the headset.

The device of an embodiment comprises a voice activity detector (VAD) coupled to the processing component, the VAD generating voice activity signals.

The device of an embodiment comprises an adaptive noise removal application coupled to the processing component, the adaptive noise removal application receiving signals from the first and second virtual microphones and generating an output signal, wherein the output signal is a denoised acoustic signal.

The microphone array of an embodiment receives acoustic signals including acoustic speech and acoustic noise.

The device of an embodiment comprises a communication channel coupled to the processing component, the communication channel comprising at least one of a wireless channel, a wired channel, and a hybrid wireless/wired channel.

The device of an embodiment comprises a communication device coupled to the headset via the communication channel, the communication device comprising one or more of cellular telephones, satellite telephones, portable telephones, wireline telephones, Internet telephones, wireless transceivers, wireless communication radios, personal digital assistants (PDAs), and personal computers (PCs).

Embodiments of the DOMA described herein include a device comprising: a housing; a loudspeaker connected to the housing; a first physical microphone and a second physical microphone connected to the housing, the first physical microphone outputting a first microphone signal and the second physical microphone outputting a second microphone signal, wherein the first and second physical microphones are omnidirectional; a first virtual microphone comprising a first combination of the first microphone signal and the second microphone signal; and a second virtual microphone comprising a second combination of the first microphone signal and the second microphone signal, wherein the second combination is different from the first combination, wherein the first virtual microphone and the second virtual microphone are distinct virtual directional microphones with substantially similar responses to noise and substantially dissimilar responses to speech.

Embodiments of the DOMA described herein include a device comprising: a housing including a loudspeaker, wherein the housing is portable and configured for attaching to a mobile object; and a physical microphone array connected to the headset, the physical microphone array including a first physical microphone and a second physical microphone that form a virtual microphone array comprising a first virtual microphone and a second virtual microphone; the first virtual microphone comprising a first combination of a first microphone signal and a second microphone signal, wherein the first microphone signal is generated by the first physical microphone and the second microphone signal is generated by the second physical microphone; and the second virtual microphone comprising a second combination of the first microphone signal and the second microphone signal, wherein the second combination is different from the first combination; wherein the first virtual microphone has a first linear response to speech that is devoid of a null, wherein the second virtual microphone has a second linear response to speech that has a single null oriented in a direction toward a source of the speech, wherein the speech is human speech.

The first virtual microphone and the second virtual microphone of an embodiment have a linear response to noise that is substantially similar.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

Embodiments of the DOMA described herein include a device comprising: a housing that is attached to a region of a human speaker; a loudspeaker connected to the housing; and a physical microphone array including a first physical microphone and a second physical microphone connected to the housing, the first physical microphone outputting a first microphone signal and the second physical microphone outputting a second microphone signal that in combination form a virtual microphone array; the virtual microphone array comprising a first virtual microphone and a second virtual microphone, the first virtual microphone comprising a first combination of the first microphone signal and the second microphone signal, the second virtual microphone comprising a second combination of the first microphone signal and the second microphone signal, wherein the second combination is different from the first combination; the virtual microphone array including a single null oriented in a direction toward a source of speech of the human speaker.

The first virtual microphone of an embodiment has a first linear response to speech that is devoid of a null, wherein the second virtual microphone has a second linear response to speech that includes the single null.

The first virtual microphone and the second virtual microphone of an embodiment have a linear response to noise that is substantially similar.

The single null of an embodiment is a region of the second linear response to speech having a measured response level that is lower than the measured response level of any other region of the second linear response.

The second linear response to speech of an embodiment includes a primary lobe oriented in a direction away from the source of the speech.

The primary lobe of an embodiment is a region of the second linear response having a measured response level that is greater than the measured response level of any other region of the second linear response.

The single null of an embodiment is located at a distance from the physical microphone array where the source of the speech is expected to be.

Embodiments of the DOMA described herein include a system comprising: a microphone array including a first physical microphone outputting a first microphone signal and a second physical microphone outputting a second microphone signal; a processing component coupled to the microphone array and generating a virtual microphone array comprising a first virtual microphone and a second virtual microphone, the first virtual microphone comprising a first combination of the first microphone signal and the second microphone signal, the second virtual microphone comprising a second combination of the first microphone signal and the second microphone signal, wherein the second combination is different from the first combination, wherein the first virtual microphone and the second virtual microphone have substantially similar responses to noise and substantially dissimilar responses to speech; and an adaptive noise removal application coupled to the processing component and generating denoised output signals by forming a plurality of combinations of signals output from the first virtual microphone and the second virtual microphone, wherein the denoised output signals include less acoustic noise than acoustic signals received at the microphone array.

The first and second physical microphones of an embodiment are omnidirectional.

The first virtual microphone of an embodiment has a first linear response to speech that is devoid of a null, wherein the speech is human speech.

The second virtual microphone of an embodiment has a second linear response to speech that includes a single null oriented in a direction toward a source of the speech.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

The first physical microphone and the second physical microphone of an embodiment are positioned along an axis and separated by a first distance.

A midpoint of the axis of an embodiment is a second distance from a speech source that generates the speech, wherein the speech source is located in a direction defined by an angle relative to the midpoint.

The first virtual microphone of an embodiment comprises the second microphone signal subtracted from the first microphone signal.

The first microphone signal of an embodiment is delayed.

The delay of an embodiment is raised to a power that is proportional to a time difference between arrival of the speech at the first virtual microphone and arrival of the speech at the second virtual microphone.

The delay of an embodiment is raised to a power that is proportional to a sampling frequency multiplied by a quantity equal to a third distance subtracted from a fourth distance, the third distance being between the first physical microphone and the speech source and the fourth distance being between the second physical microphone and the speech source.

The second microphone signal of an embodiment is multiplied by a ratio, wherein the ratio is a ratio of a third distance to a fourth distance, the third distance being between the first physical microphone and the speech source and the fourth distance being between the second physical microphone and the speech source.

The second virtual microphone of an embodiment comprises the first microphone signal subtracted from the second microphone signal.

The first microphone signal of an embodiment is delayed.

The delay of an embodiment is raised to a power that is proportional to a time difference between arrival of the speech at the first virtual microphone and arrival of the speech at the second virtual microphone.

The power of an embodiment is proportional to a sampling frequency multiplied by a quantity equal to a third distance subtracted from a fourth distance, the third distance being between the first physical microphone and the speech source and the fourth distance being between the second physical microphone and the speech source.

The first microphone signal of an embodiment is multiplied by a ratio, wherein the ratio is a ratio of the third distance to the fourth distance.

The first virtual microphone of an embodiment comprises the second microphone signal subtracted from a delayed version of the first microphone signal.

The second virtual microphone of an embodiment comprises a delayed version of the first microphone signal subtracted from the second microphone signal.

The system of an embodiment comprises a voice activity detector (VAD) coupled to the processing component, the VAD generating voice activity signals.

The system of an embodiment comprises a communication channel coupled to the processing component, the communication channel comprising at least one of a wireless channel, a wired channel, and a hybrid wireless/wired channel.

The system of an embodiment comprises a communication device coupled to the processing component via the communication channel, the communication device comprising one or more of cellular telephones, satellite telephones, portable telephones, wireline telephones, Internet telephones, wireless transceivers, wireless communication radios, personal digital assistants (PDAs), and personal computers (PCs).

Embodiments of the DOMA described herein include a system comprising: a first virtual microphone formed from a first combination of a first microphone signal and a second microphone signal, wherein the first microphone signal is generated by a first physical microphone and the second microphone signal is generated by a second physical microphone; a second virtual microphone formed from a second combination of the first microphone signal and the second microphone signal, wherein the second combination is different from the first combination; wherein the first virtual microphone has a first linear response to speech that is devoid of a null, wherein the second virtual microphone has a second linear response to speech that has a single null oriented in a direction toward a source of the speech, wherein the speech is human speech; an adaptive noise removal application coupled to the first and second virtual microphones and generating denoised output signals by forming a plurality of combinations of signals output from the first virtual microphone and the second virtual microphone, wherein the denoised output signals include less acoustic noise than acoustic signals received at the first and second physical microphones.

The first virtual microphone and the second virtual microphone of an embodiment have a linear response to noise that is substantially similar.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

Embodiments of the DOMA described herein include a system comprising: a first microphone outputting a first microphone signal and a second microphone outputting a second microphone signal, wherein the first microphone and the second microphone are omnidirectional microphones; a virtual microphone array comprising a first virtual microphone and a second virtual microphone, wherein the first virtual microphone comprises a first combination of the first microphone signal and the second microphone signal, wherein the second virtual microphone comprises a second combination of the first microphone signal and the second microphone signal, wherein the second combination is different from the first combination, wherein the first virtual microphone and the second virtual microphone are distinct virtual directional microphones; and an adaptive noise removal application coupled to the virtual microphone array and generating denoised output signals by forming a plurality of combinations of signals output from the first virtual microphone and the second virtual microphone, wherein the denoised output signals include less acoustic noise than acoustic signals received at the first microphone and the second microphone.

Embodiments of the DOMA described herein include a system comprising: a first physical microphone generating a first microphone signal; a second physical microphone generating a second microphone signal; a processing component coupled to the first microphone signal and the second microphone signal, the processing component generating a virtual microphone array comprising a first virtual microphone and a second virtual microphone; and wherein the first virtual microphone comprises the second microphone signal subtracted from a delayed version of the first microphone signal; wherein the second virtual microphone comprises a delayed version of the first microphone signal subtracted from the second microphone signal; an adaptive noise removal application coupled to the processing component and generating denoised output signals, wherein the denoised output signals include less acoustic noise than acoustic signals received at the first physical microphone and the second physical microphone.

The first virtual microphone of an embodiment has a first linear response to speech that is devoid of a null, wherein the speech is human speech.

The second virtual microphone of an embodiment has a second linear response to speech that includes a single null oriented in a direction toward a source of the speech.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

The first physical microphone and the second physical microphone of an embodiment are positioned along an axis and separated by a first distance.

A midpoint of the axis of an embodiment is a second distance from a speech source that generates the speech, wherein the speech source is located in a direction defined by an angle relative to the midpoint.

One or more of the first microphone signal and the second microphone signal of an embodiment is delayed.

The delay of an embodiment is raised to a power that is proportional to a time difference between arrival of the speech at the first virtual microphone and arrival of the speech at the second virtual microphone.

The power of an embodiment is proportional to a sampling frequency multiplied by a quantity equal to a third distance subtracted from a fourth distance, the third distance being between the first physical microphone and the speech source and the fourth distance being between the second physical microphone and the speech source.

One or more of the first microphone signal and the second microphone signal of an embodiment is multiplied by a gain factor.

The system of an embodiment comprises a voice activity detector (VAD) coupled to the processing component, the VAD generating voice activity signals.

The system of an embodiment comprises a communication channel coupled to the processing component, the communication channel comprising at least one of a wireless channel, a wired channel, and a hybrid wireless/wired channel.

The system of an embodiment comprises a communication device coupled to the processing component via the communication channel, the communication device comprising one or more of cellular telephones, satellite telephones, portable telephones, wireline telephones, Internet telephones, wireless transceivers, wireless communication radios, personal digital assistants (PDAs), and personal computers (PCs).

Embodiments of the DOMA described herein include a system comprising: a physical microphone array including a first physical microphone and a second physical microphone, the first physical microphone outputting a first microphone signal and the second physical microphone outputting a second microphone signal; a virtual microphone array comprising a first virtual microphone and a second virtual microphone, the first virtual microphone comprising a first combination of the first microphone signal and the second microphone signal, the second virtual microphone comprising a second combination of the first microphone signal and the second microphone signal, wherein the second combination is different from the first combination; the virtual microphone array including a single null oriented in a direction toward a source of speech of a human speaker; and an adaptive noise removal application coupled to the virtual microphone array and generating denoised output signals by forming a plurality of combinations of signals output from the virtual microphone array, wherein the denoised output signals include less acoustic noise than acoustic signals received at the physical microphone array.

The first virtual microphone of an embodiment has a first linear response to speech that is devoid of a null, wherein the second virtual microphone of an embodiment has a second linear response to speech that includes the single null.

The first virtual microphone and the second virtual microphone of an embodiment have a linear response to noise that is substantially similar.

The single null of an embodiment is a region of the second linear response to speech having a measured response level that is lower than the measured response level of any other region of the second linear response.

The second linear response to speech of an embodiment includes a primary lobe oriented in a direction away from the source of the speech.

The primary lobe of an embodiment is a region of the second linear response having a measured response level that is greater than the measured response level of any other region of the second linear response.

The single null of an embodiment is located at a distance from the physical microphone array where the source of the speech is expected to be.

Embodiments of the DOMA described herein include a system comprising: a first virtual microphone comprising a first combination of a first microphone signal and a second microphone signal, wherein the first microphone signal is output from a first physical microphone and the second microphone signal is output from a second physical microphone; a second virtual microphone comprising a second combination of the first microphone signal and the second microphone signal, wherein the second combination is different from the first combination, wherein the first virtual microphone and the second virtual microphone are distinct virtual directional microphones with substantially similar responses to noise and substantially dissimilar responses to speech; and a processing component coupled to the first and second virtual microphones, the processing component including an adaptive noise removal application receiving acoustic signals from the first virtual microphone and the second virtual microphone and generating an output signal, wherein the output signal is a denoised acoustic signal.

Embodiments of the DOMA described herein include a method comprising: forming a first virtual microphone by generating a first combination of a first microphone signal and a second microphone signal, wherein the first microphone signal is generated by a first physical microphone and the second microphone signal is generated by a second physical microphone; and forming a second virtual microphone by generating a second combination of the first microphone signal and the second microphone signal, wherein the second combination is different from the first combination, wherein the first virtual microphone and the second virtual microphone are distinct virtual directional microphones with substantially similar responses to noise and substantially dissimilar responses to speech.

Forming the first virtual microphone of an embodiment includes forming the first virtual microphone to have a first linear response to speech that is devoid of a null, wherein the speech is human speech.

Forming the second virtual microphone of an embodiment includes forming the second virtual microphone to have a second linear response to speech that includes a single null oriented in a direction toward a source of the speech.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

The method of an embodiment comprises positioning the first physical microphone and the second physical microphone along an axis and separating the first and second physical microphones by a first distance.

A midpoint of the axis of an embodiment is a second distance from a speech source that generates the speech, wherein the speech source is located in a direction defined by an angle relative to the midpoint.

Forming the first virtual microphone of an embodiment comprises subtracting the second microphone signal subtracted from the first microphone signal.

The method of an embodiment comprises delaying the first microphone signal.

The method of an embodiment comprises raising the delay to a power that is proportional to a time difference between arrival of the speech at the first virtual microphone and arrival of the speech at the second virtual microphone.

The method of an embodiment comprises raising the delay to a power that is proportional to a sampling frequency multiplied by a quantity equal to a third distance subtracted from a fourth distance, the third distance being between the first physical microphone and the speech source and the fourth distance being between the second physical microphone and the speech source.

The method of an embodiment comprises multiplying the second microphone signal by a ratio, wherein the ratio is a ratio of a third distance to a fourth distance, the third distance being between the first physical microphone and the speech source and the fourth distance being between the second physical microphone and the speech source.

Forming the second virtual microphone of an embodiment comprises subtracting the first microphone signal from the second microphone signal.

The method of an embodiment comprises delaying the first microphone signal.

The method of an embodiment comprises raising the delay to a power that is proportional to a time difference between arrival of the speech at the first virtual microphone and arrival of the speech at the second virtual microphone.

The method of an embodiment comprises raising the delay to a power that is proportional to a sampling frequency multiplied by a quantity equal to a third distance subtracted from a fourth distance, the third distance being between the first physical microphone and the speech source and the fourth distance being between the second physical microphone and the speech source.

The method of an embodiment comprises multiplying the first microphone signal by a ratio, wherein the ratio is a ratio of the third distance to the fourth distance.

Forming the first virtual microphone of an embodiment comprises subtracting the second microphone signal from a delayed version of the first microphone signal.

Forming the second virtual microphone of an embodiment comprises: forming a quantity by delaying the first microphone signal; and subtracting the quantity from the second microphone signal.

The first and second physical microphones of an embodiment are omnidirectional.

Embodiments of the DOMA described herein include a method comprising: receiving a first microphone signal from a first omnidirectional microphone and receiving a second microphone signal from a second omnidirectional microphone; generating a first virtual directional microphone by generating a first combination of the first microphone signal and the second microphone signal; generating a second virtual directional microphone by generating a second combination of the first microphone signal and the second microphone signal, wherein the second combination is different from the first combination, wherein the first virtual microphone and the second virtual microphone are distinct virtual directional microphones with substantially similar responses to noise and substantially dissimilar responses to speech.

Embodiments of the DOMA described herein include a method of forming a microphone array comprising: forming a first virtual microphone by generating a first combination of a first microphone signal and a second microphone signal, wherein the first microphone signal is generated by a first omnidirectional microphone and the second microphone signal is generated by a second omnidirectional microphone; and forming a second virtual microphone by generating a second combination of the first microphone signal and the second microphone signal, wherein the second combination is different from the first combination; wherein the first virtual microphone has a first linear response to speech that is devoid of a null, wherein the second virtual microphone has a second linear response to speech that has a single null oriented in a direction toward a source of the speech, wherein the speech is human speech.

Forming the first and second virtual microphones of an embodiment comprises forming the first virtual microphone and the second virtual microphone to have a linear response to noise that is substantially similar.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

Embodiments of the DOMA described herein include a method comprising: receiving acoustic signals at a first physical microphone and a second physical microphone; outputting in response to the acoustic signals a first microphone signal from the first physical microphone and outputting a second microphone signal from the second physical microphone; forming a first virtual microphone by generating a first combination of the first microphone signal and the second microphone signal; forming a second virtual microphone by generating a second combination of the first microphone signal and the second microphone signal, wherein the second combination is different from the first combination, wherein the first virtual microphone and the second virtual microphone are distinct virtual directional microphones with substantially similar responses to noise and substantially dissimilar responses to speech; generating output signals by combining signals from the first virtual microphone and the second virtual microphone, wherein the output signals include less acoustic noise than the acoustic signals.

The first and second physical microphones of an embodiment are omnidirectional microphones.

Forming the first virtual microphone of an embodiment includes forming the first virtual microphone to have a first linear response to speech that is devoid of a null, wherein the speech is human speech.

Forming the second virtual microphone of an embodiment includes forming the second virtual microphone to have a second linear response to speech that includes a single null oriented in a direction toward a source of the speech.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

Forming the first virtual microphone of an embodiment comprises subtracting the second microphone signal from a delayed version of the first microphone signal.

Forming the second virtual microphone of an embodiment comprises: forming a quantity by delaying the first microphone signal; and subtracting the quantity from the second microphone signal.

Embodiments of the DOMA described herein include a method comprising: forming a physical microphone array including a first physical microphone and a second physical microphone, the first physical microphone outputting a first microphone signal and the second physical microphone outputting a second microphone signal; and forming a virtual microphone array comprising a first virtual microphone and a second virtual microphone, the first virtual microphone comprising a first combination of the first microphone signal and the second microphone signal, the second virtual microphone comprising a second combination of the first microphone signal and the second microphone signal, wherein the second combination is different from the first combination; the virtual microphone array including a single null oriented in a direction toward a source of speech of a human speaker.

Forming the first and second virtual microphones of an embodiment comprises forming the first virtual microphone and the second virtual microphone to have a linear response to noise that is substantially similar.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

The single null of an embodiment is located at a distance from the physical microphone array where the source of the speech is expected to be.

Voice Activity Detector (VAD)-Based Multiple-Microphone Acoustic Noise Suppression In the following description, "signal" represents any acoustic signal (such as human speech) that is desired, and "noise" is any acoustic signal (which may include human speech) that is not desired. An example would be a person talking on a cellular telephone with a radio in the background. The person's speech is desired and the acoustic energy from the radio is not desired. In addition, "user" describes a person who is using the device and whose speech is desired to be captured by the system.

Also, "acoustic" is generally defined as acoustic waves propagating in air. Propagation of acoustic waves in media other than air will be noted as such. References to "speech" or "voice" generally refer to human speech including voiced speech, unvoiced speech, and/or a combination of voiced and unvoiced speech. Unvoiced speech or voiced speech is distinguished where necessary. The term "noise suppression" generally describes any method by which noise is reduced or eliminated in an electronic signal.

Moreover, the term "VAD" is generally defined as a vector or array signal, data, or information that in some manner represents the occurrence of speech in the digital or analog domain. A common representation of VAD information is a one-bit digital signal sampled at the same rate as the corresponding acoustic signals, with a zero value representing that no speech has occurred during the corresponding time sample, and a unity value indicating that speech has occurred during the corresponding time sample. While the embodiments described herein are generally described in the digital domain, the descriptions are also valid for the analog domain.

Figure 30:
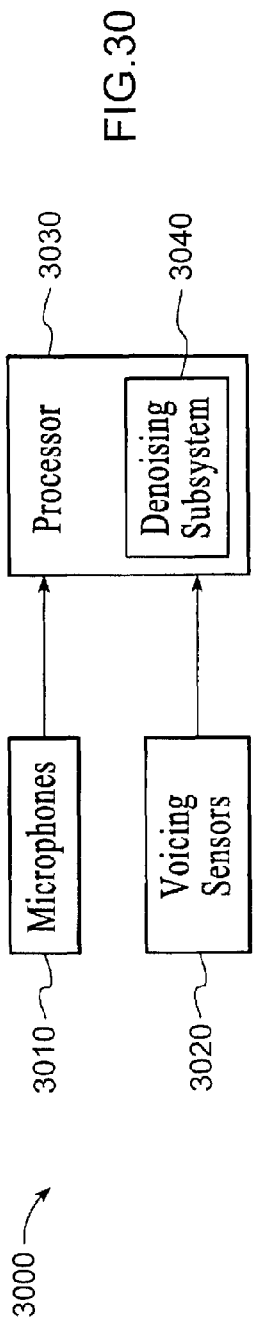
FIG. 30 is a block diagram of a denoising system, under an embodiment.

FIG. 30 is a block diagram of a denoising system 3000 of an embodiment that uses knowledge of when speech is occurring derived from physiological information on voicing activity. The system 1000 includes microphones 3010 and sensors 3020 that provide signals to at least one processor 3030. The processor includes a denoising subsystem or algorithm 3040.

Figure 31:
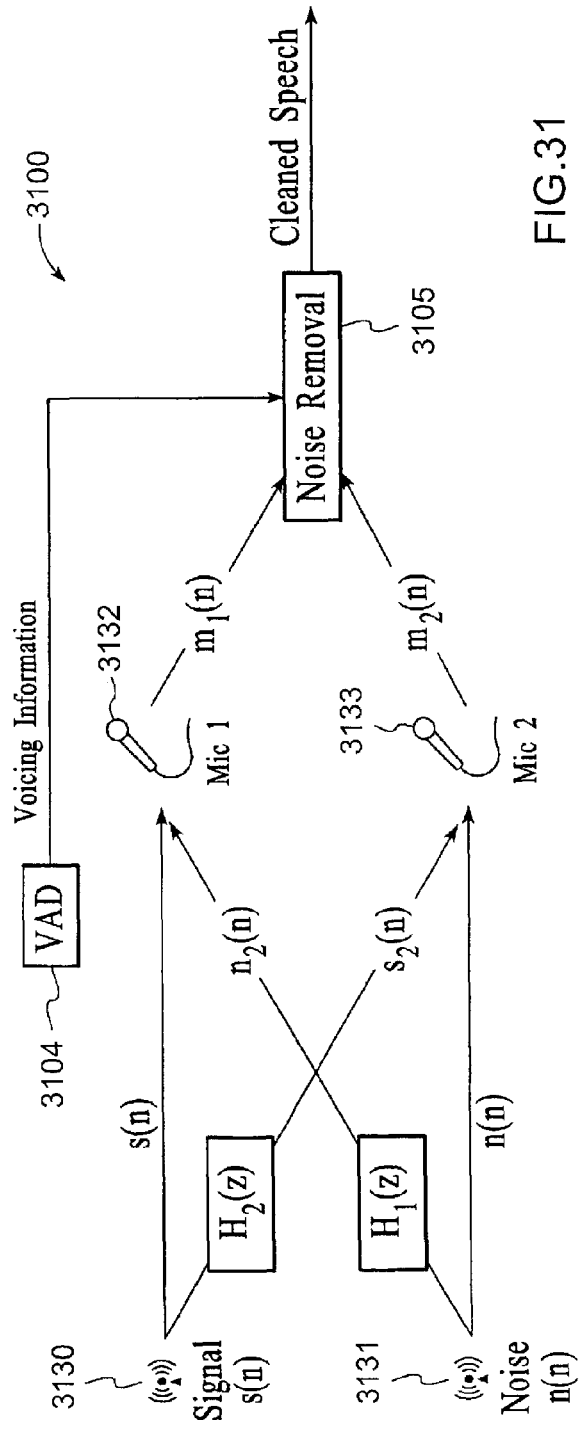
FIG. 31 is a block diagram including components of a noise removal algorithm, under the denoising system of an embodiment assuming a single noise source and direct paths to the microphones.

FIG. 31 is a block diagram including components of a noise removal algorithm 3100 of an embodiment. A single noise source and a direct path to the microphones are assumed. An operational description of the noise removal algorithm 3100 of an embodiment is provided using a single signal source 3130 and a single noise source 3131, but is not so limited. This algorithm 3100 uses two microphones: a "signal" microphone 1 ("MIC1") and a "noise" microphone 2 ("MIC 2"), but is not so limited. The signal microphone MIC 1 is assumed to capture mostly signal with some noise, while MIC 2 captures mostly noise with some signal. The data from the signal source 3130 to MIC 1 is denoted by s(n), where s(n) is a discrete sample of the analog signal from the source 3130. The data from the signal source 3130 to MIC 2 is denoted by $s_2(n)$. The data from the noise source 3131 to MIC 2 is denoted by n(n). The data from the noise source 3131 to MIC 1 is denoted by $n_2(n)$. Similarly, the data from MIC 1 to noise removal element 3105 is denoted by $m_1(n)$, and the data from MIC 2 to noise removal element 3105 is denoted by $m_2(n)$.

The noise removal element 3105 also receives a signal from a voice activity detection (VAD) element 3104. The VAD 3104 uses physiological information to determine when a speaker is speaking. In various embodiments, the VAD can include at least one of an accelerometer, a skin surface microphone in physical contact with skin of a user, a human tissue vibration detector, a radio frequency (RF) vibration and/or motion detector/device, an electroglottograph, an ultrasound device, an acoustic microphone that is being used to detect acoustic frequency signals that correspond to the user's speech directly from the skin of the user (anywhere on the body), an airflow detector, and a laser vibration detector.

The transfer functions from the signal source 3130 to MIC 1 and from the noise source 3131 to MIC 2 are assumed to be unity. The transfer function from the signal source 3130 to MIC 2 is denoted by $H_2(z)$, and the transfer function from the noise source 3131 to MIC 1 is denoted by $H_1(z)$. The assumption of unity transfer functions does not inhibit the generality of this algorithm, as the actual relations between the signal, noise, and microphones are simply ratios and the ratios are redefined in this manner for simplicity.

In conventional two-microphone noise removal systems, the information from MIC 2 is used to attempt to remove noise from MIC 1. However, an (generally unspoken) assumption is that the VAD element 3104 is never perfect, and thus the denoising must be performed cautiously, so as not to remove too much of the signal along with the noise. However, if the VAD 3104 is assumed to be perfect such that it is equal to zero when there is no speech being produced by the user, and equal to one when speech is produced, a substantial improvement in the noise removal can be made.

In analyzing the single noise source 3131 and the direct path to the microphones, with reference to FIG. 31, the total acoustic information coming into MIC 1 is denoted by $m_1(n)$. The total acoustic information coming into MIC 2 is similarly labeled $m_2(n)$. In the z (digital frequency) domain, these are represented as $M_1(z)$ and $M_2(z)$. Then, $$M_1(z)=S(z)+N_2(z)$$

$$M_2(z)=N(z)+S_2(z)$$

with $$N_2(z)=N(z)H_1(z)$$

$$S_2(z)=S(z)H_2(z),$$

so that $$M_1(z)=S(z)+N(z)H_1(z)$$

$$M_2(z)=N(z)+S(z)H_2(z). \quad\quad \text{Eq. 6}$$

This is the general case for all two microphone systems. In a practical system there is always going to be some leakage of noise into MIC 1, and some leakage of signal into MIC 2. Equation 6 has four unknowns and only two known relationships and therefore cannot be solved explicitly.

However, there is another way to solve for some of the unknowns in Equation 6. The analysis starts with an examination of the case where the signal is not being generated, that is, where a signal from the VAD element 3104 equals zero and speech is not being produced. In this case, s(n)=S(z)=0, and Equation 6 reduces to $$M_{1n}(z)=N(z)H_1(z)$$

$$M_{2n}(z)=N(z),$$

where the n subscript on the M variables indicate that only noise is being received. This leads to $$M_{1n}(z) = M_{2n}(z)H_1(z) \quad\quad \text{Eq. 7}$$

$$H_1(z) = \frac{M_{1n}(z)}{M_{2n}(z)}.$$

The function $H_1(z)$ can be calculated using any of the available system identification algorithms and the microphone outputs when the system is certain that only noise is being received. The calculation can be done adaptively, so that the system can react to changes in the noise.

A solution is now available for one of the unknowns in Equation 6. Another unknown, $H_2(z)$, can be determined by using the instances where the VAD equals one and speech is being produced. When this is occurring, but the recent (perhaps less than 1 second) history of the microphones indicate low levels of noise, it can be assumed that n(s)=N(z)~0. Then Equation 6 reduces to $$M_{1s}(z)=S(z)$$

$$M_{2s}(z)=S(z)H_2(z),$$

which in turn leads to $$M_{2s}(z) = M_{1s}(z)H_2(z)$$

$$H_2(z) = \frac{M_{2s}(z)}{M_{1s}(z)},$$

which is the inverse of the $H_1(z)$ calculation. However, it is noted that different inputs are being used (now only the signal is occurring whereas before only the noise was occurring). While calculating $H_2(z)$, the values calculated for $H_1(z)$ are held constant and vice versa. Thus, it is assumed that while one of $H_1(z)$ and $H_2(z)$ are being calculated, the one not being calculated does not change substantially.

After calculating $H_1(z)$ and $H_2(z)$, they are used to remove the noise from the signal. If Equation 6 is rewritten as $$S(z)=M_1(z)-N(z)H_1(z)$$

$$N(z)=M_2(z)-S(z)H_2(z)$$

$$S(z)=M_1(z)-[M_2(z)-S(z)H_2(z)]H_1(z)$$

$$S(z)[1-H_2(z)H_1(z)]=M_1(z)-M_2(z)H_1(z),$$

then N(z) may be substituted as shown to solve for S(z) as $$S(z) = \frac{M_1(z) - M_2(z)H_1(z)}{1 - H_2(z)H_1(z)}. \quad \text{Eq. 8}$$

If the transfer functions $H_1(z)$ and $H_2(z)$ can be described with sufficient accuracy, then the noise can be completely removed and the original signal recovered. This remains true without respect to the amplitude or spectral characteristics of the noise. The only assumptions made include use of a perfect VAD, sufficiently accurate $H_1(z)$ and $H_2(z)$, and that when one of $H_1(z)$ and $H_2(z)$ are being calculated the other does not change substantially. In practice these assumptions have proven reasonable.

Figure 32:
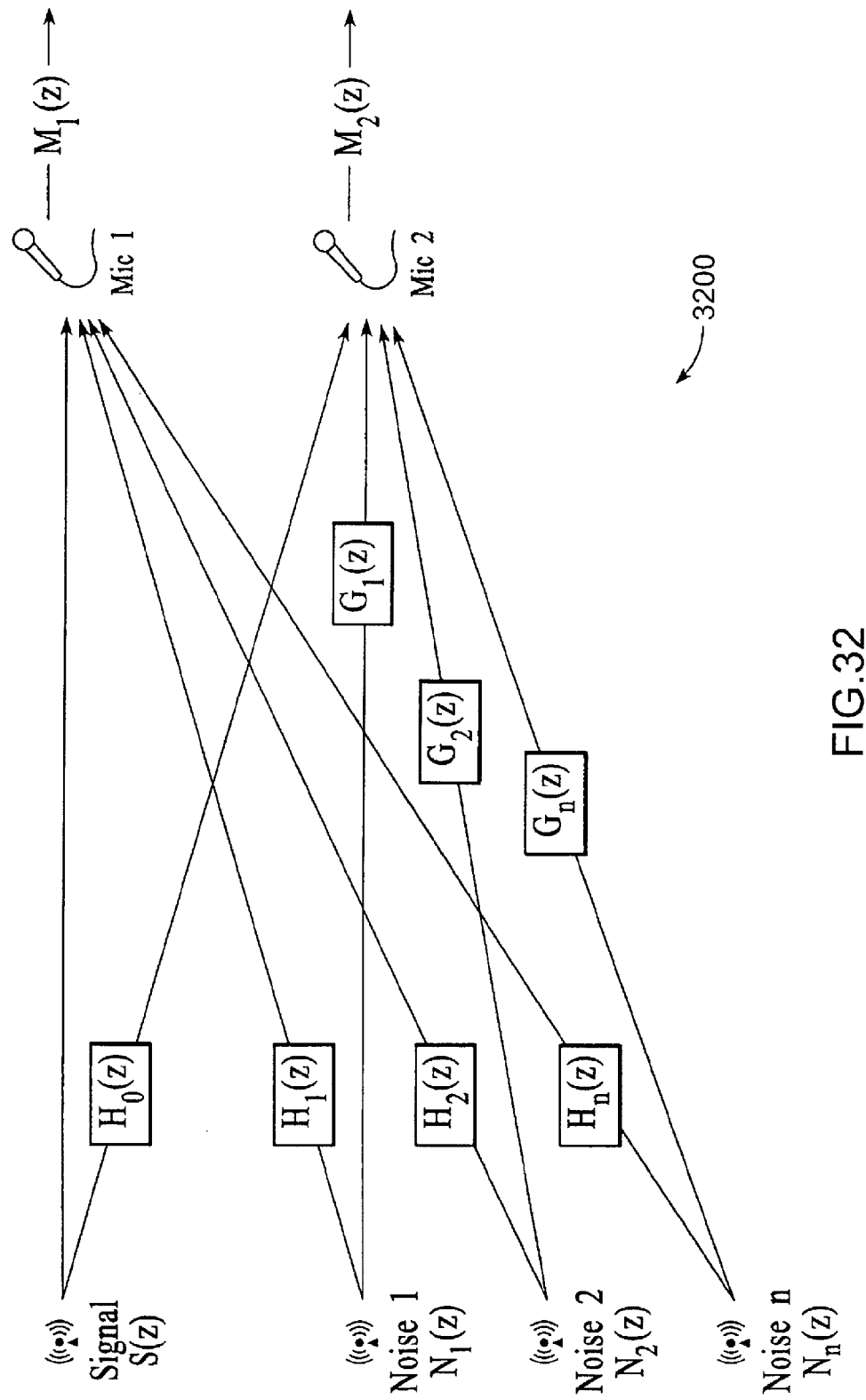
FIG. 32 is a block diagram including front-end components of a noise removal algorithm of an embodiment generalized to n distinct noise sources (these noise sources may be reflections or echoes of one another).

The noise removal algorithm described herein is easily generalized to include any number of noise sources. FIG. 32 is a block diagram including front-end components 3200 of a noise removal algorithm of an embodiment, generalized to n distinct noise sources. These distinct noise sources may be reflections or echoes of one another, but are not so limited. There are several noise sources shown, each with a transfer function, or path, to each microphone. The previously named path $H_2$ has been relabeled as $H_0$, so that labeling noise source 2's path to MIC 1 is more convenient. The outputs of each microphone, when transformed to the z domain, are:

$$M_1(z) = S(z) + N_1(z)H_1(z) + N_2(z)H_2(z) + \ldots N_n(z)H_n(z)$$

$$M_2(z) = S(z)H_0(z) + N_1(z)G_1(z) + N_2(z)G_2(z) + \ldots N_n(z)G_n(z). \quad \text{Eq. 9}$$

When there is no signal (VAD=0), then (suppressing z for clarity)

$$M_{1n} = N_1 H_1 + N_2 H_2 + \ldots N_n H_n$$

$$M_{2n} = N_1 G_1 + N_2 G_2 + \ldots N_n G_n. \quad \text{Eq. 10}$$

A new transfer function can now be defined as $$\tilde{H}_1 = \frac{M_{1n}}{M_{2n}} = \frac{N_1 H_1 + N_2 H_2 + \ldots N_n H_n}{N_1 G_1 + N_2 G_2 + \ldots N_n G_n}, \quad \text{Eq. 11}$$

where $\tilde{H}_1$ is analogous to $H_1(z)$ above. Thus $H_1$ depends only on the noise sources and their respective transfer functions and can be calculated any time there is no signal being transmitted. Once again, the "n" subscripts on the microphone inputs denote only that noise is being detected, while an "s" subscript denotes that only signal is being received by the microphones.

Examining Equation 9 while assuming an absence of noise produces $$M_{1s} = S$$

$$M_{2s} = SH_0.$$

Thus, $H_0$ can be solved for as before, using any available transfer function calculating algorithm. Mathematically, then, $$H_0 = \frac{M_{2s}}{M_{1s}}.$$

Rewriting Equation 9, using $\tilde{H}_1$ defined in Equation 11, provides, $$\tilde{H}_1 = \frac{M_1 - S}{M_2 - SH_0}. \quad \text{Eq. 12}$$

Solving for S yields, $$S = \frac{M_1 - M_2 \tilde{H}_1}{1 - H_0 \tilde{H}_1}, \quad \text{Eq. 13}$$

which is the same as Equation 8, with $H_0$ taking the place of $H_2$, and $\tilde{H}_1$ taking the place of $H_1$. Thus the noise removal algorithm still is mathematically valid for any number of noise sources, including multiple echoes of noise sources. Again, if $H_0$ and $\tilde{H}_1$ can be estimated to a high enough accuracy, and the above assumption of only one path from the signal to the microphones holds, the noise may be removed completely.

Figure 33:
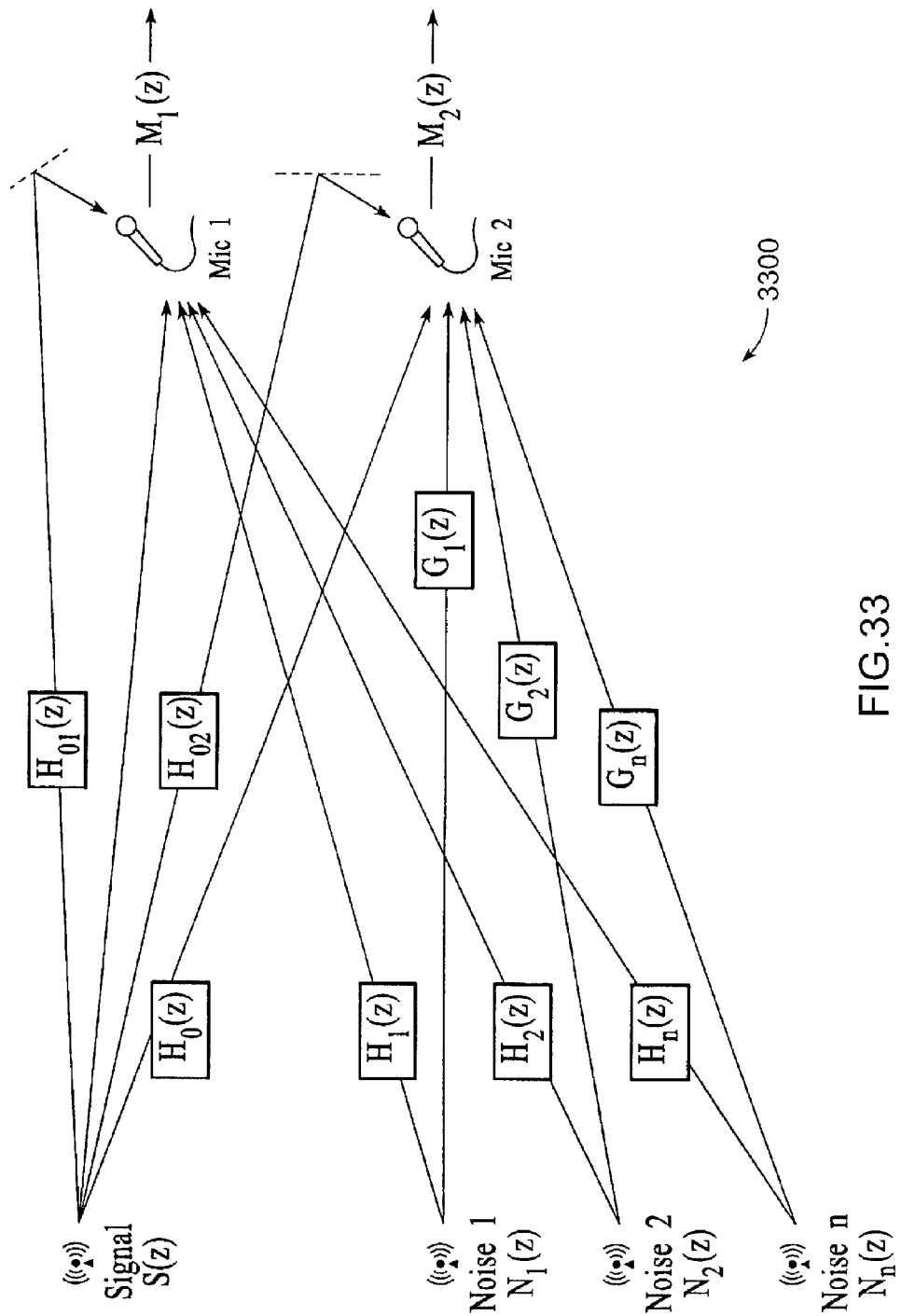
FIG. 33 is a block diagram including front-end components of a noise removal algorithm of an embodiment in a general case where there are n distinct noise sources and signal reflections.

The most general case involves multiple noise sources and multiple signal sources. FIG. 33 is a block diagram including front-end components 3300 of a noise removal algorithm of an embodiment in the most general case where there are n distinct noise sources and signal reflections. Here, signal reflections enter both microphones MIC 1 and MIC 2. This is the most general case, as reflections of the noise source into the microphones MIC 1 and MIC 2 can be modeled accurately as simple additional noise sources. For clarity, the direct path from the signal to MIC 2 is changed from $H_0(z)$ to $H_{00}(z)$, and the reflected paths to MIC 1 and MIC 2 are denoted by $H_{01}(z)$ and $H_{02}(z)$, respectively.

The input into the microphones now becomes $$M_1(z) = S(z) + S(z)H_{01}(z) + N_1(z)H_1(z) + N_2(z)H_2(z) + \ldots N_n(z)H_n(z)$$

$$M_2(z) = S(z)H_{00}(z) + S(z)H_{02}(z) + N_1(z)G_1(z) + N_2(z)G_2(z) + \ldots N_n(z)G_n(z). \quad \text{Eq. 14}$$

When the VAD=0, the inputs become (suppressing z again)

$$M_{1N} = N_1 H_1 + N_2 H_2 + \ldots N_n H_n$$

$$M_{2n} = N_1 G_1 + N_2 G_2 + \ldots N_n G_n,$$

which is the same as Equation 10. Thus, the calculation of $\tilde{H}_1$ in Equation 11 is unchanged, as expected. In examining the situation where there is no noise, Equation 14 reduces to $$M_{1s} = S + SH_{01}$$

$$M_{2s} = SH_{00} + SH_{02}.$$

This leads to the definition of $\tilde{H}_2$ as $$\tilde{H}_2 = \frac{M_{2s}}{M_{1s}} = \frac{H_{00} + H_{02}}{1 + H_{01}}. \quad \text{Eq. 15}$$

Rewriting Equation 14 again using the definition for $\tilde{H}_1$ (as in Equation 12) provides $$\tilde{H}_1 = \frac{M_1 - S(1 + H_{01})}{M_2 - S(H_{00} + H_{02})}. \quad \text{Eq. 16}$$

Some algebraic manipulation yields $$S(1 + H_{01} - \tilde{H}_1(H_{00} + H_{02})) = M_1 - M_2\tilde{H}_1$$

$$S(1 + H_{01})\left[1 - \tilde{H}_1 \frac{(H_{00} + H_{02})}{(1 + H_{01})}\right] = M_1 - M_2\tilde{H}_1$$

$$S(1 + H_{01})[1 - \tilde{H}_1\tilde{H}_2] = M_1 - M_2\tilde{H}_1,$$

and finally $$S(1 + H_{01}) = \frac{M_1 - M_2\tilde{H}_1}{1 - \tilde{H}_1\tilde{H}_2}. \qquad \text{Eq. 17}$$

Equation 17 is the same as equation 13, with the replacement of $H_0$ by $\tilde{H}_2$, and the addition of the $(1+H_{01})$ factor on the left side. This extra factor $(1+H_{01})$ means that S cannot be solved for directly in this situation, but a solution can be generated for the signal plus the addition of all of its echoes. This is not such a bad situation, as there are many conventional methods for dealing with echo suppression, and even if the echoes are not suppressed, it is unlikely that they will affect the comprehensibility of the speech to any meaningful extent. The more complex calculation of $\tilde{H}_2$ is needed to account for the signal echoes in MIC 2, which act as noise sources.

Figure 34:
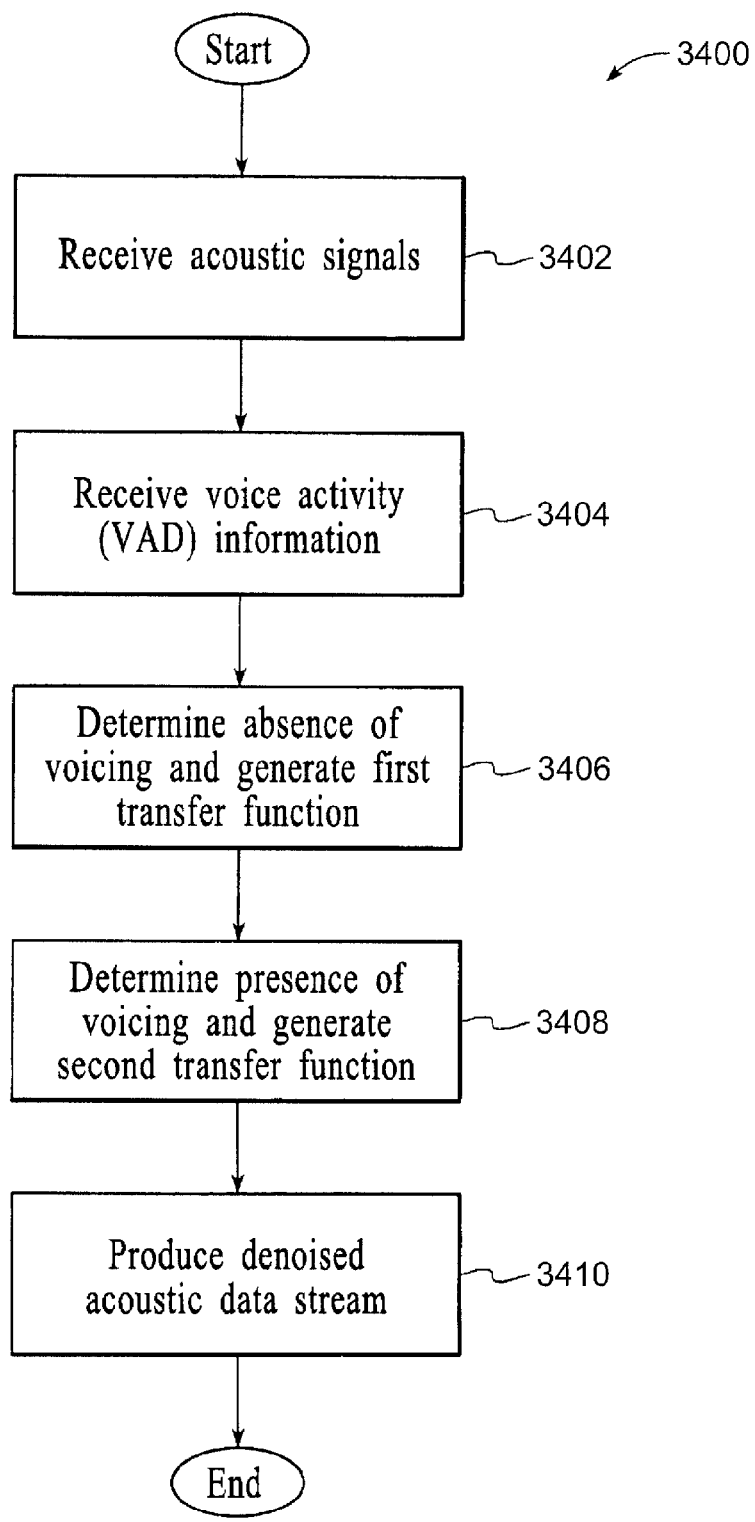
FIG. 34 is a flow diagram of a denoising method, under an embodiment.

FIG. 34 is a flow diagram 3400 of a denoising algorithm, under an embodiment. In operation, the acoustic signals are received, at block 3402. Further, physiological information associated with human voicing activity is received, at block 3404. A first transfer function representative of the acoustic signal is calculated upon determining that voicing information is absent from the acoustic signal for at least one specified period of time, at block 3406. A second transfer function representative of the acoustic signal is calculated upon determining that voicing information is present in the acoustic signal for at least one specified period of time, at block 3408. Noise is removed from the acoustic signal using at least one combination of the first transfer function and the second transfer function, producing denoised acoustic data streams, at block 3410.

An algorithm for noise removal, or denoising algorithm, is described herein, from the simplest case of a single noise source with a direct path to multiple noise sources with reflections and echoes. The algorithm has been shown herein to be viable under any environmental conditions. The type and amount of noise are inconsequential if a good estimate has been made of $\tilde{H}_1$ and $\tilde{H}_2$, and if one does not change substantially while the other is calculated. If the user environment is such that echoes are present, they can be compensated for if coming from a noise source. If signal echoes are also present, they will affect the cleaned signal, but the effect should be negligible in most environments.

In operation, the algorithm of an embodiment has shown excellent results in dealing with a variety of noise types, amplitudes, and orientations. However, there are always approximations and adjustments that have to be made when moving from mathematical concepts to engineering applications. One assumption is made in Equation 8, where $H_2(z)$ is assumed small and therefore $H_2(z)H_1(z) \approx 0$, so that Equation 8 reduces to $$S(z) \approx M_1(z) - M_2(z)H_1(z).$$

This means that only $H_1(z)$ has to be calculated, speeding up the process and reducing the number of computations required considerably. With the proper selection of microphones, this approximation is easily realized.

Another approximation involves the filter used in an embodiment. The actual $H_1(z)$ will undoubtedly have both poles and zeros, but for stability and simplicity an all-zero Finite Impulse Response (FIR) filter is used. With enough taps the approximation to the actual $H_1(z)$ can be very good.

To further increase the performance of the noise suppression system, the spectrum of interest (generally about 125 to 3700 Hz) is divided into subbands. The wider the range of frequencies over which a transfer function must be calculated, the more difficult it is to calculate it accurately. Therefore the acoustic data was divided into 16 subbands, and the denoising algorithm was then applied to each subband in turn. Finally, the 16 denoised data streams were recombined to yield the denoised acoustic data. This works very well, but any combinations of subbands (i.e., 4, 6, 8, 32, equally spaced, perceptually spaced, etc.) can be used and all have been found to work better than a single subband.

The amplitude of the noise was constrained in an embodiment so that the microphones used did not saturate (that is, operate outside a linear response region). It is important that the microphones operate linearly to ensure the best performance. Even with this restriction, very low signal-to-noise ratio (SNR) signals can be denoised (down to −10 dB or less).

The calculation of $H_1(z)$ is accomplished every 10 milliseconds using the Least-Mean Squares (LMS) method, a common adaptive transfer function. An explanation may be found in "Adaptive Signal Processing" (1985), by Widrow and Steams, published by Prentice-Hall, ISBN 0-13-004029-0. The LMS was used for demonstration purposes, but many other system identification techniques can be used to identify $H_1(z)$ and $H_2(z)$ in FIG. 31.

The VAD for an embodiment is derived from a radio frequency sensor and the two microphones, yielding very high accuracy (>99%) for both voiced and unvoiced speech. The VAD of an embodiment uses a radio frequency (RF) vibration detector interferometer to detect tissue motion associated with human speech production, but is not so limited. The signal from the RF device is completely acoustic-noise free, and is able to function in any acoustic noise environment. A simple energy measurement of the RF signal can be used to determine if voiced speech is occurring. Unvoiced speech can be determined using conventional acoustic-based methods, by proximity to voiced sections determined using the RF sensor or similar voicing sensors, or through a combination of the above. Since there is much less energy in unvoiced speech, its detection accuracy is not as critical to good noise suppression performance as is voiced speech.

With voiced and unvoiced speech detected reliably, the algorithm of an embodiment can be implemented. Once again, it is useful to repeat that the noise removal algorithm does not depend on how the VAD is obtained, only that it is accurate, especially for voiced speech. If speech is not detected and training occurs on the speech, the subsequent denoised acoustic data can be distorted.

Data was collected in four channels, one for MIC 1, one for MIC 2, and two for the radio frequency sensor that detected the tissue motions associated with voiced speech. The data were sampled simultaneously at 40 kHz, then digitally filtered and decimated down to 8 kHz. The high sampling rate was used to reduce any aliasing that might result from the analog to digital process. A four-channel National Instruments A/D board was used along with Labview to capture and store the data. The data was then read into a C program and denoised 10 milliseconds at a time.

Figure 35:
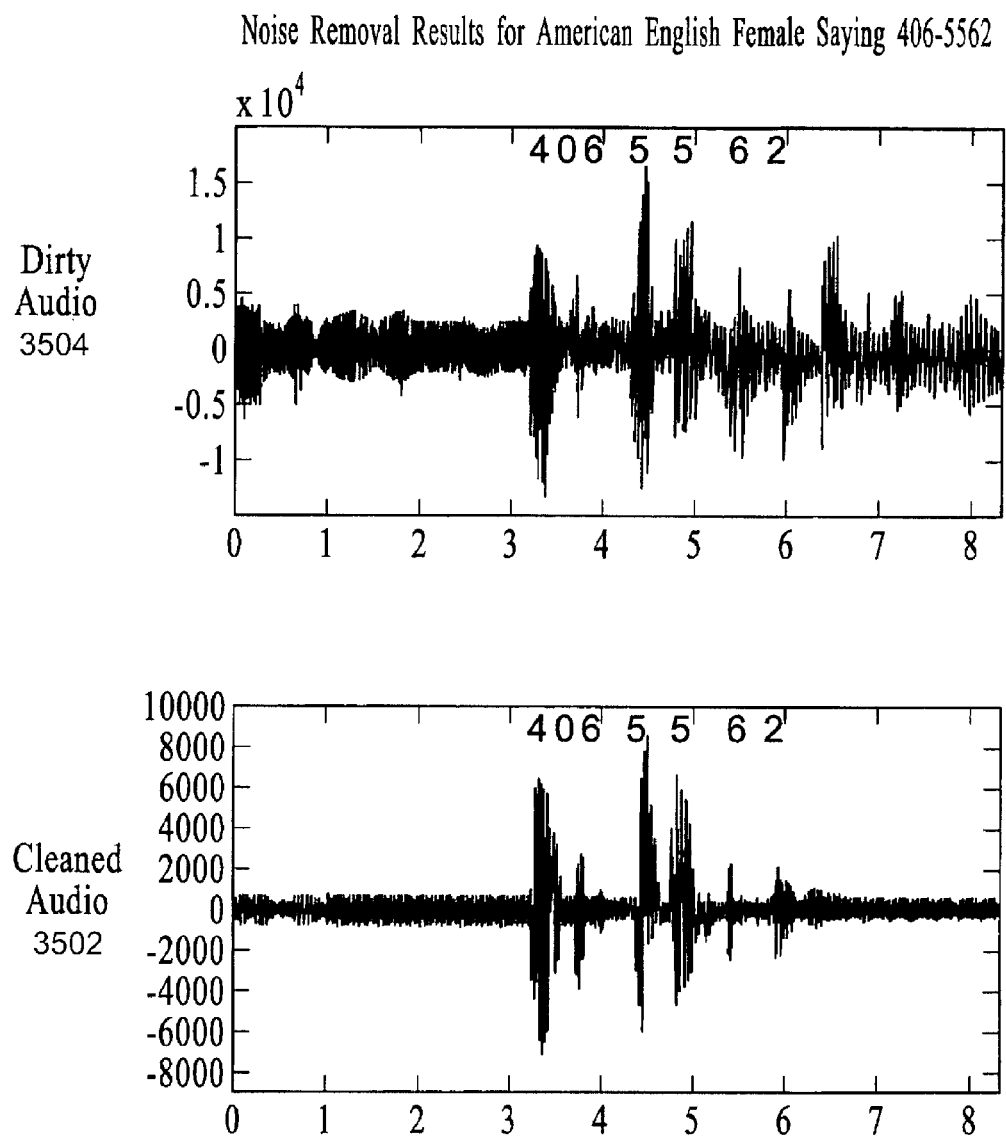
FIG. 35 shows results of a noise suppression algorithm of an embodiment for an American English female speaker in the presence of airport terminal noise that includes many other human speakers and public announcements.

FIG. 35 shows a denoised audio 3502 signal output upon application of the noise suppression algorithm of an embodiment to a dirty acoustic signal 3504, under an embodiment. The dirty acoustic signal 3504 includes speech of an American English-speaking female in the presence of airport terminal noise where the noise includes many other human speakers and public announcements. The speaker is uttering the numbers "406 5562" in the midst of moderate airport terminal noise. The dirty acoustic signal 3504 was denoised 10 milliseconds at a time, and before denoising the 10 milliseconds of data were prefiltered from 50 to 3700 Hz. A reduction in the noise of approximately 17 dB is evident. No post filtering was done on this sample; thus, all of the noise reduction realized is due to the algorithm of an embodiment. It is clear that the algorithm adjusts to the noise instantly, and is capable of removing the very difficult noise of other human speakers. Many different types of noise have all been tested with similar results, including street noise, helicopters, music, and sine waves. Also, the orientation of the noise can be varied substantially without significantly changing the noise suppression performance. Finally, the distortion of the cleaned speech is very low, ensuring good performance for speech recognition engines and human receivers alike.

The noise removal algorithm of an embodiment has been shown to be viable under any environmental conditions. The type and amount of noise are inconsequential if a good estimate has been made of $\tilde{H}_1$ and $\tilde{H}_2$. If the user environment is such that echoes are present, they can be compensated for if coming from a noise source. If signal echoes are also present, they will affect the cleaned signal, but the effect should be negligible in most environments.

When using the VAD devices and methods described herein with a noise suppression system, the VAD signal is processed independently of the noise suppression system, so that the receipt and processing of VAD information is independent from the processing associated with the noise suppression, but the embodiments are not so limited. This independence is attained physically (i.e., different hardware for use in receiving and processing signals relating to the VAD and the noise suppression), but is not so limited.

The VAD devices/methods described herein generally include vibration and movement sensors, but are not so limited. In one embodiment, an accelerometer is placed on the skin for use in detecting skin surface vibrations that correlate with human speech. These recorded vibrations are then used to calculate a VAD signal for use with or by an adaptive noise suppression algorithm in suppressing environmental acoustic noise from a simultaneously (within a few milliseconds) recorded acoustic signal that includes both speech and noise.

Another embodiment of the VAD devices/methods described herein includes an acoustic microphone modified with a membrane so that the microphone no longer efficiently detects acoustic vibrations in air. The membrane, though, allows the microphone to detect acoustic vibrations in objects with which it is in physical contact (allowing a good mechanical impedance match), such as human skin. That is, the acoustic microphone is modified in some way such that it no longer detects acoustic vibrations in air (where it no longer has a good physical impedance match), but only in objects with which the microphone is in contact. This configures the microphone, like the accelerometer, to detect vibrations of human skin associated with the speech production of that human while not efficiently detecting acoustic environmental noise in the air. The detected vibrations are processed to form a VAD signal for use in a noise suppression system, as detailed below.

Yet another embodiment of the VAD described herein uses an electromagnetic vibration sensor, such as a radiofrequency vibrometer (RF) or laser vibrometer, which detect skin vibrations. Further, the RF vibrometer detects the movement of tissue within the body, such as the inner surface of the cheek or the tracheal wall. Both the exterior skin and internal tissue vibrations associated with speech production can be used to form a VAD signal for use in a noise suppression system as detailed below.

Figure 36A:
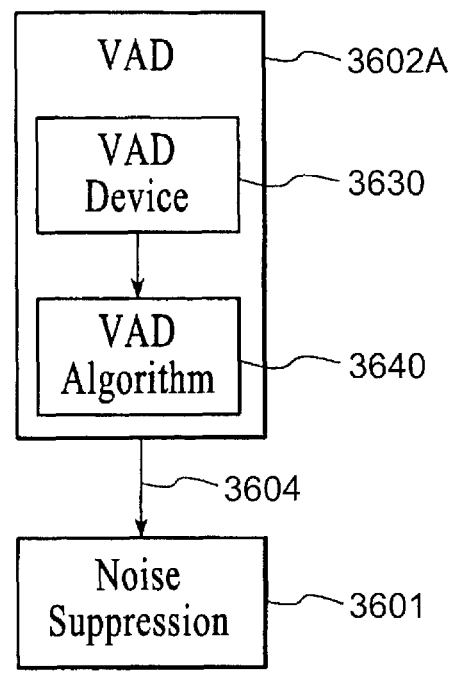
FIG. 36A is a block diagram of a Voice Activity Detector (VAD) system including hardware for use in receiving and processing signals relating to VAD, under an embodiment.

FIG. 36A is a block diagram of a VAD system 3602A including hardware for use in receiving and processing signals relating to VAD, under an embodiment. The VAD system 3602A includes a VAD device 3630 coupled to provide data to a corresponding VAD algorithm 3640. Note that noise suppression systems of alternative embodiments can integrate some or all functions of the VAD algorithm with the noise suppression processing in any manner obvious to those skilled in the art. Referring to FIG. 30, the voicing sensors 3020 include the VAD system 3602A, for example, but are not so limited. Referring to FIG. 31, the VAD includes the VAD system 3602A, for example, but is not so limited.

Figure 36B:
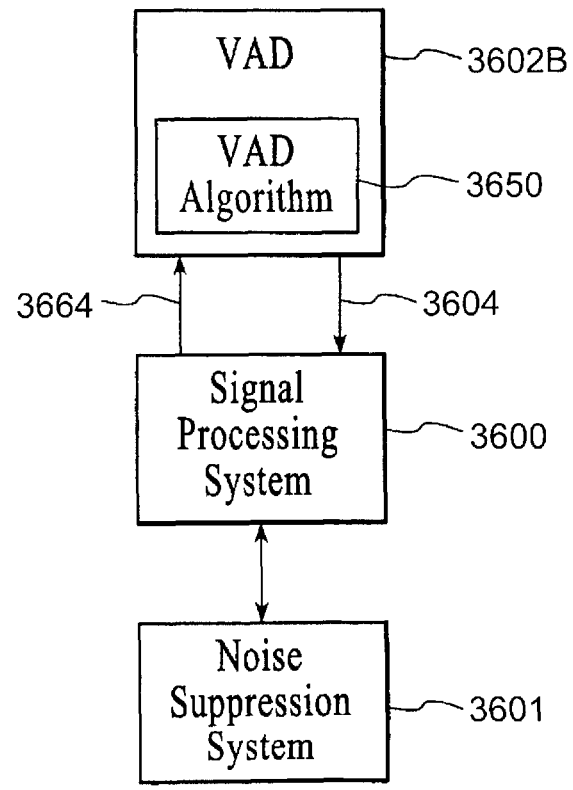
FIG. 36B is a block diagram of a VAD system using hardware of a coupled noise suppression system for use in receiving VAD information, under an alternative embodiment.

FIG. 36B is a block diagram of a VAD system 3602B using hardware of the associated noise suppression system 3601 for use in receiving VAD information 3664, under an embodiment. The VAD system 3602B includes a VAD algorithm 3650 that receives data 3664 from MIC 1 and MIC 2, or other components, of the corresponding signal processing system 3600. Alternative embodiments of the noise suppression system can integrate some or all functions of the VAD algorithm with the noise suppression processing in any manner obvious to those skilled in the art.

The vibration/movement-based VAD devices described herein include the physical hardware devices for use in receiving and processing signals relating to the VAD and the noise suppression. As a speaker or user produces speech, the resulting vibrations propagate through the tissue of the speaker and, therefore can be detected on and beneath the skin using various methods. These vibrations are an excellent source of VAD information, as they are strongly associated with both voiced and unvoiced speech (although the unvoiced speech vibrations are much weaker and more difficult to detect) and generally are only slightly affected by environmental acoustic noise (some devices/methods, for example the electromagnetic vibrometers described below, are not affected by environmental acoustic noise). These tissue vibrations or movements are detected using a number of VAD devices including, for example, accelerometer-based devices, skin surface microphone (SSM) devices, and electromagnetic (EM) vibrometer devices including both radio frequency (RF) vibrometers and laser vibrometers.

Accelerometer-Based VAD Devices/Methods

Accelerometers can detect skin vibrations associated with speech. As such, and with reference to FIG. 31 and FIG. 36A, a VAD system 3602A of an embodiment includes an accelerometer-based device 3630 providing data of the skin vibrations to an associated algorithm 3640. The algorithm 3640 of an embodiment uses energy calculation techniques along with a threshold comparison, as described herein, but is not so limited. Note that more complex energy-based methods are available to those skilled in the art.

Figure 37:
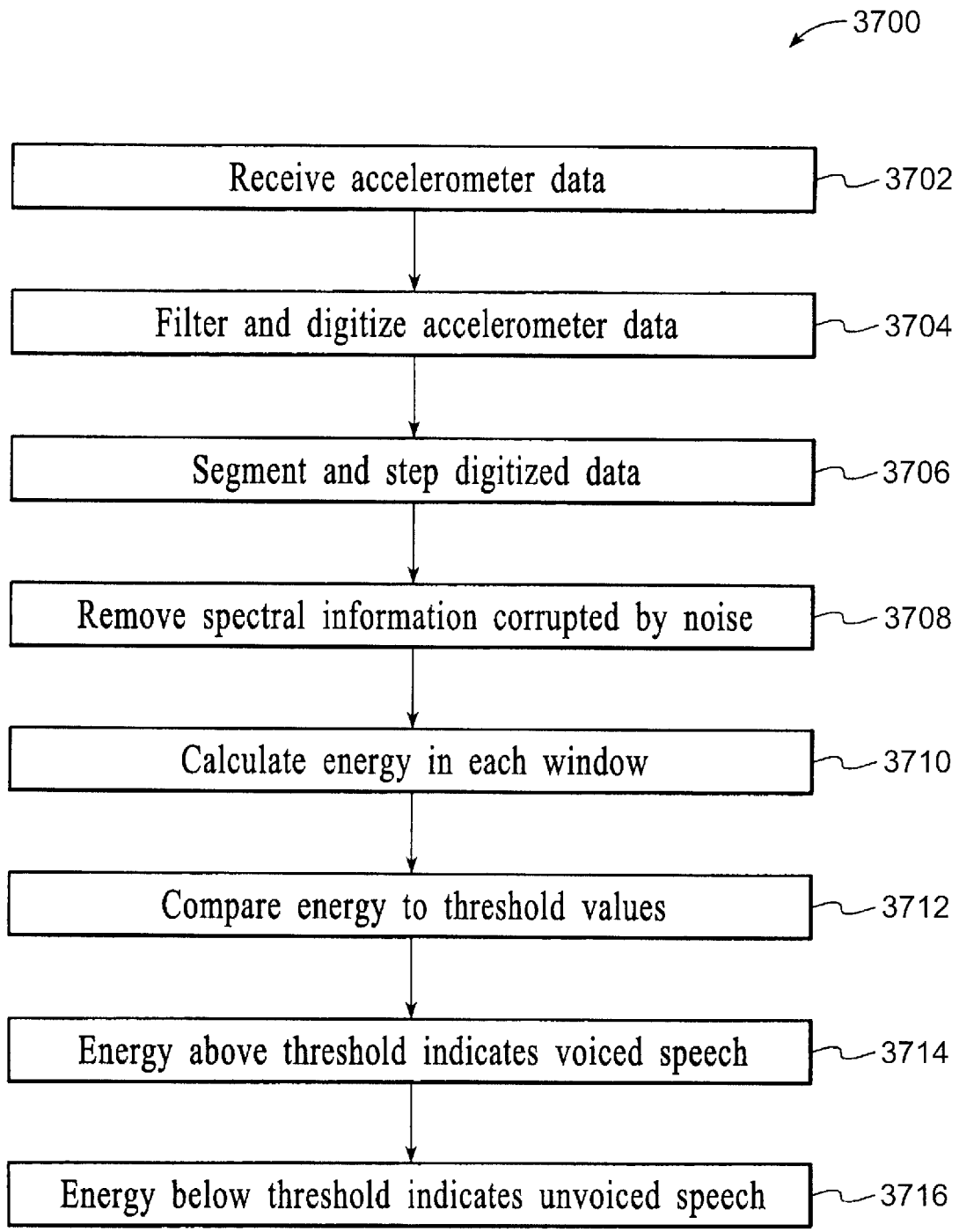
FIG. 37 is a flow diagram of a method for determining voiced and unvoiced speech using an accelerometer-based VAD, under an embodiment.

FIG. 37 is a flow diagram 3700 of a method for determining voiced and unvoiced speech using an accelerometer-based VAD, under an embodiment. Generally, the energy is calculated by defining a standard window size over which the calculation is to take place and summing the square of the amplitude over time as $$\text{Energy} = \sum_i x_i^2,$$

where i is the digital sample subscript and ranges from the beginning of the window to the end of the window.

Referring to FIG. 37, operation begins upon receiving accelerometer data, at block 3702. The processing associated with the VAD includes filtering the data from the accelerometer to preclude aliasing, and digitizing the filtered data for processing, at block 3704. The digitized data is segmented into windows 20 milliseconds (msec) in length, and the data is stepped 8 msec at a time, at block 3706. The processing further includes filtering the windowed data, at block 3708, to remove spectral information that is corrupted by noise or is otherwise unwanted. The energy in each window is calculated by summing the squares of the amplitudes as described above, at block 3710. The calculated energy values can be normalized by dividing the energy values by the window length; however, this involves an extra calculation and is not needed as long as the window length is not varied.

The calculated, or normalized, energy values are compared to a threshold, at block 3712. The speech corresponding to the accelerometer data is designated as voiced speech when the energy of the accelerometer data is at or above a threshold value, at block 3714. Likewise, the speech corresponding to the accelerometer data is designated as unvoiced speech when the energy of the accelerometer data is below the threshold value, at block 3716. Noise suppression systems of alternative embodiments can use multiple threshold values to indicate the relative strength or confidence of the voicing signal, but are not so limited. Multiple subbands may also be processed for increased accuracy.

Figure 38:
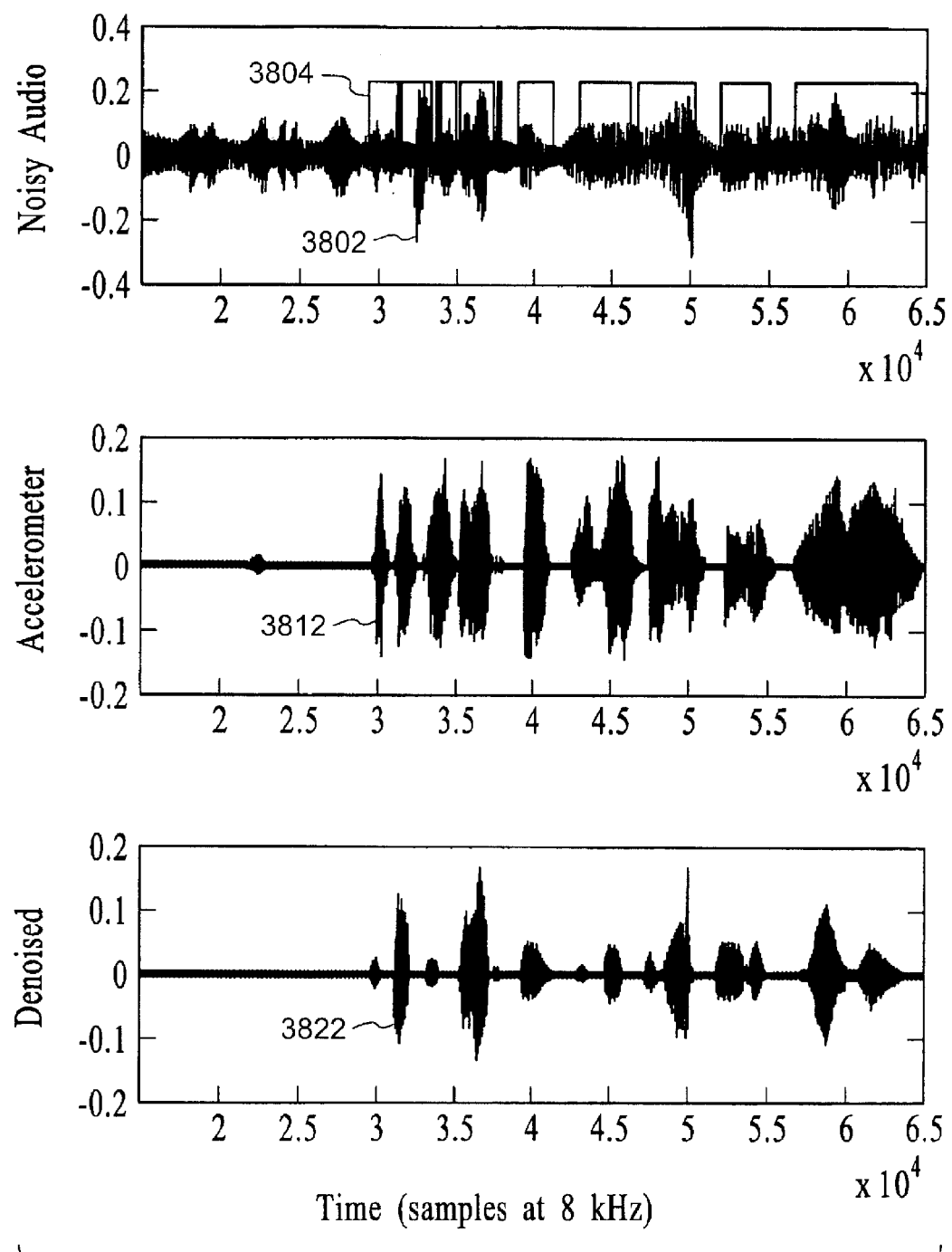
FIG. 38 shows plots including a noisy audio signal (live recording) along with a corresponding accelerometer-based VAD signal, the corresponding accelerometer output signal, and the denoised audio signal following processing by the noise suppression system using the VAD signal, under an embodiment.

FIG. 38 shows plots including a noisy audio signal (live recording) 3802 along with a corresponding accelerometer-based VAD signal 3804, the corresponding accelerometer output signal 3812, and the denoised audio signal 3822 following processing by the noise suppression system using the VAD signal 3804, under an embodiment. The noise suppression system of this embodiment includes an accelerometer (Model 352A24) from PCB Piezotronics, but is not so limited. In this example, the accelerometer data has been band-pass filtered between 500 and 2500 Hz to remove unwanted acoustic noise that can couple to the accelerometer below 500 Hz. The audio signal 3802 was recorded using a microphone set and standard accelerometer in a babble noise environment inside a chamber measuring six (6) feet on a side and having a ceiling height of eight (8) feet. The microphone set, for example, is available from Aliph, Brisbane, Calif. The noise suppression system is implemented in real-time, with a delay of approximately 10 msec. The difference in the raw audio signal 3802 and the denoised audio signal 3822 shows noise suppression approximately in the range of 25-30 dB with little distortion of the desired speech signal. Thus, denoising using the accelerometer-based VAD information is very effective.

Skin Surface Microphone (SSM) VAD Devices/Methods

Referring again to FIG. 31 and FIG. 36A, a VAD system 3602A of an embodiment includes a SSM VAD device 3630 providing data to an associated algorithm 3640. The SSM is a conventional microphone modified to prevent airborne acoustic information from coupling with the microphone's detecting elements. A layer of silicone or other covering changes the impedance of the microphone and prevents airborne acoustic information from being detected to a significant degree. Thus this microphone is shielded from airborne acoustic energy but is able to detect acoustic waves traveling in media other than air as long as it maintains physical contact with the media. The silicone or similar material allows the microphone to mechanically couple efficiently with the skin of the user.

During speech, when the SSM is placed on the cheek or neck, vibrations associated with speech production are easily detected. However, airborne acoustic data is not significantly detected by the SSM. The tissue-borne acoustic signal, upon detection by the SSM, is used to generate the VAD signal in processing and denoising the signal of interest, as described above with reference to the energy/threshold method used with accelerometer-based VAD signal and FIG. 37.

Figure 39:
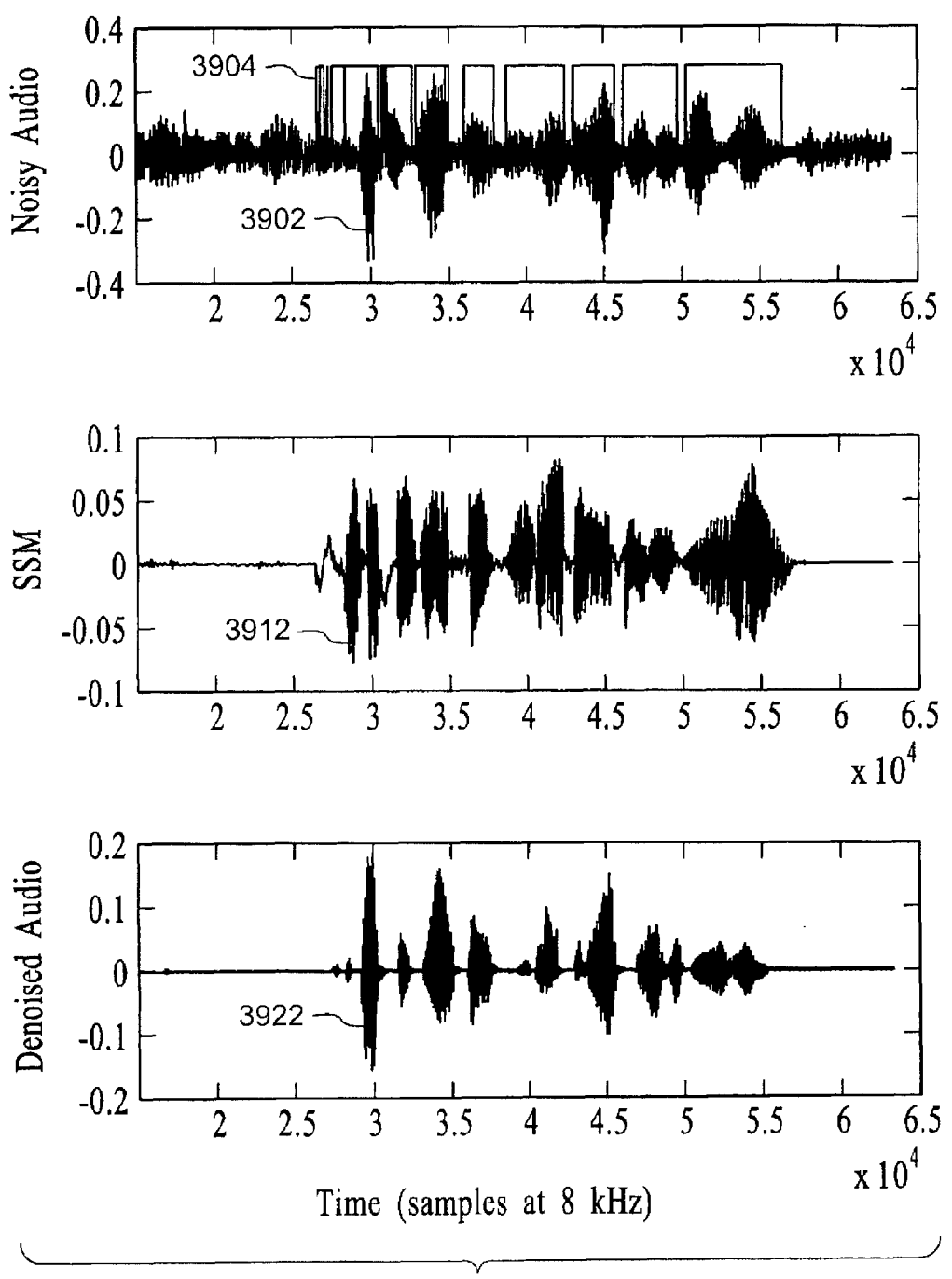
FIG. 39 shows plots including a noisy audio signal (live recording) along with a corresponding SSM-based VAD signal, the corresponding SSM output signal, and the denoised audio signal following processing by the noise suppression system using the VAD signal, under an embodiment.

FIG. 39 shows plots including a noisy audio signal (live recording) 3902 along with a corresponding SSM-based VAD signal 3904, the corresponding SSM output signal 3912, and the denoised audio signal 3922 following processing by the noise suppression system using the VAD signal 3904, under an embodiment. The audio signal 3902 was recorded using an Aliph microphone set and standard accelerometer in a babble noise environment inside a chamber measuring six (6) feet on a side and having a ceiling height of eight (8) feet. The noise suppression system is implemented in real-time, with a delay of approximately 10 msec. The difference in the raw audio signal 3902 and the denoised audio signal 3922 clearly show noise suppression approximately in the range of 20-25 dB with little distortion of the desired speech signal. Thus, denoising using the SSM-based VAD information is effective.

Electromagnetic (EM) Vibrometer VAD Devices/Methods

Returning to FIG. 31 and FIG. 36A, a VAD system 3602A of an embodiment includes an EM vibrometer VAD device 3630 providing data to an associated algorithm 3640. The EM vibrometer devices also detect tissue vibration, but can do so at a distance and without direct contact of the tissue targeted for measurement. Further, some EM vibrometer devices can detect vibrations of internal tissue of the human body. The EM vibrometers are unaffected by acoustic noise, making them good choices for use in high noise environments. The noise suppression system of an embodiment receives VAD information from EM vibrometers including, but not limited to, RF vibrometers and laser vibrometers, each of which are described in turn below.

The RF vibrometer operates in the radio to microwave portion of the electromagnetic spectrum, and is capable of measuring the relative motion of internal human tissue associated with speech production. The internal human tissue includes tissue of the trachea, cheek, jaw, and/or nose/nasal passages, but is not so limited. The RF vibrometer senses movement using low-power radio waves, and data from these devices has been shown to correspond very well with calibrated targets. As a result of the absence of acoustic noise in the RF vibrometer signal, the VAD system of an embodiment uses signals from these devices to construct a VAD using the energy/threshold method described above with reference to the accelerometer-based VAD and FIG. 37.

An example of an RF vibrometer is the General Electromagnetic Motion Sensor (GEMS) radiovibrometer available from Aliph, located in Brisbane, Calif. Other RF vibrometers are described in the Related Applications and by Gregory C. Burnett in "The Physiological Basis of Glottal Electromagnetic Micropower Sensors (GEMS) and Their Use in Defining an Excitation Function for the Human Vocal Tract", Ph. D. Thesis, University of California Davis, January 1999.

Laser vibrometers operate at or near the visible frequencies of light, and are therefore restricted to surface vibration detection only, similar to the accelerometer and the SSM described above. Like the RF vibrometer, there is no acoustic noise associated with the signal of the laser vibrometers. Therefore, the VAD system of an embodiment uses signals from these devices to construct a VAD using the energy/threshold method described above with reference to the accelerometer-based VAD and FIG. 37.

Figure 40:
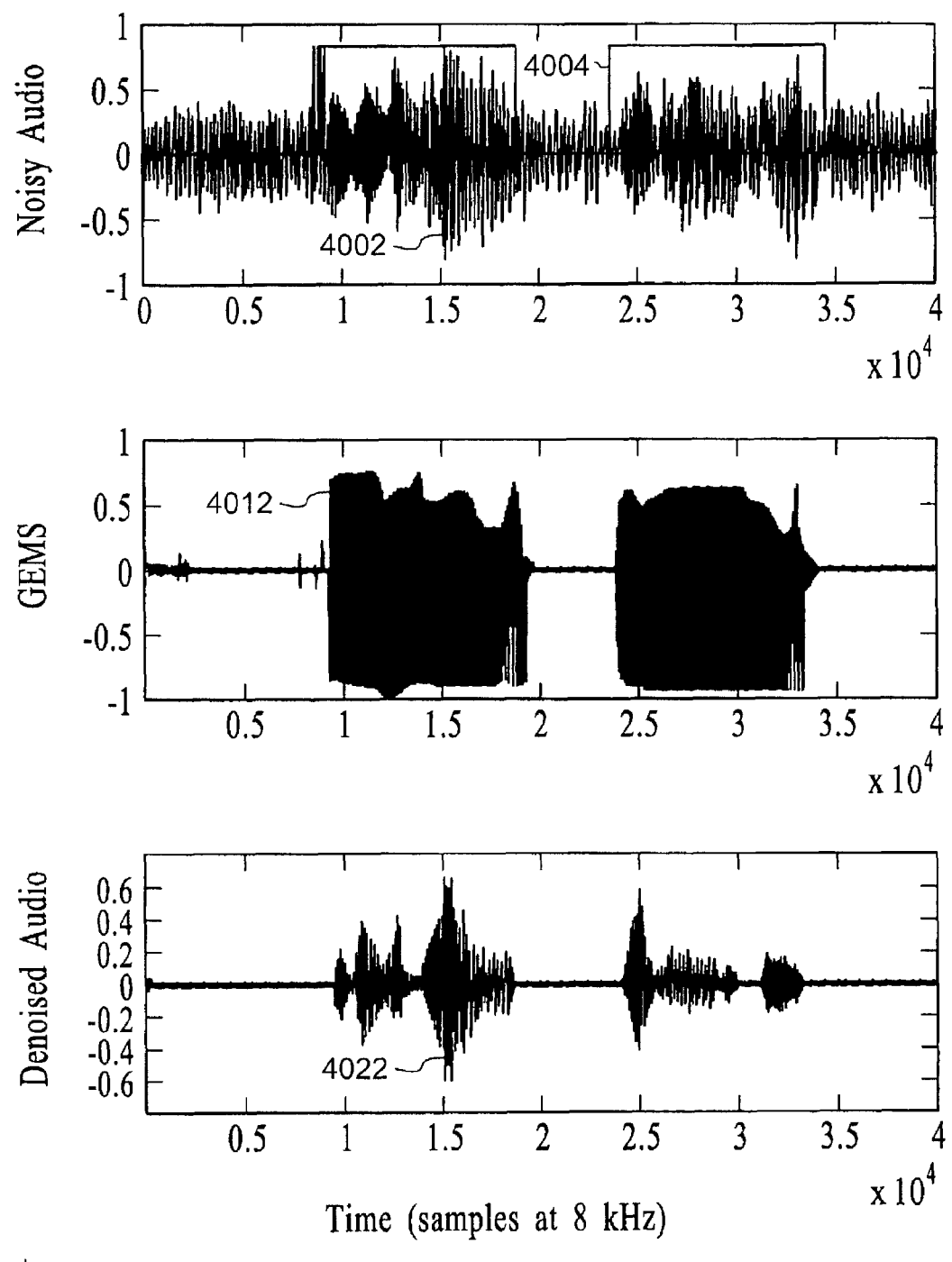
FIG. 40 shows plots including a noisy audio signal (live recording) along with a corresponding GEMS-based VAD signal, the corresponding GEMS output signal, and the denoised audio signal following processing by the noise suppression system using the VAD signal, under an embodiment.

FIG. 40 shows plots including a noisy audio signal (live recording) 4002 along with a corresponding GEMS-based VAD signal 4004, the corresponding GEMS output signal 4012, and the denoised audio signal 4022 following processing by the noise suppression system using the VAD signal 4004, under an embodiment. The GEMS-based VAD signal 4004 was received from a trachea-mounted GEMS radiovibrometer from Aliph, Brisbane, Calif. The audio signal 4002 was recorded using an Aliph microphone set in a babble noise environment inside a chamber measuring six (6) feet on a side and having a ceiling height of eight (8) feet. The noise suppression system is implemented in real-time, with a delay of approximately 10 msec. The difference in the raw audio signal 4002 and the denoised audio signal 4022 clearly show noise suppression approximately in the range of 20-25 dB with little distortion of the desired speech signal. Thus, denoising using the GEMS-based VAD information is effective. It is clear that both the VAD signal and the denoising are effective, even though the GEMS is not detecting unvoiced speech. Unvoiced speech is normally low enough in energy that it does not significantly affect the convergence of $H_1(z)$ and therefore the quality of the denoised speech.

Embodiments described herein include a system comprising a wireless communication device (WCD) worn by a near-end participant during a telephone call with a far-end participant. The WCD includes at least one microphone. The system includes a telephony gateway remote to the WCD and including an audio processor coupled to a wireless radio that forms an audio channel with the WCD. The audio processor generates a first audio signal from signals received from the WCD. The telephony gateway comprises a connection component coupled to the audio processor and to a network carrying the telephone call. The connection component couples the first audio signal to the network for transmission to the far-end participant. The connection component receives a second audio signal from the far-end participant. The system includes a speaker coupled to the connection component and outputting the second audio signal.

Embodiments described herein include a system comprising: a wireless communication device (WCD) worn by a near-end participant during a telephone call with a far-end participant, wherein the WCD includes at least one microphone; a telephony gateway remote to the WCD and including an audio processor coupled to a wireless radio that forms an audio channel with the WCD, wherein the audio processor generates a first audio signal from signals received from the WCD, wherein the telephony gateway comprises a connection component coupled to the audio processor and to a network carrying the telephone call, wherein the connection component couples the first audio signal to the network for transmission to the far-end participant, wherein the connection component receives a second audio signal from the far-end participant; and a speaker coupled to the connection component and outputting the second audio signal.

The at least one microphone of an embodiment comprises an omnidirectional microphone.

The at least one microphone of an embodiment comprises a directional microphone.

The at least one microphone of an embodiment comprises two microphones.

The WCD of an embodiment comprises a signal processor coupled to the at least one microphone.

The signal processor of an embodiment performs demultiplexing on signals from the at least one microphone.

The signal processor of an embodiment performs echo cancellation on signals from the at least one microphone.

The signal processor of an embodiment performs noise suppression on signals from the at least one microphone.

The signal processor of an embodiment performs voice activity detection on signals from the at least one microphone.

The WCD of an embodiment comprises a headset that contains the at least one microphone and the signal processor, wherein the headset is worn in a head region of the near-end participant.

The WCD of an embodiment comprises a pendant that contains the at least one microphone and the signal processor, wherein the pendant is worn on a near-end participant.

The WCD of an embodiment includes the speaker, wherein the telephony gateway transmits the second audio signal to the WCD and the speaker outputs the second audio signal.

The WCD of an embodiment comprises a headset that contains the at least one microphone, the speaker, and the signal processor, wherein the headset is worn in a head region of the near-end participant.

The WCD of an embodiment is hard-coded to the telephony gateway.

The WCD of an embodiment includes a detector that electronically detects at least one other WCD within a pre-specified range of the WCD.

The telephony gateway of an embodiment includes the speaker.

The speaker of an embodiment outputs the first audio signal.

The speaker of an embodiment outputs the second audio signal.

The WCD of an embodiment comprises a pendant that contains the at least one microphone, wherein the pendant is worn on a near-end participant.

The system of an embodiment comprises a telephone interface coupled to the connection component, wherein the telephone interface is used to control parameters of the telephone call.

The telephone interface of an embodiment includes a dialing interface.

The wireless radio of an embodiment comprises a Bluetooth radio.

The telephony gateway of an embodiment includes a charger, wherein the WCD couples to the charger to recharge.

The WCD of an embodiment includes a pairing mode, wherein in the pairing mode the WCD searches for at least one of the telephony gateway and at least one other WCD with which to electronically pair.

The telephony gateway of an embodiment includes a pairing mode, wherein in the pairing mode the telephony gateway searches for the WCD with which to electronically pair.

The electronic pairing of an embodiment between the WCD and the telephony gateway is classified as transient, wherein the pairing classified as transient is subsequently erased by the telephony gateway.

The audio processor of an embodiment performs demultiplexing on each incoming signal from each WCD.

The audio processor of an embodiment performs echo cancellation on each incoming signal from each WCD.

The audio processor of an embodiment performs noise suppression on each incoming signal from each WCD.

The audio processor of an embodiment performs voice activity detection on each incoming signal from each WCD.

The audio processor of an embodiment performs spatialization on each incoming signal from each WCD.

The audio processor of an embodiment performs equalization on each incoming signal from each WCD.

The connection component of an embodiment manages the audio channel with the WCD.

The system of an embodiment comprises a plurality of wireless communication devices (WCDs) that includes the WCD, wherein the plurality of WCDs is worn by a plurality of near-end participants during the telephone call.

The telephony gateway of an embodiment comprises a plurality of wireless radios that includes the wireless radio, wherein the plurality of wireless radios is coupled to the audio processor, wherein each wireless radio is electronically paired with a corresponding WCD of the plurality of WCDs and provides a dedicated channel with the corresponding WCD.

The plurality of wireless radios of an embodiment comprises a plurality of Bluetooth radios.

The telephony gateway of an embodiment electronically labels each incoming signal from each WCD.

The audio processor of an embodiment integrates signals received from the plurality of WCDs to generate the first audio signal.

The audio processor of an embodiment integrates signals received from the plurality of WCDs by calculating a dynamic gain for each dedicated channel corresponding to each WCD.

The calculating of the dynamic gain of an embodiment comprises calculating a root-mean-square when the near-end participant is speaking.

The telephony gateway of an embodiment transmits the second audio signal to the plurality of WCDs.

The system of an embodiment comprises a plurality of speakers that include the speaker, wherein each WCD of the plurality of WCDs includes a speaker of the plurality of speakers, wherein the telephony gateway transmits the second audio signal to the plurality of WCDs and the plurality of speakers outputs the second audio signal.

The connection component of an embodiment manages the dedicated channels with the plurality of WCDs.

Each WCD of an embodiment includes a detector, wherein the detector of a WCD electronically detects at least one WCD within a pre-specified range of the WCD.

Embodiments described herein include a system comprising at least one wireless communication device (WCD) worn by at least one near-end participant during a telephone call with a far-end participant. The system includes a telephony gateway remote to the at least one WCD and including an audio processor coupled to at least one wireless radio that forms at least one audio channel with the at least one WCD. The audio processor generates an integrated audio signal from signals received from the at least one WCD. The telephony gateway comprises a connection component coupled to the audio processor and to a network carrying the telephone call. The connection component couples the integrated audio signal to the network for transmission to the far-end participant.

Embodiments described herein include a system comprising: at least one wireless communication device (WCD) worn by at least one near-end participant during a telephone call with a far-end participant; and a telephony gateway remote to the at least one WCD and including an audio processor coupled to at least one wireless radio that forms at least one audio channel with the at least one WCD, wherein the audio processor generates an integrated audio signal from signals received from the at least one WCD, wherein the telephony gateway comprises a connection component coupled to the audio processor and to a network carrying the telephone call, wherein the connection component couples the integrated audio signal to the network for transmission to the far-end participant.

Embodiments described herein include a system comprising a plurality of wireless communication devices (WCDs) worn by a plurality of near-end participants during a telephone call with a far-end participant. The system includes a telephony gateway remote to the plurality of WCDs and including an audio processor coupled to at least one wireless radio that forms a dedicated audio channel with each WCD of the plurality of WCDs. The audio processor generates an integrated audio signal from the plurality of signals received from the plurality of WCDs. The telephony gateway comprises a connection component coupled to the audio processor and to a network carrying the telephone call. The connection component couples the integrated audio signal to the network for transmission to the far-end participant.

Embodiments described herein include a system comprising: a plurality of wireless communication devices (WCDs) worn by a plurality of near-end participants during a telephone call with a far-end participant; and a telephony gateway remote to the plurality of WCDs and including an audio processor coupled to at least one wireless radio that forms a dedicated audio channel with each WCD of the plurality of WCDs, wherein the audio processor generates an integrated audio signal from the plurality of signals received from the plurality of WCDs, wherein the telephony gateway comprises a connection component coupled to the audio processor and to a network carrying the telephone call, wherein the connection component couples the integrated audio signal to the network for transmission to the far-end participant.

Embodiments described herein include a telephony gateway comprising an audio processor coupled to at least one wireless radio that forms at least one audio channel with at least one wireless communication device (WCD) that is remote to the telephony gateway and worn by at least one near-end participant during a telephone call with a far-end participant. The audio processor generates an integrated audio signal from signals received from the at least one WCD. The telephony gateway comprises a connection component coupled to the audio processor and to a network carrying the telephone call. The connection component couples the integrated audio signal to the network for transmission to the far-end participant.

Embodiments described herein include a telephony gateway comprising an audio processor coupled to at least one wireless radio that forms at least one audio channel with at least one wireless communication device (WCD) that is remote to the telephony gateway and worn by at least one near-end participant during a telephone call with a far-end participant, wherein the audio processor generates an integrated audio signal from signals received from the at least one WCD, wherein the telephony gateway comprises a connection component coupled to the audio processor and to a network carrying the telephone call, wherein the connection component couples the integrated audio signal to the network for transmission to the far-end participant.

Embodiments described herein include a telephony gateway comprising an audio processor coupled to at least one wireless radio that forms a plurality of audio channels with a plurality of wireless communication devices (WCDs) that is remote to the telephony gateway and worn by near-end participants during a telephone call with a far-end participant. The audio processor generates an integrated audio signal from signals received from the plurality of WCDs. The telephony gateway couples the integrated audio signal to the network for transmission to the far-end participant.

Embodiments described herein include a telephony gateway comprising an audio processor coupled to at least one wireless radio that forms a plurality of audio channels with a plurality of wireless communication devices (WCDs) that is remote to the telephony gateway and worn by near-end participants during a telephone call with a far-end participant, wherein the audio processor generates an integrated audio signal from signals received from the plurality of WCDs, wherein the telephony gateway couples the integrated audio signal to the network for transmission to the far-end participant.

Embodiments described herein include a system comprising a plurality of wireless communication devices (WCDs). Each WCD is worn by a near-end participant during a telephone call with a far-end participant. The system includes a telephony gateway including, a plurality of radios. Each radio is electronically paired with a corresponding WCD of the plurality of WCDs and provides a dedicated channel with the corresponding WCD. The system includes a processor coupled to the plurality of radios. The processor integrates signals received from the plurality of WCDs into a first audio signal. The system includes a telephony component coupled to the processor and to a network carrying the telephone call. The telephony component couples the first audio signal to the network for transmission to the far-end participant. The telephony component receives a second audio signal from the far-end participant. The system includes a telephone interface coupled to the telephony component. The telephone interface is used to control parameters of the telephone call.

Embodiments described herein include a system comprising: a plurality of wireless communication devices (WCDs), wherein each WCD is worn by a near-end participant during a telephone call with a far-end participant; and a telephony gateway including, a plurality of radios, wherein each radio is electronically paired with a corresponding WCD of the plurality of WCDs and provides a dedicated channel with the corresponding WCD; a processor coupled to the plurality of radios, wherein the processor integrates signals received from the plurality of WCDs into a first audio signal; a telephony component coupled to the processor and to a network carrying the telephone call, wherein the telephony component couples the first audio signal to the network for transmission to the far-end participant, wherein the telephony component receives a second audio signal from the far-end participant; a telephone interface coupled to the telephony component, wherein the telephone interface is used to control parameters of the telephone call.

The WCD of an embodiment includes at least one microphone.

The at least one microphone of an embodiment comprises an omnidirectional microphone.

The at least one microphone of an embodiment comprises a directional microphone.

The WCD of an embodiment comprises a signal processor coupled to the at least one microphone.

The signal processor of an embodiment performs demultiplexing on each incoming signal from each WCD.

The signal processor of an embodiment performs echo cancellation on each incoming signal from each WCD.

The signal processor of an embodiment performs noise suppression on each incoming signal from each WCD.

The signal processor of an embodiment performs voice activity detection on each incoming signal from each WCD.

The signal processor of an embodiment electronically labels each signal output from each WCD.

The WCD of an embodiment comprises a headset that contains the at least one microphone and the signal processor, wherein the headset is worn in a head region of the near-end participant.

The WCD of an embodiment comprises a pendant that contains the at least one microphone and the signal processor, wherein the pendant is worn on a near-end participant.

Each WCD of an embodiment includes a speaker coupled to the signal processor.

The telephony gateway of an embodiment transmits the second audio signal to the plurality of WCDs.

The speaker of an embodiment outputs the second audio signal.

The WCD of an embodiment comprises a headset that contains the at least one microphone, the speaker, and the signal processor, wherein the headset is worn in a head region of the near-end participant.

Each WCD of an embodiment is hard-coded to the telephony gateway.

At least one WCD of an embodiment is coupled to the telephony gateway using a wireless coupling.

At least one WCD of an embodiment is coupled to the telephony gateway using a wired coupling.

Each WCD of an embodiment includes a detector, wherein the detector of a WCD electronically detects at least one WCD within a pre-specified range of the WCD.

The processor of an embodiment integrates signals received from the plurality of WCDs by calculating a dynamic gain for each dedicated channel corresponding to each WCD.

The calculating of the dynamic gain of an embodiment comprises calculating a root-mean-square when the near-end participant is speaking.

The telephony gateway of an embodiment includes a speaker coupled to the processor.

The speaker of an embodiment outputs the first audio signal.

The speaker of an embodiment outputs the second audio signal.

The WCD of an embodiment comprises a pendant that contains the at least one microphone, wherein the pendant is worn on a near-end participant.

The telephone interface of an embodiment includes a dialing interface.

The plurality of radios of an embodiment comprises a plurality of Bluetooth radios.

The telephony gateway of an embodiment electronically labels each incoming signal from each WCD.

The telephony gateway of an embodiment includes a charger, wherein the plurality of WCDs couple to the charger to recharge.

At least one WCD of an embodiment includes a pairing mode, wherein in the pairing mode the at least one WCD searches for at least one of the telephony gateway and at least one other WCD with which to electronically pair.

The telephony gateway of an embodiment includes a pairing mode, wherein in the pairing mode the telephony gateway searches for at least one WCD with which to electronically pair.

The electronic pairing of an embodiment between a WCD of the plurality of WCDs and the telephony gateway is classified as transient, wherein the pairing classified as transient is subsequently erased by the telephony gateway.

The processor of an embodiment comprises an audio processing subsystem.

The audio processing subsystem of an embodiment performs demultiplexing on each incoming signal from each WCD.

The audio processing subsystem of an embodiment performs echo cancellation on each incoming signal from each WCD.

The audio processing subsystem of an embodiment performs noise suppression on each incoming signal from each WCD.

The audio processing subsystem of an embodiment performs voice activity detection on each incoming signal from each WCD.

The audio processing subsystem of an embodiment performs spatialization on each incoming signal from each WCD.

The audio processing subsystem of an embodiment performs equalization on each incoming signal from each WCD.

The processor of an embodiment comprises a connection management subsystem that manages the dedicated channels with the plurality of WCDs.

Embodiments described herein include a method comprising establishing an electronic pairing between a plurality of wireless communication devices (WCDs) and a telephony gateway that is remote to the plurality of WCDs. The plurality of WCDs is worn by a plurality of near-end participants. The method includes receiving at the telephony gateway audio signals from the plurality of WCDs. The method includes generating in response to the audio signals a first audio signal. The generating comprises integrating the audio signals from the plurality of WCDs. The method includes establishing a conference call between the plurality of near-end participants and a far-end participant by coupling the first audio signal to a network that transmits the first audio signal to the far-end participant.

Embodiments described herein include a method comprising: establishing an electronic pairing between a plurality of wireless communication devices (WCDs) and a telephony gateway that is remote to the plurality of WCDs, wherein the plurality of WCDs is worn by a plurality of near-end participants; receiving at the telephony gateway audio signals from the plurality of WCDs; generating in response to the audio signals a first audio signal, the generating comprising integrating the audio signals from the plurality of WCDs; and establishing a conference call between the plurality of near-end participants and a far-end participant by coupling the first audio signal to a network that transmits the first audio signal to the far-end participant.

Embodiments described herein include a method comprising establishing an electronic pairing between a plurality of wireless communication devices (WCDs) and a telephony gateway that is remote to the plurality of WCDs. The plurality of WCDs is worn by a plurality of near-end participants during a telephone call with a far-end participant. The method includes receiving at the telephony gateway audio signals from the plurality of WCDs. The method includes generating in response to the audio signals a first audio signal. The generating comprises integrating the audio signals from the plurality of WCDs. The method includes coupling the first audio signal to a network for transmission to the far-end participant. The method includes receiving at the telephony gateway a second audio signal from the far-end participant; and outputting the second audio signal at a speaker coupled to the telephony gateway.

Embodiments described herein include a method comprising: establishing an electronic pairing between a plurality of wireless communication devices (WCDs) and a telephony gateway that is remote to the plurality of WCDs, wherein the plurality of WCDs is worn by a plurality of near-end participants during a telephone call with a far-end participant; receiving at the telephony gateway audio signals from the plurality of WCDs; generating in response to the audio signals a first audio signal, the generating comprising integrating the audio signals from the plurality of WCDs; coupling the first audio signal to a network for transmission to the far-end participant; receiving at the telephony gateway a second audio signal from the far-end participant; and outputting the second audio signal at a speaker coupled to the telephony gateway.

The establishing of the electronic pairing of an embodiment comprises establishing an electronic pairing between at least one wireless radio of the telephony gateway and a corresponding WCD of the plurality of WCDs, wherein the electronic pairing provides a dedicated channel between the telephony gateway and the corresponding WCD.

The integrating of the audio signals of an embodiment comprises calculating a dynamic gain for each dedicated channel corresponding to each WCD.

The calculating of the dynamic gain of an embodiment comprises calculating a root-mean-square when the near-end participant is speaking.

The method of an embodiment comprises electronically labeling each signal from each WCD.

Each WCD of an embodiment comprises at least one microphone.

The at least one microphone of an embodiment comprises an omnidirectional microphone.

The at least one microphone of an embodiment comprises a directional microphone.

The at least one microphone of an embodiment comprises two microphones.

The method of an embodiment comprises demultiplexing signals received at each WCD.

The method of an embodiment comprises performing echo cancellation on signals received at each WCD.

The method of an embodiment comprises performing noise suppression on signals received at each WCD.

The method of an embodiment comprises performing voice activity detection on signals received at each WCD.

The method of an embodiment comprises locating the speaker in each WCD.

The method of an embodiment comprises transmitting the second audio signal to each WCD and outputting the second audio signal via the speaker.

The method of an embodiment comprises locating the speaker in the telephony gateway.

The method of an embodiment comprises outputting the first audio signal via the speaker.

The method of an embodiment comprises outputting the second audio signal via the speaker.

The method of an embodiment comprises hard-coding each WCD to the telephony gateway.

The method of an embodiment comprises electronically detecting at a WCD at least one other WCD within a pre-specified range of the WCD.

The method of an embodiment comprises controlling parameters of the telephone call using a telephone interface of the telephone gateway.

The wireless radio of an embodiment comprises a Bluetooth radio.

The method of an embodiment comprises recharging each WCD at the telephony gateway using a charger of the WCD.

The method of an embodiment comprises each WCD searching for at least one other WCD with which to electronically pair.

The method of an embodiment comprises each WCD searching for the telephony gateway with which to establish the electronic pairing.

The method of an embodiment comprises the telephony gateway searching for a WCD with which to establish the electronic pairing.

The method of an embodiment comprises classifying the electronic pairing between at least one WCD and the telephony gateway as transient. The method of an embodiment comprises erasing information of the electronic pairing subsequent to completion of the telephone call.

The method of an embodiment comprises demultiplexing at the telephony gateway each incoming signal from each WCD.

The method of an embodiment comprises performing at the telephony gateway echo cancellation on each incoming signal from each WCD.

The method of an embodiment comprises performing at the telephony gateway noise suppression on each incoming signal from each WCD.

The method of an embodiment comprises performing at the telephony gateway voice activity detection on each incoming signal from each WCD.

The method of an embodiment comprises performing at the telephony gateway spatialization on each incoming signal from each WCD.

The method of an embodiment comprises performing at the telephony gateway equalization on each incoming signal from each WCD.

The method of an embodiment comprises managing and controlling at the telephony gateway the audio channel with the WCD.

Embodiments described herein include a system comprising a wireless communication device (WCD) worn by a near-end participant during a telephone call with a far-end participant. The WCD includes a microphone array. The system includes a telephony gateway remote to the WCD and including an audio processor coupled to a wireless radio that forms an audio channel with the WCD. The audio processor generates a first audio signal from signals received from the WCD. The telephony gateway comprises a connection component coupled to the audio processor and to a network carrying the telephone call. The connection component couples the first audio signal to the network for transmission to the far-end participant. The connection component receives a second audio signal from the far-end participant. The system includes a speaker coupled to the connection component and outputting the second audio signal.

Embodiments described herein include a system comprising: a wireless communication device (WCD) worn by a near-end participant during a telephone call with a far-end participant, wherein the WCD includes a microphone array; a telephony gateway remote to the WCD and including an audio processor coupled to a wireless radio that forms an audio channel with the WCD, wherein the audio processor generates a first audio signal from signals received from the WCD, wherein the telephony gateway comprises a connection component coupled to the audio processor and to a network carrying the telephone call, wherein the connection component couples the first audio signal to the network for transmission to the far-end participant, wherein the connection component receives a second audio signal from the far-end participant; and a speaker coupled to the connection component and outputting the second audio signal.

The microphone array of an embodiment comprises at least one omnidirectional microphone.

The microphone array of an embodiment comprises at least one directional microphone.

The microphone array of an embodiment comprises two microphones.

The WCD of an embodiment comprises a signal processor coupled to the microphone array.

The signal processor of an embodiment performs demultiplexing on signals from the microphone array.

The signal processor of an embodiment performs echo cancellation on signals from the microphone array.

The signal processor of an embodiment performs noise suppression on signals from the microphone array.

The signal processor of an embodiment performs voice activity detection on signals from the microphone array.

The WCD of an embodiment comprises a headset that contains the at least one microphone and the signal processor, wherein the headset is worn in a head region of the near-end participant.

The WCD of an embodiment comprises a pendant that contains the microphone array and the signal processor, wherein the pendant is worn on a near-end participant.

The WCD of an embodiment includes the speaker, wherein the telephony gateway transmits the second audio signal to the WCD and the speaker outputs the second audio signal.

The WCD of an embodiment comprises a headset that contains the microphone array, the speaker, and the signal processor, wherein the headset is worn in a head region of the near-end participant.

The WCD of an embodiment is hard-coded to the telephony gateway.

The WCD of an embodiment includes a detector that electronically detects at least one other WCD within a pre-specified range of the WCD.

The telephony gateway of an embodiment includes the speaker.

The speaker of an embodiment outputs the first audio signal.

The speaker of an embodiment outputs the second audio signal.

The WCD of an embodiment comprises a pendant that contains the microphone array, wherein the pendant is worn on a near-end participant.

The system of an embodiment comprises a telephone interface coupled to the connection component, wherein the telephone interface is used to control parameters of the telephone call.

The telephone interface of an embodiment includes a dialing interface.

The wireless radio of an embodiment comprises a Bluetooth radio.

The telephony gateway of an embodiment includes a charger, wherein the WCD couples to the charger to recharge.

The WCD of an embodiment includes a pairing mode, wherein in the pairing mode the WCD searches for at least one of the telephony gateway and at least one other WCD with which to electronically pair.

The telephony gateway of an embodiment includes a pairing mode, wherein in the pairing mode the telephony gateway searches for the WCD with which to electronically pair.

The electronic pairing of an embodiment between the WCD and the telephony gateway is classified as transient, wherein the pairing classified as transient is subsequently erased by the telephony gateway.

The audio processor of an embodiment performs demultiplexing on each incoming signal from each WCD.

The audio processor of an embodiment performs echo cancellation on each incoming signal from each WCD.

The audio processor of an embodiment performs noise suppression on each incoming signal from each WCD.

The audio processor of an embodiment performs voice activity detection on each incoming signal from each WCD.

The audio processor of an embodiment performs spatialization on each incoming signal from each WCD.

The audio processor of an embodiment performs equalization on each incoming signal from each WCD.

The connection component of an embodiment manages the audio channel with the WCD.

The system of an embodiment comprises a plurality of wireless communication devices (WCDs) that includes the WCD, wherein the plurality of WCDs is worn by a plurality of near-end participants during the telephone call.

The telephony gateway of an embodiment comprises a plurality of wireless radios that includes the wireless radio, wherein the plurality of wireless radios is coupled to the audio processor, wherein each wireless radio is electronically paired with a corresponding WCD of the plurality of WCDs and provides a dedicated channel with the corresponding WCD.

The plurality of wireless radios of an embodiment comprises a plurality of Bluetooth radios.

The telephony gateway of an embodiment electronically labels each incoming signal from each WCD.

The audio processor of an embodiment integrates signals received from the plurality of WCDs to generate the first audio signal.

The audio processor of an embodiment integrates signals received from the plurality of WCDs by calculating a dynamic gain for each dedicated channel corresponding to each WCD.

The calculating of the dynamic gain of an embodiment comprises calculating a root-mean-square when the near-end participant is speaking.

The telephony gateway of an embodiment transmits the second audio signal to the plurality of WCDs.

The system of an embodiment comprises a plurality of speakers that include the speaker, wherein each WCD of the plurality of WCDs includes a speaker of the plurality of speakers, wherein the telephony gateway transmits the second audio signal to the plurality of WCDs and the plurality of speakers outputs the second audio signal.

The connection component of an embodiment manages the dedicated channels with the plurality of WCDs.

Each WCD of an embodiment includes a detector, wherein the detector of a WCD electronically detects at least one WCD within a pre-specified range of the WCD.

The microphone array of an embodiment comprises a first virtual microphone comprising a first combination of a first microphone signal and a second microphone signal, wherein the first microphone signal is generated by a first physical microphone and the second microphone signal is generated by a second physical microphone. The microphone array of an embodiment comprises a second virtual microphone comprising a second combination of the first microphone signal and the second microphone signal, wherein the second combination is different from the first combination, wherein the first virtual microphone and the second virtual microphone are distinct virtual directional microphones with substantially similar responses to noise and substantially dissimilar responses to speech.

The first and second physical microphones of an embodiment are omnidirectional

The first virtual microphone of an embodiment has a first linear response to speech that is devoid of a null, wherein the speech is human speech.

The second virtual microphone of an embodiment has a second linear response to speech that includes a single null oriented in a direction toward a source of the speech.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

The first physical microphone and the second physical microphone of an embodiment are positioned along an axis and separated by a first distance.

A midpoint of the axis of an embodiment is a second distance from a speech source that generates the speech, wherein the speech source is located in a direction defined by an angle relative to the midpoint.

The first virtual microphone of an embodiment comprises the second microphone signal subtracted from the first microphone signal.

The first microphone signal of an embodiment is delayed.

The delay of an embodiment is raised to a power that is proportional to a time difference between arrival of the speech at the first virtual microphone and arrival of the speech at the second virtual microphone.

The delay of an embodiment is raised to a power that is proportional to a sampling frequency multiplied by a quantity equal to a third distance subtracted from a fourth distance, the third distance being between the first physical microphone and the speech source and the fourth distance being between the second physical microphone and the speech source.

The second microphone signal of an embodiment is multiplied by a ratio, wherein the ratio is a ratio of a third distance to a fourth distance, the third distance being between the first physical microphone and the speech source and the fourth distance being between the second physical microphone and the speech source.

The second virtual microphone of an embodiment comprises the first microphone signal subtracted from the second microphone signal.

The first microphone signal of an embodiment is delayed.

The delay of an embodiment is raised to a power that is proportional to a time difference between arrival of the speech at the first virtual microphone and arrival of the speech at the second virtual microphone.

The power of an embodiment is proportional to a sampling frequency multiplied by a quantity equal to a third distance subtracted from a fourth distance, the third distance being between the first physical microphone and the speech source and the fourth distance being between the second physical microphone and the speech source.

The first microphone signal of an embodiment is multiplied by a ratio, wherein the ratio is a ratio of the third distance to the fourth distance.

The single null of an embodiment is located at a distance from at least one of the first physical microphone and the second physical microphone where the source of the speech is expected to be.

The first virtual microphone of an embodiment comprises the second microphone signal subtracted from a delayed version of the first microphone signal.

The second virtual microphone of an embodiment comprises a delayed version of the first microphone signal subtracted from the second microphone signal.

Embodiments described herein include a system comprising at least one wireless communication device (WCD) worn by at least one near-end participant during a telephone call with a far-end participant. The WCD includes a microphone array comprising a first virtual microphone and a second virtual microphone. The system includes a telephony gateway remote to the at least one WCD and including an audio processor coupled to at least one wireless radio that forms at least one audio channel with the at least one WCD. The audio processor generates an integrated audio signal from signals received from the at least one WCD. The telephony gateway comprises a connection component coupled to the audio processor and to a network carrying the telephone call. The connection component couples the integrated audio signal to the network for transmission to the far-end participant.

Embodiments described herein include a system comprising: at least one wireless communication device (WCD) worn by at least one near-end participant during a telephone call with a far-end participant, wherein the WCD includes a microphone array comprising a first virtual microphone and a second virtual microphone; and a telephony gateway remote to the at least one WCD and including an audio processor coupled to at least one wireless radio that forms at least one audio channel with the at least one WCD, wherein the audio processor generates an integrated audio signal from signals received from the at least one WCD, wherein the telephony gateway comprises a connection component coupled to the audio processor and to a network carrying the telephone call, wherein the connection component couples the integrated audio signal to the network for transmission to the far-end participant.

The first virtual microphone of an embodiment comprises a first combination of a first microphone signal and a second microphone signal, wherein the first microphone signal is generated by a first physical microphone and the second microphone signal is generated by a second physical microphone.

The second virtual microphone of an embodiment comprises a second combination of the first microphone signal and the second microphone signal, wherein the second combination is different from the first combination, wherein the first virtual microphone and the second virtual microphone are distinct virtual directional microphones with substantially similar responses to noise and substantially dissimilar responses to speech.

Embodiments described herein include a system comprising a plurality of wireless communication devices (WCDs) worn by a plurality of near-end participants during a telephone call with a far-end participant. The WCD includes a microphone array. The system includes a telephony gateway remote to the plurality of WCDs and including an audio processor coupled to at least one wireless radio that forms a dedicated audio channel with each WCD of the plurality of WCDs. The audio processor generates an integrated audio signal from the plurality of signals received from the plurality of WCDs. The telephony gateway comprises a connection component coupled to the audio processor and to a network carrying the telephone call. The connection component couples the integrated audio signal to the network for transmission to the far-end participant.

Embodiments described herein include a system comprising: a plurality of wireless communication devices (WCDs) worn by a plurality of near-end participants during a telephone call with a far-end participant, wherein the WCD includes a microphone array; and a telephony gateway remote to the plurality of WCDs and including an audio processor coupled to at least one wireless radio that forms a dedicated audio channel with each WCD of the plurality of WCDs, wherein the audio processor generates an integrated audio signal from the plurality of signals received from the plurality of WCDs, wherein the telephony gateway comprises a connection component coupled to the audio processor and to a network carrying the telephone call, wherein the connection component couples the integrated audio signal to the network for transmission to the far-end participant.

The microphone array of an embodiment comprises a first virtual microphone comprising a first combination of a first microphone signal and a second microphone signal, wherein the first microphone signal is generated by a first physical microphone and the second microphone signal is generated by a second physical microphone. The microphone array of an embodiment comprises a second virtual microphone comprising a second combination of the first microphone signal and the second microphone signal, wherein the second combination is different from the first combination, wherein the first virtual microphone and the second virtual microphone are distinct virtual directional microphones with substantially similar responses to noise and substantially dissimilar responses to speech.

Embodiments described herein include a telephony gateway comprising an audio processor coupled to at least one wireless radio that forms at least one audio channel with at least one wireless communication device (WCD) that is remote to the telephony gateway and worn by at least one near-end participant during a telephone call with a far-end participant. The WCD includes a microphone array comprising a plurality of virtual microphones. The audio processor generates an integrated audio signal from signals received from the at least one WCD. The telephony gateway comprises a connection component coupled to the audio processor and to a network carrying the telephone call. The connection component couples the integrated audio signal to the network for transmission to the far-end participant.

Embodiments described herein include a telephony gateway comprising an audio processor coupled to at least one wireless radio that forms at least one audio channel with at least one wireless communication device (WCD) that is remote to the telephony gateway and worn by at least one near-end participant during a telephone call with a far-end participant, wherein the WCD includes a microphone array comprising a plurality of virtual microphones, wherein the audio processor generates an integrated audio signal from signals received from the at least one WCD, wherein the telephony gateway comprises a connection component coupled to the audio processor and to a network carrying the telephone call, wherein the connection component couples the integrated audio signal to the network for transmission to the far-end participant.

Embodiments described herein include a telephony gateway comprising an audio processor coupled to at least one wireless radio that forms a plurality of audio channels with a plurality of wireless communication devices (WCDs) that is remote to the telephony gateway and worn by near-end participants during a telephone call with a far-end participant. The WCD includes a microphone array. The audio processor generates an integrated audio signal from signals received from the plurality of WCDs. The telephony gateway couples the integrated audio signal to the network for transmission to the far-end participant.

Embodiments described herein include a telephony gateway comprising an audio processor coupled to at least one wireless radio that forms a plurality of audio channels with a plurality of wireless communication devices (WCDs) that is remote to the telephony gateway and worn by near-end participants during a telephone call with a far-end participant, wherein the WCD includes a microphone array, wherein the audio processor generates an integrated audio signal from signals received from the plurality of WCDs, wherein the telephony gateway couples the integrated audio signal to the network for transmission to the far-end participant.

Embodiments described herein include a method comprising establishing an electronic pairing between a plurality of wireless communication devices (WCDs) and a telephony gateway that is remote to the plurality of WCDs. The plurality of WCDs is worn by a plurality of near-end participants. The method includes forming a virtual microphone array at each WCD using microphone signals of the WCD and receiving at the telephony gateway audio signals from the plurality of WCDs. The method includes generating in response to the audio signals a first audio signal. The generating comprises integrating the audio signals from the plurality of WCDs. The method includes establishing a conference call between the plurality of near-end participants and a far-end participant by coupling the first audio signal to a network that transmits the first audio signal to the far-end participant.

Embodiments described herein include a method comprising: establishing an electronic pairing between a plurality of wireless communication devices (WCDs) and a telephony gateway that is remote to the plurality of WCDs, wherein the plurality of WCDs is worn by a plurality of near-end participants; forming a virtual microphone array at each WCD using microphone signals of the WCD and receiving at the telephony gateway audio signals from the plurality of WCDs; generating in response to the audio signals a first audio signal, the generating comprising integrating the audio signals from the plurality of WCDs; and establishing a conference call between the plurality of near-end participants and a far-end participant by coupling the first audio signal to a network that transmits the first audio signal to the far-end participant.

Embodiments described herein include a method comprising establishing an electronic pairing between a plurality of wireless communication devices (WCDs) and a telephony gateway that is remote to the plurality of WCDs. The plurality of WCDs is worn by a plurality of near-end participants. The method includes forming a virtual microphone array at each WCD using microphone signals of the WCD and receiving at the telephony gateway audio signals from the plurality of WCDs. The method includes generating in response to the audio signals a first audio signal. The generating comprises integrating the audio signals from the plurality of WCDs. The method includes establishing a conference call between the plurality of near-end participants and a far-end participant by coupling the first audio signal to a network that transmits the first audio signal to the far-end participant.

Embodiments described herein include a method comprising: establishing an electronic pairing between a plurality of wireless communication devices (WCDs) and a telephony gateway that is remote to the plurality of WCDs, wherein the plurality of WCDs is worn by a plurality of near-end participants; forming a virtual microphone array at each WCD using microphone signals of the WCD and receiving at the telephony gateway audio signals from the plurality of WCDs; generating in response to the audio signals a first audio signal, the generating comprising integrating the audio signals from the plurality of WCDs; and establishing a conference call between the plurality of near-end participants and a far-end participant by coupling the first audio signal to a network that transmits the first audio signal to the far-end participant.

Embodiments described herein include a method comprising establishing an electronic pairing between a plurality of wireless communication devices (WCDs) and a telephony gateway that is remote to the plurality of WCDs. The plurality of WCDs is worn by a plurality of near-end participants during a telephone call with a far-end participant. The method includes forming a virtual microphone array at each WCD using microphone signals of the WCD and receiving at the telephony gateway audio signals from the plurality of WCDs. The method includes generating in response to the audio signals a first audio signal. The generating comprises integrating the audio signals from the plurality of WCDs. The method includes coupling the first audio signal to a network for transmission to the far-end participant. The method includes receiving at the telephony gateway a second audio signal from the far-end participant. The method includes outputting the second audio signal at a speaker coupled to the telephony gateway.

Embodiments described herein include a method comprising: establishing an electronic pairing between a plurality of wireless communication devices (WCDs) and a telephony gateway that is remote to the plurality of WCDs, wherein the plurality of WCDs is worn by a plurality of near-end participants during a telephone call with a far-end participant; forming a virtual microphone array at each WCD using microphone signals of the WCD and receiving at the telephony gateway audio signals from the plurality of WCDs; generating in response to the audio signals a first audio signal, the generating comprising integrating the audio signals from the plurality of WCDs; coupling the first audio signal to a network for transmission to the far-end participant; receiving at the telephony gateway a second audio signal from the far-end participant; and outputting the second audio signal at a speaker coupled to the telephony gateway.

The establishing of the electronic pairing of an embodiment comprises establishing an electronic pairing between at least one wireless radio of the telephony gateway and a corresponding WCD of the plurality of WCDs, wherein the electronic pairing provides a dedicated channel between the telephony gateway and the corresponding WCD.

The integrating of the audio signals of an embodiment comprises calculating a dynamic gain for each dedicated channel corresponding to each WCD.

The calculating of the dynamic gain of an embodiment comprises calculating a root-mean-square when the near-end participant is speaking.

The method of an embodiment comprises electronically labeling each signal from each WCD.

Each WCD of an embodiment comprises at least one microphone.

The at least one microphone of an embodiment comprises an omnidirectional microphone.

The at least one microphone of an embodiment comprises a directional microphone.

The at least one microphone of an embodiment comprises two microphones.

The method of an embodiment comprises demultiplexing signals received at each WCD.

The method of an embodiment comprises performing echo cancellation on signals received at each WCD.

The method of an embodiment comprises performing noise suppression on signals received at each WCD.

The method of an embodiment comprises performing voice activity detection on signals received at each WCD.

The method of an embodiment comprises locating the speaker in each WCD.

The method of an embodiment comprises transmitting the second audio signal to each WCD and outputting the second audio signal via the speaker.

The method of an embodiment comprises locating the speaker in the telephony gateway.

The method of an embodiment comprises outputting the first audio signal via the speaker.

The method of an embodiment comprises outputting the second audio signal via the speaker.

The method of an embodiment comprises hard-coding each WCD to the telephony gateway.

The method of an embodiment comprises electronically detecting at a WCD at least one other WCD within a pre-specified range of the WCD.

The method of an embodiment comprises controlling parameters of the telephone call using a telephone interface of the telephony gateway.

The wireless radio of an embodiment comprises a Bluetooth radio.

The method of an embodiment comprises recharging each WCD at the telephony gateway using a charger of the WCD.

The method of an embodiment comprises each WCD searching for at least one other WCD with which to electronically pair.

The method of an embodiment comprises each WCD searching for the telephony gateway with which to establish the electronic pairing.

The method of an embodiment comprises the telephony gateway searching for a WCD with which to establish the electronic pairing.

The method of an embodiment comprises classifying the electronic pairing between at least one WCD and the telephony gateway as transient. The method of an embodiment comprises erasing information of the electronic pairing subsequent to completion of the telephone call.

The method of an embodiment comprises demultiplexing at the telephony gateway each incoming signal from each WCD.

The method of an embodiment comprises performing at the telephony gateway echo cancellation on each incoming signal from each WCD.

The method of an embodiment comprises performing at the telephony gateway noise suppression on each incoming signal from each WCD.

The method of an embodiment comprises performing at the telephony gateway voice activity detection on each incoming signal from each WCD.

The method of an embodiment comprises performing at the telephony gateway spatialization on each incoming signal from each WCD.

The method of an embodiment comprises performing at the telephony gateway equalization on each incoming signal from each WCD.

The method of an embodiment comprises managing and controlling at the telephony gateway the audio channel with the WCD.

The forming of the virtual microphone array of an embodiment comprises forming a first virtual microphone by generating a first combination of a first microphone signal and a second microphone signal, wherein the first microphone signal is generated by a first physical microphone and the second microphone signal is generated by a second physical microphone. The forming of the virtual microphone array of an embodiment comprises forming a second virtual microphone by generating a second combination of the first microphone signal and the second microphone signal, wherein the second combination is different from the first combination, wherein the first virtual microphone and the second virtual microphone are distinct virtual directional microphones with substantially similar responses to noise and substantially dissimilar responses to speech.

Forming the first virtual microphone of an embodiment includes forming the first virtual microphone to have a first linear response to speech that is devoid of a null, wherein the speech is human speech of the near-end participant.

Forming the second virtual microphone of an embodiment includes forming the second virtual microphone to have a second linear response to speech that includes a single null oriented in a direction toward a source of the speech of the near-end participant.

The single null of an embodiment is a region of the second linear response having a measured response level that is lower than the measured response level of any other region of the second linear response.

The second linear response of an embodiment includes a primary lobe oriented in a direction away from the source of the speech.

The primary lobe of an embodiment is a region of the second linear response having a measured response level that is greater than the measured response level of any other region of the second linear response.

The method of an embodiment comprises positioning the first physical microphone and the second physical microphone along an axis and separating the first and second physical microphones by a first distance.

A midpoint of the axis of an embodiment is a second distance from a speech source that generates the speech, wherein the speech source is located in a direction defined by an angle relative to the midpoint.

Forming the first virtual microphone of an embodiment comprises subtracting the second microphone signal subtracted from the first microphone signal.

The method of an embodiment comprises delaying the first microphone signal.

The method of an embodiment comprises raising the delay to a power that is proportional to a time difference between arrival of the speech at the first virtual microphone and arrival of the speech at the second virtual microphone.

The method of an embodiment comprises raising the delay to a power that is proportional to a sampling frequency multiplied by a quantity equal to a third distance subtracted from a fourth distance, the third distance being between the first physical microphone and the speech source and the fourth distance being between the second physical microphone and the speech source.

The method of an embodiment comprises multiplying the second microphone signal by a ratio, wherein the ratio is a ratio of a third distance to a fourth distance, the third distance being between the first physical microphone and the speech source and the fourth distance being between the second physical microphone and the speech source.

Forming the second virtual microphone of an embodiment comprises subtracting the first microphone signal from the second microphone signal.

The method of an embodiment comprises delaying the first microphone signal.

The method of an embodiment comprises raising the delay to a power that is proportional to a time difference between arrival of the speech at the first virtual microphone and arrival of the speech at the second virtual microphone.

The method of an embodiment comprises raising the delay to a power that is proportional to a sampling frequency multiplied by a quantity equal to a third distance subtracted from a fourth distance, the third distance being between the first physical microphone and the speech source and the fourth distance being between the second physical microphone and the speech source.

The method of an embodiment comprises multiplying the first microphone signal by a ratio, wherein the ratio is a ratio of the third distance to the fourth distance.

Forming the first virtual microphone of an embodiment comprises subtracting the second microphone signal from a delayed version of the first microphone signal.

Forming the second virtual microphone of an embodiment comprises forming a quantity by delaying the first microphone signal. Forming the second virtual microphone of an embodiment comprises subtracting the quantity from the second microphone signal.

The first and second physical microphones of an embodiment are omnidirectional.

Embodiments of the wireless conference call telephone system can be a component of a single system, multiple systems, and/or geographically separate systems. The wireless conference call telephone system can also be a subcomponent or subsystem of a single system, multiple systems, and/or geographically separate systems. The wireless conference call telephone system can be coupled to one or more other components (not shown) of a host system or a system coupled to the host system.

One or more components of the wireless conference call telephone system and/or a corresponding system or application to which the wireless conference call telephone system is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the wireless conference call telephone system can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the wireless conference call telephone system and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the wireless conference call telephone system and corresponding systems and methods include: microcontrollers with memory (such as electronically erasable programmable read only memory (EEPROM)), embedded microprocessors, firmware, software, etc. Furthermore, aspects of the wireless conference call telephone system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the wireless conference call telephone system and corresponding systems and methods is not intended to be exhaustive or to limit the systems and methods to the precise forms disclosed. While specific embodiments of, and examples for, the wireless conference call telephone system and corresponding systems and methods are described herein for illustrative purposes, various equivalent modifications are possible within the scope of the systems and methods, as those skilled in the relevant art will recognize. The teachings of the wireless conference call telephone system and corresponding systems and methods provided herein can be applied to other systems and methods, not only for the systems and methods described above.

The elements and acts of the various embodiments described above can be combined to provide further embodiments. These and other changes can be made to the wireless conference call telephone system and corresponding systems and methods in light of the above detailed description.

What is claimed is:

1. A system comprising:
  a wireless communication device (WCD) worn by a near-end participant during a telephone call with a far-end participant, wherein the WCD includes a microphone array, a WCD wireless radio, and a WCD processor configured to execute control, transmission, and audio processing algorithm;

a telephony gateway remote to the WCD and including a-gateway processor coupled to a gateway wireless radio that forms an audio channel with the WCD, wherein the WCD processor is configured to electronically detect and pair, using the WCD wireless radio, with at least one other WCD within a pre-specified range of the WCD, and wherein the WCD processor is configured to pair, using the WCD wireless radio, with the telephony gateway; and wherein the gateway processor generates a first audio signal from signals received from the WCD, wherein the telephony gateway comprises a connection component coupled to the gateway processor and to a network carrying the telephone call, wherein the connection component couples the first audio signal to the network for transmission to the far-end participant, wherein the connection component receives a second audio signal from the far-end participant; and a speaker coupled to the connection component and outputting the second audio signal.

2. The system of claim 1,
wherein the microphone array comprises at least one omni-directional microphone.

3. The system of claim 1,
wherein the WCD is hard-coded to the telephony gateway.

4. The system of claim 1, wherein the WCD includes a detector that electronically detects at least one other WCD within a pre-specified range of the WCD.

5. The system of claim 1,
wherein the telephony gateway includes the speaker.

6. The system of claim 1, comprising a telephone interface coupled to the connection component, wherein the telephone interface is used to control parameters of the telephone call.

7. The system of claim 1,
wherein the WCD wireless radio comprises a Bluetooth radio, and the gateway wireless radio comprises a Bluetooth radio.

8. The system of claim 1, wherein the telephony gateway includes a pairing mode, wherein in the pairing mode the telephony gateway searches for the WCD with which to electronically pair.

9. The system of claim 1, wherein the electronic pairing between the WCD and the telephony gateway is classified as transient, wherein the pairing classified as transient is subsequently erased by the telephony gateway.

10. The system of claim 1, wherein the gateway processor performs demultiplexing on each incoming signal from each WCD.

11. The system of claim 1, wherein the gateway processor performs echo cancellation on each incoming signal from each WCD.

12. The system of claim 1, wherein the gateway processor performs noise suppression on each incoming signal from each WCD.

13. The system of claim 1, wherein the gateway processor performs voice activity detection on each incoming signal from each WCD.

14. The system of claim 1, wherein the gateway processor performs spatialization on each incoming signal from each WCD.

15. The system of claim 1, wherein the gateway processor performs equalization on each incoming signal from each WCD.

16. A method comprising:
establishing an electronic pairing between a plurality of wireless communication devices (WCDs) and a telephony gateway that is remote to the plurality of WCDs, wherein the plurality of WCDs is worn by a plurality of near-end participants;

forming a virtual microphone array at each WCD using microphone signals of the WCD and receiving at the telephony gateway audio signals from the plurality of WCDs;

establishing an electronic pairing between at least two WCDs among the plurality of WCDs;

executing control, transmission, and audio processing algorithms on at least one WCD among the plurality of WCDs generating WCD audio signals by at least one WCD among the plurality of WCDs;

generating in response to the WCD audio signals a first audio signal, the generating comprising integrating the WCD audio signals from the plurality of WCDs; and establishing a conference call between the plurality of near-end participants and a far-end participant by coupling the first audio signal to a network that transmits the first audio signal to the far-end participant.

* * * * *